United States Patent
Kelch et al.

(10) Patent No.: US 10,838,231 B2
(45) Date of Patent: Nov. 17, 2020

(54) PROGRESSIVE SPECTACLE LENS HAVING A VARIABLE REFRACTIVE INDEX AND METHOD FOR THE DESIGN AND PRODUCTION THEREOF

(71) Applicant: Carl Zeiss Vision International GmbH, Aalen (DE)

(72) Inventors: Gerhard Kelch, Aalen (DE); Christoph Menke, Oberkochen (DE); Helmut Wietschorke, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 16/515,496

(22) Filed: Jul. 18, 2019

(65) Prior Publication Data

US 2019/0391411 A1    Dec. 26, 2019

Related U.S. Application Data

(63) Continuation of application No. PCT/EP2018/000026, filed on Jan. 19, 2018.

(30) Foreign Application Priority Data

Jan. 20, 2017  (EP) .................................... 17152384

(51) Int. Cl.
  *G02C 7/02*  (2006.01)
  *G02C 7/06*  (2006.01)

(52) U.S. Cl.
  CPC ............. *G02C 7/027* (2013.01); *G02C 7/028* (2013.01); *G02C 7/065* (2013.01); *G02C 7/068* (2013.01)

(58) Field of Classification Search
  CPC ........ G02C 7/027; G02C 7/028; G02C 7/065; G02C 7/068

(Continued)

(56) References Cited

U.S. PATENT DOCUMENTS

| 4,762,408 A | 8/1988 | Shinohara |
| 5,042,936 A | 8/1991 | Guilino et al. |

(Continued)

FOREIGN PATENT DOCUMENTS

| DE | 102008041869 A1 | 3/2010 |
| DE | 102015205721 A1 | 10/2016 |

(Continued)

OTHER PUBLICATIONS

Koeppen: "Konzeption und Entwicklung von Gleitsichtglaesern [Conception and design of progressive lenses]," Doz, pp. 42-45, and English-language translation thereof, Oct. 1995.

(Continued)

*Primary Examiner* — James R Greece
(74) *Attorney, Agent, or Firm* — Thrive IP®; Georg M. Hasselmann

(57) ABSTRACT

A product includes a progressive power spectacle lens or a representation, stored on a data storage medium, of the progressive power spectacle lens. The progressive power spectacle lens has a front surface and a back surface and a spatially varying refractive index, wherein the front surface and/or the back surface is embodied as a progressive surface. The front surface is formed as a free-form surface in such a way that the maximum of the absolute value of the mean curvature of the front surface lies in the intermediate corridor and/or the back surface is formed as a free-form surface in such a way that the minimum of the absolute value of the mean curvature of the back surface lies in the intermediate corridor. Further, a computer-implemented method for planning a progressive power spectacle lens with a spatially varying refractive index and a progressive surface is disclosed.

34 Claims, 37 Drawing Sheets

(58) Field of Classification Search
USPC .................................................. 351/159.75
See application file for complete search history.

(56) References Cited

U.S. PATENT DOCUMENTS

| | | | |
|---|---|---|---|
| 5,148,205 | A | 9/1992 | Guilino et al. |
| 6,089,713 | A | 7/2000 | Hof et al. |
| 8,186,829 | B2 | 5/2012 | De Rossi et al. |
| 8,366,269 | B2 | 2/2013 | Kratzer et al. |
| 8,425,035 | B2 | 4/2013 | von Blanckenhagen |
| 8,591,026 | B2 | 11/2013 | Conte et al. |
| 8,757,800 | B2 | 6/2014 | Esser et al. |
| 2004/0008319 | A1 | 1/2004 | Lai et al. |
| 2005/0146681 | A1* | 7/2005 | Kato ............ G02C 7/068 351/159.42 |
| 2010/0238400 | A1* | 9/2010 | Volk ............ G02C 7/061 351/159.42 |
| 2018/0088353 | A1 | 3/2018 | Altheimer et al. |
| 2019/0250430 | A1 | 8/2019 | Mappes et al. |

FOREIGN PATENT DOCUMENTS

| | | |
|---|---|---|
| EP | 318035 A1 | 5/1989 |
| EP | 347917 A1 | 12/1989 |
| EP | 2177943 A1 | 4/2010 |
| EP | 857993 B2 | 8/2013 |
| EP | 2115527 B1 | 4/2014 |
| EP | 2383603 B1 | 9/2014 |
| EP | 2878989 A1 | 6/2015 |
| EP | 3312661 A1 | 4/2018 |
| GB | 2294553 A | 5/1996 |
| WO | 8904986 A1 | 6/1989 |
| WO | 9913361 A1 | 3/1999 |
| WO | 0155752 A1 | 8/2001 |
| WO | 2010109154 A1 | 9/2010 |
| WO | 2011093929 A1 | 8/2011 |

OTHER PUBLICATIONS

Diepes et al. "Optik und Technik der Brille" ["Optics and Technology of Spectacles"], Optische Fachveröffentlichung GmbH, Heidelberg, Germany, 2005, Chapter 5.3, see paragraph [0043] of the instant specification for relevance.

Meister: "The Optics of Free-Form Progressive Lenses," Opticianry Study Center, pp. 131 to 134, Oct. 2008.

Shitanoki; "Application of Graded-Index for Astigmatism Reduction in Progressive Addition Lens," Applied Physics Express, p. 032401, 2009.

"Ophthalmic optics—Spectacle lenses—Vocabulary (ISO 13666:2012)," German and English version EN ISO 13666:2012, Oct. 2013.

"Optics and optical instruments—Focimeters—Part 1, General purpose instruments," ISO 8598-1, 2014.

"Ophthalmic optics—Terms and definitions related to free-form technology," German and English version DIN SPEC 58194, Dec. 2015.

"Ophthalmic optics—Spectacle lenses—Fundamental requirements for uncut finished lenses," DIN EN ISO 14889, Apr. 2018.

Extended European Search Report issued in EP 17152384.8, to which this application claims priority, dated Jul. 31, 2017.

Office Action of the European Patent Office in EP 17152384.8, to which this application claims priority, dated May 30, 2018.

Office Action of the European Patent Office in EP 17152384.8, to which this application claims priority, dated Feb. 27, 2019.

Written opinion issued in PCT/EP2018/000026, to which this application claims priority, dated Sep. 24, 2018.

International Search Report issued in PCT/EP2018/000026, to which this application claims priority, and English-language translation thereof, dated Sep. 25, 2018.

International Preliminary Examination Report issued in PCT/EP2018/000026, to which this application claims priority, and English-language translation thereof, dated May 21, 2019.

Homepage of Zemax(R), available at the url www.zemax.com (last accessed Sep. 10, 2019).

English-language translation of the Extended European Search Report of the European Patent Office issued in EP 19 189 829.5, which is a counterpart hereof, dated Dec. 4, 2019.

English-language translation of an Office Action of the European Patent Office issued in EP 18 708 326.6, which is a counterpart hereof, dated Dec. 18, 2019.

English-language translation of the Extended European Search Report of the European Patent Office issued in EP 19 187 068.2, which is a counterpart hereof, dated Dec. 20, 2019.

Definition "Regelgeometrie [Regular Geometry]," in "Erfassen and Verarbeiten komplexer Geometrie in Meßtechnik und Flächenrückführung," Springer Verlag, p. 101, 2013 (See paragraph [0032] of the instant specification for relevance).

Internet citation "GRINOptics-Overview," available at the url: peaknano.com/wpcontent/uploads/PEAK-1510-GRINOptics-Overview.pdf, last accessed Jan. 12, 2017.

Office Action of the Canadian Patent Office in CA 3,054,482, which is a counterpart hereof, dated Nov. 5, 2019.

Extended European Search Report of the European Patent Office issued in EP 19 189 829.5, which is a counterpart hereof, dated Dec. 4, 2019.

Office Action of the European Patent Office issued in EP 18 708 326.6, which is a counterpart hereof, dated Dec. 18, 2019.

Extended European Search Report of the European Patent Office issued in EP 19 187 068.2, which is a counterpart hereof, dated Dec. 20, 2019.

Office Action of the European Patent Office issued in EP 19 189 829.5, which is a counterpart hereof, dated Jan. 15, 2020.

Office Action of the Korean Patent Office issued in Korean patent application 10-2019-7028883, which is a counterpart hereof, dated Jan. 16, 2020, and English-language translation thereof.

Office Action of the Korean Patent Office issued in Korean patent application No. 10-2019-7024333, which is a counterpart hereof, dated Mar. 4, 2020, and English-language translation thereof.

* cited by examiner

| X | 0 | 2 | 4 | 6 | 8 | 10 | 12 | 14 | 16 | 18 | 20 |
|---|---|---|---|---|---|---|---|---|---|---|---|
| Y | | | | | | | | | | | |
| 26 | 3.1912 | 3.2086 | 3.2609 | 3.3481 | 3.4702 | 3.6269 | 3.8176 | 4.0419 | | | |
| 24 | 2.7257 | 2.7430 | 2.7952 | 2.8822 | 3.0040 | 3.1602 | 3.3502 | 3.5732 | 3.8284 | 4.1145 | |
| 22 | 2.2971 | 2.3144 | 2.3665 | 2.4535 | 2.5754 | 2.7316 | 2.9216 | 3.1446 | 3.4000 | 3.6870 | 4.0048 |
| 20 | 1.9050 | 1.9223 | 1.9746 | 2.0618 | 2.1840 | 2.3408 | 2.5315 | 2.7555 | 3.0123 | 3.3015 | 3.6226 |
| 18 | 1.5490 | 1.5665 | 1.6190 | 1.7068 | 1.8297 | 1.9874 | 2.1794 | 2.4052 | 2.6646 | 2.9572 | 3.2829 |
| 16 | 1.2290 | 1.2467 | 1.2997 | 1.3881 | 1.5121 | 1.6712 | 1.8651 | 2.0935 | 2.3563 | 2.6533 | 2.9845 |
| 14 | 0.9451 | 0.9630 | 1.0166 | 1.1061 | 1.2313 | 1.3922 | 1.5886 | 1.8202 | 2.0871 | 2.3893 | 2.7269 |
| 12 | 0.6977 | 0.7158 | 0.7701 | 0.8608 | 0.9877 | 1.1508 | 1.3500 | 1.5854 | 1.8570 | 2.1649 | 2.5096 |
| 10 | 0.4869 | 0.5053 | 0.5605 | 0.6524 | 0.7813 | 0.9469 | 1.1495 | 1.3891 | 1.6658 | 1.9800 | 2.3320 |
| 8 | 0.3133 | 0.3320 | 0.3880 | 0.4815 | 0.6125 | 0.7810 | 0.9873 | 1.2314 | 1.5136 | 1.8343 | 2.1940 |
| 6 | 0.1773 | 0.1963 | 0.2533 | 0.3484 | 0.4817 | 0.6533 | 0.8635 | 1.1123 | 1.4003 | 1.7277 | 2.0952 |
| 4 | 0.0794 | 0.0987 | 0.1567 | 0.2535 | 0.3893 | 0.5641 | 0.7783 | 1.0321 | 1.3259 | 1.6602 | 2.0355 |
| 2 | 0.0201 | 0.0398 | 0.0988 | 0.1974 | 0.3357 | 0.5139 | 0.7322 | 0.9911 | 1.2908 | 1.6320 | 2.0152 |
| 0 | 0.0001 | 0.0201 | 0.0803 | 0.1807 | 0.3216 | 0.5031 | 0.7257 | 0.9896 | 1.2953 | 1.6434 | 2.0345 |
| -2 | 0.0200 | 0.0404 | 0.1016 | 0.2039 | 0.3474 | 0.5324 | 0.7593 | 1.0282 | 1.3399 | 1.6948 | 2.0939 |
| -4 | 0.0806 | 0.1013 | 0.1637 | 0.2678 | 0.4140 | 0.6025 | 0.8336 | 1.1076 | 1.4252 | 1.7870 | 2.1939 |
| -6 | 0.1826 | 0.2037 | 0.2672 | 0.3732 | 0.5221 | 0.7140 | 0.9494 | 1.2284 | 1.5519 | 1.9206 | 2.3353 |
| -8 | 0.3268 | 0.3483 | 0.4129 | 0.5209 | 0.6725 | 0.8679 | 1.1075 | 1.3916 | 1.7210 | 2.0965 | 2.5189 |
| -10 | 0.5140 | 0.5359 | 0.6016 | 0.7117 | 0.8659 | 1.0648 | 1.3086 | 1.5979 | 1.9332 | 2.3155 | 2.7457 |
| -12 | 0.7452 | 0.7675 | 0.8345 | 0.9464 | 1.1032 | 1.3055 | 1.5536 | 1.8481 | 2.1895 | 2.5788 | 3.0168 |
| -14 | 1.0211 | 1.0438 | 1.1120 | 1.2258 | 1.3853 | 1.5909 | 1.8434 | 2.1431 | 2.4909 | 2.8875 | 3.3338 |
| -16 | 1.3430 | 1.3661 | 1.4355 | 1.5512 | 1.7132 | 1.9223 | 2.1792 | 2.4846 | 2.8391 | 3.2435 | 3.6986 |
| -18 | 1.7122 | 1.7357 | 1.8062 | 1.9237 | 2.0884 | 2.3011 | 2.5627 | 2.8740 | 3.2358 | 3.6488 | 4.1138 |
| -20 | 2.1301 | 2.1539 | 2.2253 | 2.3447 | 2.5122 | 2.7287 | 2.9952 | 3.3129 | 3.6825 | 4.1051 | 4.5814 |
| -22 | 2.5976 | 2.6217 | 2.6941 | 2.8152 | 2.9854 | 3.2058 | 3.4775 | 3.8019 | 4.1801 | 4.6133 | 5.1027 |
| -24 | 3.1159 | 3.1402 | 3.2136 | 3.3363 | 3.5091 | 3.7333 | 4.0103 | 4.3416 | 4.7290 | 5.1742 | |
| -26 | 3.6862 | 3.7108 | 3.7850 | 3.9093 | 4.0844 | 4.3120 | 4.5940 | 4.9322 | | | |

FIG. 6A

| X | 0 | 2 | 4 | 6 | 8 | 10 | 12 | 14 | 16 | 18 | 20 |
|---|---|---|---|---|---|---|---|---|---|---|---|
| Y | | | | | | | | | | | |
| 26 | 4.4873 | 4.5072 | 4.5668 | 4.6660 | 4.8044 | 4.9815 | 5.1967 | 5.4492 | | | |
| 24 | 3.8230 | 3.8430 | 3.9031 | 4.0031 | 4.1426 | 4.3213 | 4.5387 | 4.7939 | 5.0863 | 5.4149 | |
| 22 | 3.2067 | 3.2269 | 3.2875 | 3.3883 | 3.5291 | 3.7096 | 3.9293 | 4.1877 | 4.4839 | 4.8173 | 5.1870 |
| 20 | 2.6430 | 2.6634 | 2.7245 | 2.8262 | 2.9684 | 3.1508 | 3.3730 | 3.6345 | 3.9348 | 4.2731 | 4.6488 |
| 18 | 2.1350 | 2.1555 | 2.2172 | 2.3198 | 2.4634 | 2.6477 | 2.8725 | 3.1372 | 3.4415 | 3.7847 | 4.1662 |
| 16 | 1.6841 | 1.7048 | 1.7670 | 1.8707 | 2.0156 | 2.2018 | 2.4290 | 2.6969 | 3.0050 | 3.3529 | 3.7400 |
| 14 | 1.2905 | 1.3114 | 1.3742 | 1.4787 | 1.6251 | 1.8131 | 2.0426 | 2.3134 | 2.6251 | 2.9773 | 3.3696 |
| 12 | 0.9533 | 0.9744 | 1.0376 | 1.1431 | 1.2907 | 1.4804 | 1.7121 | 1.9856 | 2.3006 | 2.6567 | 3.0537 |
| 10 | 0.6708 | 0.6920 | 0.7558 | 0.8621 | 1.0109 | 1.2022 | 1.4358 | 1.7117 | 2.0297 | 2.3893 | 2.7904 |
| 8 | 0.4408 | 0.4622 | 0.5265 | 0.6335 | 0.7834 | 0.9761 | 1.2115 | 1.4896 | 1.8101 | 2.1728 | 2.5775 |
| 6 | 0.2611 | 0.2827 | 0.3473 | 0.4550 | 0.6059 | 0.7999 | 1.0369 | 1.3168 | 1.6396 | 2.0050 | 2.4128 |
| 4 | 0.1292 | 0.1509 | 0.2159 | 0.3243 | 0.4760 | 0.6711 | 0.9095 | 1.1911 | 1.5158 | 1.8835 | 2.2941 |
| 2 | 0.0429 | 0.0646 | 0.1300 | 0.2389 | 0.3915 | 0.5876 | 0.8272 | 1.1103 | 1.4367 | 1.8065 | 2.2193 |
| 0 | 0.0000 | 0.0219 | 0.0876 | 0.1970 | 0.3503 | 0.5473 | 0.7880 | 1.0724 | 1.4004 | 1.7719 | 2.1869 |
| -2 | -0.0012 | 0.0208 | 0.0868 | 0.1967 | 0.3506 | 0.5485 | 0.7902 | 1.0758 | 1.4052 | 1.7783 | 2.1952 |
| -4 | 0.0377 | 0.0598 | 0.1261 | 0.2365 | 0.3910 | 0.5896 | 0.8323 | 1.1190 | 1.4497 | 1.8244 | 2.2431 |
| -6 | 0.1154 | 0.1376 | 0.2041 | 0.3149 | 0.4700 | 0.6694 | 0.9131 | 1.2009 | 1.5329 | 1.9091 | 2.3295 |
| -8 | 0.2307 | 0.2530 | 0.3197 | 0.4310 | 0.5867 | 0.7868 | 1.0314 | 1.3203 | 1.6536 | 2.0314 | 2.4537 |
| -10 | 0.3826 | 0.4049 | 0.4720 | 0.5836 | 0.7399 | 0.9409 | 1.1864 | 1.4765 | 1.8112 | 2.1906 | 2.6149 |
| -12 | 0.5702 | 0.5926 | 0.6599 | 0.7720 | 0.9290 | 1.1307 | 1.3773 | 1.6686 | 2.0049 | 2.3861 | 2.8127 |
| -14 | 0.7927 | 0.8153 | 0.8828 | 0.9954 | 1.1531 | 1.3557 | 1.6034 | 1.8962 | 2.2341 | 2.6175 | 3.0464 |
| -16 | 1.0495 | 1.0721 | 1.1400 | 1.2532 | 1.4116 | 2.0000 | 1.8642 | 2.1586 | 2.4985 | 2.8842 | 3.3159 |
| -18 | 1.3398 | 1.3626 | 1.4308 | 1.5446 | 1.7039 | 1.9088 | 2.1592 | 2.4555 | 2.7977 | 3.1861 | 3.6210 |
| -20 | 1.6631 | 1.6860 | 1.7547 | 1.8692 | 2.0295 | 2.2358 | 2.4881 | 2.7865 | 3.1314 | 3.5230 | 3.9617 |
| -22 | 2.0188 | 2.0419 | 2.1111 | 2.2264 | 2.3880 | 2.5959 | 2.8503 | 3.1514 | 3.4994 | 3.8948 | 4.3380 |
| -24 | 2.4062 | 2.4295 | 2.4993 | 2.6157 | 2.7788 | 2.9887 | 3.2457 | 3.5499 | 3.9018 | 4.3018 | |
| -26 | 2.8247 | 2.8482 | 2.9188 | 3.0364 | 3.2014 | 3.4137 | 3.6737 | 3.9818 | | | |

FIG. 6B

| | X | 0 | 2 | 4 | 6 | 8 | 10 | 12 | 14 | 16 | 18 | 20 |
|---|---|---|---|---|---|---|---|---|---|---|---|---|
| Y | | | | | | | | | | | | |
| 20 | | 1.6118 | 1.6289 | 1.6802 | 1.7658 | 1.8860 | 2.0408 | 2.2305 | 2.4552 | | | |
| 18 | | 1.2747 | 1.2916 | 1.3427 | 1.4280 | 1.5476 | 1.7018 | 1.8907 | 2.1145 | 2.3736 | | |
| 16 | | 0.9732 | 0.9900 | 1.0409 | 1.1258 | 1.2450 | 1.3986 | 1.5868 | 1.8098 | 2.0681 | 2.3618 | |
| 14 | | 0.7068 | 0.7236 | 0.7743 | 0.8590 | 0.9778 | 1.1308 | 1.3184 | 1.5407 | 1.7982 | 2.0911 | 2.4198 |
| 12 | | 0.4753 | 0.4921 | 0.5426 | 0.6270 | 0.7455 | 0.8981 | 1.0852 | 1.3069 | 1.5636 | 1.8557 | 2.1837 |
| 10 | | 0.2783 | 0.2951 | 0.3455 | 0.4297 | 0.5478 | 0.7001 | 0.8867 | 1.1079 | 1.3641 | 1.6556 | 1.9831 |
| 8 | | 0.1155 | 0.1323 | 0.1826 | 0.2666 | 0.3845 | 0.5365 | 0.7228 | 0.9436 | 1.1994 | 1.4908 | 1.8182 |
| 6 | | -0.0132 | 0.0035 | 0.0537 | 0.1375 | 0.2552 | 0.4070 | 0.5931 | 0.8139 | 1.0697 | 1.3612 | 1.6889 |
| 4 | | -0.1082 | -0.0916 | -0.0414 | 0.0424 | 0.1601 | 0.3119 | 0.4982 | 0.7192 | 0.9754 | 1.2676 | 1.5960 |
| 2 | | -0.1697 | -0.1530 | -0.1028 | -0.0187 | 0.0992 | 0.2515 | 0.4383 | 0.6602 | 0.9175 | 1.2109 | 1.5406 |
| 0 | | -0.1978 | -0.1810 | -0.1303 | -0.0457 | 0.0731 | 0.2263 | 0.4144 | 0.6379 | 0.8971 | 1.1922 | 1.5238 |
| -2 | | -0.1922 | -0.1749 | -0.1231 | -0.0370 | 0.0835 | 0.2386 | 0.4288 | 0.6545 | 0.9162 | 1.2138 | 1.5477 |
| -4 | | -0.1520 | -0.1341 | -0.0804 | 0.0086 | 0.1322 | 0.2901 | 0.4832 | 0.7120 | 0.9767 | 1.2773 | 1.6141 |
| -6 | | -0.0759 | -0.0572 | -0.0013 | 0.0912 | 0.2189 | 0.3810 | 0.5782 | 0.8108 | 1.0790 | 1.3830 | 1.7229 |
| -8 | | 0.0375 | 0.0569 | 0.1151 | 0.2113 | 0.3437 | 0.5113 | 0.7137 | 0.9509 | 1.2231 | 1.5308 | 1.8743 |
| -10 | | 0.1896 | 0.2098 | 0.2703 | 0.3702 | 0.5077 | 0.6810 | 0.8894 | 1.1319 | 1.4091 | 1.7212 | 2.0688 |
| -12 | | 0.3821 | 0.4031 | 0.4658 | 0.5695 | 0.7118 | 0.8910 | 1.1054 | 1.3540 | 1.6368 | 1.9543 | 2.3068 |
| -14 | | 0.6165 | 0.6382 | 0.7033 | 0.8106 | 0.9578 | 1.1425 | 1.3630 | 1.6179 | 1.9070 | 2.2303 | 2.5881 |
| -16 | | 0.8944 | 0.9169 | 0.9842 | 1.0951 | 1.2468 | 1.4368 | 1.6633 | 1.9245 | 2.2200 | 2.5494 | |
| -18 | | 1.2174 | 1.2405 | 1.3096 | 1.4235 | 1.5794 | 1.7748 | 2.0071 | 2.2745 | 2.5761 | | |
| -20 | | 1.5870 | 1.6104 | 1.6805 | 1.7965 | 1.9562 | 2.1568 | 2.3952 | 2.6684 | | | |

FIG. 12A

| | X | 0 | 2 | 4 | 6 | 8 | 10 | 12 | 14 | 16 | 18 | 20 |
|---|---|---|---|---|---|---|---|---|---|---|---|---|
| Y | | | | | | | | | | | | |
| 20 | | 2.7057 | 2.7241 | 2.7791 | 2.8707 | 2.9986 | 3.1625 | 3.3620 | 3.5972 | | | |
| 18 | | 2.2603 | 2.2790 | 2.3348 | 2.4277 | 2.5570 | 2.7221 | 2.9226 | 3.1579 | 3.4278 | | |
| 16 | | 1.8478 | 1.8670 | 1.9243 | 2.0192 | 2.1511 | 2.3189 | 2.5217 | 2.7586 | 3.0295 | 3.3341 | |
| 14 | | 1.4648 | 1.4847 | 1.5441 | 1.6421 | 1.7777 | 1.9495 | 2.1560 | 2.3960 | 2.6690 | 2.9748 | 3.3137 |
| 12 | | 1.1096 | 1.1303 | 1.1923 | 1.2943 | 1.4348 | 1.6117 | 1.8232 | 2.0676 | 2.3440 | 2.6522 | 2.9922 |
| 10 | | 0.7816 | 0.8034 | 0.8684 | 0.9753 | 1.1216 | 1.3047 | 1.5222 | 1.7721 | 2.0531 | 2.3648 | 2.7073 |
| 8 | | 0.4826 | 0.5055 | 0.5740 | 0.6862 | 0.8391 | 1.0291 | 1.2533 | 1.5096 | 1.7961 | 2.1123 | 2.4581 |
| 6 | | 0.2157 | 0.2399 | 0.3119 | 0.4298 | 0.5896 | 0.7868 | 1.0182 | 1.2813 | 1.5740 | 1.8951 | 2.2447 |
| 4 | | -0.0145 | 0.0108 | 0.0864 | 0.2098 | 0.3764 | 0.5809 | 0.8194 | 1.0893 | 1.3882 | 1.7145 | 2.0681 |
| 2 | | -0.2030 | -0.1765 | -0.0976 | 0.0311 | 0.2041 | 0.4155 | 0.6606 | 0.9367 | 1.2413 | 1.5725 | 1.9298 |
| 0 | | -0.3444 | -0.3169 | -0.2349 | -0.1016 | 0.0772 | 0.2945 | 0.5454 | 0.8266 | 1.1357 | 1.4707 | 1.8310 |
| -2 | | -0.4341 | -0.4057 | -0.3214 | -0.1846 | -0.0015 | 0.2204 | 0.4756 | 0.7605 | 1.0725 | 1.4098 | 1.7718 |
| -4 | | -0.4691 | -0.4403 | -0.3548 | -0.2163 | -0.0310 | 0.1935 | 0.4512 | 0.7382 | 1.0516 | 1.3896 | 1.7520 |
| -6 | | -0.4494 | -0.4206 | -0.3351 | -0.1967 | -0.0113 | 0.2136 | 0.4720 | 0.7593 | 1.0725 | 1.4099 | 1.7715 |
| -8 | | -0.3768 | -0.3482 | -0.2638 | -0.1269 | 0.0567 | 0.2802 | 0.5373 | 0.8232 | 1.1348 | 1.4704 | 1.8299 |
| -10 | | -0.2544 | -0.2263 | -0.1435 | -0.0092 | 0.1713 | 0.3919 | 0.6460 | 0.9288 | 1.2374 | 1.5703 | 1.9267 |
| -12 | | -0.0859 | -0.0586 | 0.0222 | 0.1531 | 0.3297 | 0.5460 | 0.7959 | 1.0744 | 1.3790 | 1.7083 | 2.0612 |
| -14 | | 0.1244 | 0.1508 | 0.2290 | 0.3560 | 0.5280 | 0.7396 | 0.9847 | 1.2583 | 1.5585 | 1.8838 | 2.2330 |
| -16 | | 0.3729 | 0.3983 | 0.4734 | 0.5960 | 0.7631 | 0.9699 | 1.2101 | 1.4791 | 1.7747 | 2.0961 | |
| -18 | | 0.6566 | 0.6808 | 0.7528 | 0.8709 | 1.0330 | 1.2350 | 1.4708 | 1.7355 | 2.0273 | | |
| -20 | | 0.9729 | 0.9962 | 1.0655 | 1.1796 | 1.3370 | 1.5344 | 1.7661 | 2.0274 | | | |

FIG. 12B

| X  | -22 | -20 | -18 | -16 | -14 | -12 | -10 | -8 | -6 | -4 | -2 | 0 | 2 | 4 | 6 | 8 | 10 | 12 | 14 | 16 | 18 | 20 | 22 |
|----|-----|-----|-----|-----|-----|-----|-----|----|----|----|----|----|----|----|----|----|----|----|----|----|----|----|----|
| Y  |     |     |     |     |     |     |     |    |    |    |    |    |    |    |    |    |    |    |    |    |    |    |    |
| 24 |     |     |     |     |     |     |     |    |    |    |    |    |    |    |    |    |    |    |    |    |    |    |    |
| 22 |     |     |     |     |     |     |     |    |    |    |    | 2.9314 |    |    |    |    |    |    |    |    |    |    |    |
| 20 |     |     |     |     |     | 2.7611 |     | 2.8026 | 2.6737 | 2.5794 | 2.5195 | 2.4943 | 2.5030 | 2.5454 | 2.6233 | 2.7368 |    |    |    |    |    |    |    |
| 18 |     |     |     |     | 2.6252 | 2.3934 | 2.5634 | 2.4004 | 2.2720 | 2.1782 | 2.1187 | 2.0933 | 2.1022 | 2.1454 | 2.2229 | 2.3349 | 2.4814 | 2.6627 |    |    |    |    |    |
| 16 |     |     |     | 2.5584 | 2.2925 | 2.0617 | 2.1966 | 2.0344 | 1.9066 | 1.9131 | 1.7538 | 1.7285 | 1.7375 | 1.7805 | 1.8577 | 1.9591 | 2.1150 | 2.2956 | 2.5110 |    |    |    |    |
| 14 |     |     | 2.5605 | 2.2604 | 1.9955 | 1.7655 | 1.8557 | 1.7042 | 1.5769 | 1.4838 | 1.4247 | 1.3995 | 1.4085 | 1.4513 | 1.5281 | 1.6390 | 1.7843 | 1.9641 | 2.1787 | 2.4283 |    |    |    |
| 12 |     |     | 2.2970 | 1.9977 | 1.7331 | 1.5045 | 1.5702 | 1.4093 | 1.2825 | 1.1897 | 1.1300 | 1.1058 | 1.1145 | 1.1572 | 1.2337 | 1.3442 | 1.4889 | 1.6680 | 1.8817 | 2.1305 | 2.4150 |    |    |
| 10 |     | 2.6319 | 2.0585 | 1.7700 | 1.5771 | 1.2782 | 1.3098 | 1.1494 | 1.0230 | 0.9306 | 0.8719 | 0.8459 | 0.8555 | 0.8979 | 0.9740 | 1.0841 | 1.2282 | 1.4067 | 1.6198 | 1.8580 | 2.1518 | 2.4719 |    |
| 8  |     | 2.4028 | 1.8751 | 1.5771 | 1.5067 | 1.0853 | 1.0840 | 0.9240 | 0.7981 | 0.7060 | 0.6475 | 0.6224 | 0.6309 | 0.6731 | 0.7489 | 0.8586 | 1.0022 | 1.1802 | 1.3928 | 1.6406 | 1.9212 | 2.2441 |    |
| 6  | 2.5791 | 2.2089 | 1.7167 | 1.4188 | 1.3141 | 0.9285 | 0.8926 | 0.7329 | 0.6073 | 0.5155 | 0.4572 | 0.4321 | 0.4405 | 0.4824 | 0.5580 | 0.6673 | 0.8105 | 0.9881 | 1.2005 | 1.4484 | 1.7322 | 2.0326 | 2.4101 |
| 4  | 2.4204 | 2.0500 | 1.9271 | 1.2951 | 1.1562 | 0.8047 | 0.7351 | 0.5758 | 0.4505 | 0.3590 | 0.3008 | 0.2757 | 0.2839 | 0.3256 | 0.4010 | 0.5100 | 0.6530 | 0.8305 | 1.0432 | 1.2916 | 1.5762 | 1.8976 | 2.2563 |
| 2  | 2.2975 | 1.9271 | 1.5932 | 1.2052 | 1.0324 | 0.8047 | 0.6115 | 0.4525 | 0.3274 | 0.2360 | 0.1778 | 0.1528 | 0.1609 | 0.2025 | 0.2777 | 0.3856 | 0.5297 | 0.7077 | 0.9123 | 1.1710 | 1.4572 | 1.7804 | 2.1410 |
| 0  | 2.2105 | 1.8394 | 1.5048 | 1.2052 | 0.9430 | 0.7150 | 0.5217 | 0.3526 | 0.2376 | 0.1463 | 0.0882 | 0.0632 | 0.0714 | 0.1128 | 0.1880 | 0.2972 | 0.4411 | 0.6204 | 0.8358 | 1.0878 | 1.3766 | 1.7024 | 2.0655 |
| -2 | 2.1600 | 1.7877 | 1.4520 | 1.1524 | 0.8885 | 0.6598 | 0.4659 | 0.3065 | 0.1812 | 0.0897 | 0.0316 | 0.0067 | 0.0150 | 0.0565 | 0.1318 | 0.2419 | 0.3876 | 0.5693 | 0.7877 | 1.0430 | 1.3354 | 1.6547 | 2.0312 |
| -4 | 2.1475 | 1.7737 | 1.4367 | 1.1338 | 0.8705 | 0.6407 | 0.4457 | 0.2853 | 0.1591 | 0.0668 | 0.0083 | 0.0168 | 0.0083 | 0.0337 | 0.1103 | 0.2224 | 0.3710 | 0.5562 | 0.7785 | 1.0378 | 1.3342 | 1.6675 | 2.0377 |
| -6 | 2.1745 | 1.7993 | 1.4607 | 1.1582 | 0.8913 | 0.6595 | 0.4527 | 0.3004 | 0.1723 | 0.0785 | 0.0187 | 0.0070 | 0.0017 | 0.0452 | 0.1243 | 0.2400 | 0.3925 | 0.5823 | 0.8091 | 1.0727 | 1.3732 | 1.7105 | 2.0847 |
| -8 | 2.2424 | 1.8555 | 1.5251 | 1.2205 | 0.9513 | 0.7172 | 0.5178 | 0.3529 | 0.2222 | 0.1257 | 0.0640 | 0.0373 | 0.0464 | 0.0919 | 0.1745 | 0.2947 | 0.4524 | 0.5473 | 0.8790 | 1.1473 | 1.4523 | 1.7939 | 2.1723 |
| -10| 2.3521 | 1.9732 | 1.6305 | 1.3236 | 1.0517 | 0.8145 | 0.6121 | 0.4438 | 0.3096 | 0.2099 | 0.1455 | 0.1174 | 0.1269 | 0.1748 | 0.2614 | 0.3867 | 0.5500 | 0.7507 | 0.9879 | 1.2613 | 1.5710 | 1.9174 | 2.3006 |
| -12|        |        | 1.9586 | 1.4683 | 1.1931 | 0.9525 | 0.7453 | 0.5742 | 0.4358 | 0.3320 | 0.2644 | 0.2348 | 0.2445 | 0.2947 | 0.3854 | 0.5159 | 0.6852 | 0.8920 | 1.1352 | 1.4141 | 1.7293 |        |        |
| -14|        | 2.1235 | 1.7783 | 1.6552 | 1.3763 | 1.1318 | 0.9214 | 0.7449 | 0.6018 | 0.4953 | 0.4222 | 0.3908 | 0.4007 | 0.4530 | 0.5474 | 0.6828 | 0.8580 | 1.0695 | 1.3295 | 1.6057 | 1.9369 |        |        |
| -16|        | 2.3169 | 1.9586 | 1.8845 | 1.6016 | 1.3527 | 1.1377 | 0.9564 | 0.8083 | 0.6950 | 0.6203 | 0.5872 | 0.5972 | 0.6510 | 0.7487 | 0.8887 | 1.0695 | 1.2889 | 1.3449 | 1.8367 | 2.1645 |        |        |
| -18|        |        | 2.2018 |        | 1.8691 | 1.6155 | 1.3956 | 1.2092 | 1.0561 | 0.9383 | 0.8602 | 0.8256 | 0.8357 | 0.8910 | 0.9910 | 1.1348 | 1.3207 | 1.5452 | 1.8088 | 2.1076 |        |        |        |
| -20|        |        |        | 2.1179 |        | 1.9205 | 1.6955 | 1.5038 | 1.3459 | 1.2243 | 1.1436 | 1.1078 | 1.1179 | 1.1740 | 1.2757 | 1.4225 | 1.6127 | 1.8437 | 2.1129 |        |        |        |        |
| -22|        |        |        |        | 2.3684 | 2.2684 | 2.0378 | 1.8409 | 1.6788 | 1.5542 | 1.4718 | 1.4353 | 1.4453 | 1.5017 | 1.6043 | 1.7531 | 1.9467 |        |        |        |        |        |        |
| -24|        |        |        |        |        |        |        | 2.2219 | 2.6559 | 1.9292 | 1.8457 | 1.8089 | 1.8188 | 1.8753 | 1.9783 | 2.1283 |        |        |        |        |        |        |        |

FIG. 18A

| X\Y | -22 | -20 | -18 | -16 | -14 | -12 | -10 | -8 | -6 | -4 | -2 | 0 | 2 | 4 | 6 | 8 | 10 | 12 | 14 | 16 | 18 | 20 | 22 |
|---|---|---|---|---|---|---|---|---|---|---|---|---|---|---|---|---|---|---|---|---|---|---|---|
| 24 | | | | | | | | | | | | | | | | | | | | | | | |
| 22 | | | | | | | | | | | | | | | | | | | | | | | |
| 20 | | | | | | | | | | | | 3.1026 | | | | | | | | | | | |
| 18 | | | | | | | | 2.8513 | 2.7245 | 2.6284 | 2.5715 | 2.5534 | 2.5715 | 2.6284 | 2.7245 | 2.8513 | | | | | | | |
| 16 | | | | | | 2.7827 | 2.5634 | 2.3778 | 2.2475 | 2.1557 | 2.1013 | 2.0839 | 2.1013 | 2.1557 | 2.2475 | 2.3778 | 2.5486 | 2.7623 | | | | | |
| 14 | | | | 2.6118 | 2.6118 | 2.3574 | 2.1477 | 1.9697 | 1.8436 | 1.7542 | 1.7010 | 1.6838 | 1.7010 | 1.7542 | 1.8436 | 1.9697 | 2.1357 | 2.3379 | 2.5866 | | | | |
| 12 | | | 2.5589 | 2.5386 | 2.2475 | 2.0029 | 1.7995 | 1.6254 | 1.5003 | 1.4107 | 1.3570 | 1.3395 | 1.3570 | 1.4107 | 1.5003 | 1.6254 | 1.7853 | 1.9843 | 2.2224 | 2.5050 | | | |
| 10 | | 2.6704 | 2.2981 | 2.2289 | 1.9474 | 1.7083 | 1.5071 | 1.3329 | 1.2056 | 1.1134 | 1.0576 | 1.0393 | 1.0576 | 1.1134 | 1.2056 | 1.3329 | 1.4945 | 1.6904 | 1.9229 | 2.1960 | 2.5158 | | |
| 8 | | 2.4540 | 2.0905 | 1.9774 | 1.7012 | 1.4537 | 1.2609 | 1.0833 | 0.9513 | 0.8547 | 0.7958 | 0.7762 | 0.7958 | 0.8547 | 0.9513 | 1.0833 | 1.2487 | 1.4453 | 1.6771 | 1.9445 | 2.2548 | 2.6151 | |
| 6 | 2.6982 | 2.2875 | 1.9300 | 1.7756 | 1.5013 | 1.2622 | 1.0551 | 0.8718 | 0.7336 | 0.6316 | 0.5590 | 0.5481 | 0.5590 | 0.6316 | 0.7336 | 0.8718 | 1.0431 | 1.2450 | 1.4772 | 1.7426 | 2.0458 | 2.3977 | |
| 4 | 2.5712 | 2.1661 | 1.8117 | 1.6175 | 1.3426 | 1.1001 | 0.8874 | 0.6971 | 0.5521 | 0.4444 | 0.3871 | 0.3558 | 0.3871 | 0.4444 | 0.5521 | 0.6971 | 0.8751 | 1.0826 | 1.3182 | 1.5840 | 1.8854 | 2.2300 | 2.6265 |
| 2 | 2.4881 | 2.0854 | 1.7331 | 1.4996 | 1.2227 | 0.9760 | 0.7574 | 0.5598 | 0.4131 | 0.2954 | 0.2256 | 0.2021 | 0.2256 | 0.2954 | 0.4083 | 0.5598 | 0.7444 | 0.9576 | 1.1972 | 1.4449 | 1.7656 | 2.1058 | 2.4974 |
| 0 | 2.4452 | 2.0457 | 1.6921 | 1.4200 | 1.1405 | 0.8895 | 0.6656 | 0.4616 | 0.3096 | 0.1895 | 0.1147 | 0.0902 | 0.1147 | 0.1873 | 0.3047 | 0.4616 | 0.6518 | 0.8599 | 1.1134 | 1.3834 | 1.6848 | 2.0246 | 2.4114 |
| -2 | 2.4451 | 2.0421 | 1.6871 | 1.3775 | 1.0952 | 0.8406 | 0.6122 | 0.4039 | 0.2477 | 0.1244 | 0.0478 | 0.0225 | 0.0483 | 0.1225 | 0.2431 | 0.4039 | 0.5982 | 0.8199 | 1.0664 | 1.3387 | 1.6414 | 1.9812 | 2.3652 |
| -4 | 2.4768 | 2.0735 | 1.7162 | 1.3705 | 1.0858 | 0.8284 | 0.5971 | 0.3873 | 0.2278 | 0.1030 | 0.0258 | 0.0000 | 0.0260 | 0.1019 | 0.2244 | 0.3873 | 0.5837 | 0.8075 | 1.0559 | 1.3300 | 1.6343 | 1.9750 | 2.3559 |
| -6 | 2.5236 | 2.1385 | 1.7779 | 1.3975 | 1.1107 | 0.8515 | 0.6189 | 0.4107 | 0.2489 | 0.1242 | 0.0475 | 0.0218 | 0.0481 | 0.1245 | 0.2475 | 0.4107 | 0.6073 | 0.8314 | 1.0805 | 1.3560 | 1.6618 | 2.0041 | 2.3905 |
| -8 | 2.5457 | 2.1385 | 1.7779 | 1.4565 | 1.1679 | 0.9078 | 0.6755 | 0.4718 | 0.3083 | 0.1853 | 0.1098 | 0.0850 | 0.1098 | 0.1879 | 0.3099 | 0.4718 | 0.6668 | 0.8899 | 1.1388 | 1.4150 | 1.7224 | 2.0668 | 2.4599 |
| -10 | 2.6487 | 2.2358 | 1.8706 | 1.5439 | 1.2554 | 0.9950 | 0.7638 | 0.5668 | 0.4020 | 0.2816 | 0.2033 | 0.1847 | 0.2033 | 0.2872 | 0.4074 | 0.5668 | 0.7592 | 0.9802 | 1.2284 | 1.5051 | 1.8142 | 2.1616 | 2.5549 |
| -12 | 2.7847 | 2.3044 | 1.9930 | 1.6640 | 1.3710 | 1.1103 | 0.8807 | 0.6916 | 0.5251 | 0.4020 | 0.3373 | 0.3154 | 0.3373 | 0.4172 | 0.5353 | 0.6916 | 0.8810 | 1.0999 | 1.3454 | 1.6248 | 1.9364 | 2.2881 | 2.6872 |
| -14 | | 2.5236 | 2.1444 | 1.8096 | 1.5131 | 1.2515 | 1.0227 | 0.8422 | 0.6733 | 0.5597 | 0.4917 | 0.4714 | 0.4990 | 0.5727 | 0.6886 | 0.8422 | 1.0291 | 1.2454 | 1.4937 | 1.7731 | 2.0888 | 2.4457 | |
| -16 | | 2.7138 | 2.3248 | 1.9821 | 1.6803 | 1.4159 | 1.1873 | 1.0151 | 0.8429 | 0.7325 | 0.6672 | 0.6484 | 0.6763 | 0.7490 | 0.8633 | 1.0151 | 1.2007 | 1.4178 | 1.6667 | 1.9499 | 2.2719 | 2.6382 | |
| -18 | | | 2.5353 | 2.1822 | 1.8725 | 1.6032 | 1.3729 | 1.2078 | 1.0314 | 0.9238 | 0.8607 | 0.8431 | 0.8710 | 0.9430 | 1.0554 | 1.2078 | 1.3940 | 1.6132 | 1.8562 | 2.1560 | 2.4872 | | |
| -20 | | | | 2.4118 | 2.0911 | 1.8140 | 1.5793 | 1.4196 | 1.2375 | 1.1317 | 1.0702 | 1.0535 | 1.0814 | 1.1531 | 1.2668 | 1.4196 | 1.6088 | 1.8331 | 2.0935 | 2.3935 | | | |
| -22 | | | | | 2.3388 | 2.0507 | 1.8086 | 1.6513 | 1.4514 | 1.3558 | 1.2951 | 1.2788 | 1.3070 | 1.3794 | 1.4948 | 1.6513 | 1.8465 | 2.0796 | 2.3316 | | | | |
| -24 | | | | | | 2.3168 | 2.0542 | 1.9060 | 1.7054 | 1.5978 | 1.5364 | 1.5204 | 1.5495 | 1.6238 | 1.7432 | 1.9060 | 2.1107 | 2.3553 | | | | | |
| | | | | | | | | 2.1364 | 1.8606 | 1.8618 | 1.7982 | 1.7820 | 1.8128 | 1.8908 | 2.0161 | 2.1882 | | | | | | | |
| | | | | | | | | | | | | 2.0697 | | | | | | | | | | | |

FIG. 18B

PROGRESSIVE SPECTACLE LENS HAVING A VARIABLE REFRACTIVE INDEX AND METHOD FOR THE DESIGN AND PRODUCTION THEREOF

CROSS REFERENCE TO RELATED APPLICATIONS

This application is a continuation application of international application PCT/EP2018/000026, filed Jan. 19, 2018, which claims priority to European patent application EP 17152384.8, filed on Jan. 20, 2017, both of which are hereby incorporated by reference in their entireties.

TECHNICAL FIELD

The disclosure relates to a product comprising a progressive power spectacle lens or representation, situated on a data medium, of the progressive power spectacle lens having a front surface, a back surface, and a spatially varying refractive index, wherein either (i) the front surface is a progressive surface or (ii) the back surface is a progressive surface, a computer-implemented method for planning a progressive power spectacle lens having an addition or a degression power with a front surface and a back surface, and having a spatially varying refractive index, and a method for manufacturing a progressive power spectacle lens by way of an additive method, as well as a computer program and a computer-readable medium storing a program for carrying out the method for planning a progressive power spectacle lens.

BACKGROUND

In spectacle lens optics, progressive power spectacle lenses have been known and prevalent for decades. Like multifocal spectacle lenses (generally bifocal and trifocal spectacle lenses), these provide additional optical power for a presbyopic user in the lower portion of the lens for the purposes of observing close objects, e.g., when reading. This additional optical power is required since the lens of the eye loses its property of being able to focus on near objects more and more with increasing age. Compared to these multifocal lenses, progressive power lenses offer the advantage of providing a continuous increase in the optical power from the distance portion to the near portion such that sharp vision is ensured not only in the distance and nearby, but also at all intermediate distances.

Pursuant to section 14.1.1 of DIN EN ISO 13666:2013-10, the distance portion is that portion of a multifocal or progressive power spectacle lens that has the dioptric power for distance vision. Accordingly, the near portion pursuant to section 14.1.3 Of this standard is that portion of a multifocal or progressive power spectacle lens that has the dioptric power for near vision.

Until now, progressive power spectacle lenses have usually been manufactured from a material with a uniform constant refractive index. This means that the dioptric power of the spectacle lens is only set by appropriate shaping of the two surfaces, adjoining the air (front or object-side surface and back or eye-side surface according to the definitions provided in sections 5.8 and 5.9 of DIN EN ISO 13666: 2013-10), of the spectacle lens. Pursuant to the definition in section 9.3 of DIN EN ISO 13666:2013-10, dioptric power is the collective term for the focusing and the prismatic power of a spectacle lens.

In order to produce the continuous increase of the focusing power in a progressive power spectacle lens made of a material with a uniform constant refractive index, a corresponding continuous change in the surface curvature must be present on at least one of the two spectacle lens surfaces, as also reflected in section 8.3.5 of the DIN EN ISO 13666:2013-10 standard, which defines the term "progressive power spectacle lens" as "lens with at least one progressive surface, that provides increasing (positive) addition power as the wearer looks down." Pursuant to section 7.7, a progressive surface is a surface, which is non-rotationally symmetrical, with a continuous change of curvature over part or all of the surface, generally intended to provide increasing addition or degression power.

WO 89/04986 A1 initially proceeds from progressive power spectacle lenses (this document uses the expression "progressive spectacle lenses") of the type set forth at the outset. From page 1, 2nd and 3rd section of the document, it is possible to gather that "the manufacturing process and, more particularly, polishing" of progressive surfaces of progressive power spectacle lenses are "difficult" on account of the surface form of the latter that "deviates very strongly from the spherical form" and that the manufactured surface deviates strongly from the calculated intended form. "Moreover, it is not possible—at least with one progressive surface—to keep the imaging aberrations and, more particularly, the astigmatism and distortion small over the entire lens."

On page 2, WO 89/04986 A1 explains further that although spectacle lenses with a changing refractive index are known, the realization of progressive spectacle lenses by replacing the complicated surface form of the progressive surface by a varying refractive index has failed in the past, presumably due to the expected similarly complicated refractive index function thereof.

WO 89/04986 A1 claims to achieve "a simplified manufacture in the case of comparable imaging properties if [ . . . ] a refractive index of the lens material that changes at least along the principal line of sight in the intermediate portion at least partly contributes to the increase in the optical power." However, this is realized under the goal of "decreasing the differences in the radii of curvature between distance portion and near portion such that, firstly, the processing of a blank with spherical boundary surfaces for the purposes of manufacturing a progressive surface is reduced" and "secondly, the polishing procedure, which substantially corresponds to that of the spherical lens in the progressive spectacle lenses according to the prior art, is simplified and the result of the polishing process is improved." This is because the use of large-area polishing tools, the polishing surfaces of which had approximately the size of the progressive surface to be polished, was usual at time of the filing date of WO 89/04986 A1.

Further, on page 5, line 15ff., the document explains: "If the astigmatism is additionally also reduced along the principal meridian as a result of the variation in the refractive index, this means that the restriction when forming the spectacle lens of the surface astigmatism having to be small along the principal meridian or the principal line of sight is dispensed with, and so the spectacle lens [ . . . ] is not subject to Minkwitz's theorem and the spectacle lens can be formed substantially more cost-effectively under other aspects."

The declared object of this document is that of obtaining polishable surfaces in a simple manner by virtue of the refractive index variation having a correspondingly complicated form. The penultimate paragraph on page 6 expressly explains: "In the extreme case, it is even possible here for both surfaces of the progressive spectacle lens to be spherical surfaces. However, it is naturally also possible to use rotationally symmetric aspherical surfaces." On the other hand, the document mentions no restrictions in respect of the complexity of the refractive index function which, according to the last sentence on page 6, can be "described by means of spline functions, for example."

The document discloses two exemplary embodiments. In the second exemplary embodiment "both the front surface and the eye-side surface are spherical surfaces" (see ibid., page 11, last sentence). In the first exemplary embodiment, the front surface has a principal meridian in the form of a circle (see ibid., page 12, lines 6-13) and, perpendicular thereto, it has the form of conic sections (see ibid., page 11, lines 6-14). The back side is spherical in the first exemplary embodiment.

In respect of the first exemplary embodiment, the document expressly refers [ . . . ] "to the fact that the correction of imaging aberrations has not been taken into account during the optimization and that, nevertheless, lenses with very good imaging properties in the lateral regions have emerged. A further improvement in the imaging properties in the regions laterally to the principal meridian are obtained by further optimization of the index function."

WO 99/13361 A1 describes a so-called "MIV" lens object, which is intended to have all functional features of progressive power lenses, specifically a distance portion, a near portion and a progressive zone, but whose edge regions should be free from astigmatic aberrations. This document describes that such a lens object may comprise a spherical front surface and a spherical back surface. The lens object should comprise a progressive zone with a refractive index that continuously increases from the distance portion to the near portion. However, as a rule, it is not possible to realize all desired additions in such an embodiment. Therefore, the document explains: "If desired, the range of additions can be bridged, in case that is impossible by the sole variable refraction index, also by manufacturing the lenses with a variable refraction index material rough block, as described above, and forming variable geometry curves as the traditional progressive lenses thus obtaining the result of having far higher performances in comparison to these latters, because the lens, having different indexes in the different areas, will allow to reach the desired addition by using much less differentiated curves between the far sight and the near sight with a reduction of the aberration area and an increase of the useful sight area."

US 2010/238400 A1 describes progressive power spectacle lenses consisting of a plurality of layers in each case. At least one of the layers may have a varying refractive index, which is described with respect to two meridians that extend orthogonal to one another. Moreover, at least one of the surfaces of one of the layers may have a progressive surface form. It describes that the refractive index profile in the horizontal direction can be used for the full correction of the by the geometry of the surfaces.

Yuki shitanoki et al: "Application of Graded-Index for Astigmatism Reduction in Progressive Addition Lens," Applied Physics Express, volume 2, 1 Mar. 2009, page 032401 describes how the astigmatism in a progressive power spectacle lens with a refractive index gradient can be reduced in relation to a progressive power spectacle lens without a refractive index gradient by a comparison of two progressive power spectacle lenses cast with the aid of the same mold.

In view of the distinguishability of the subject matter of the present patent application from the multiple layer spectacle lenses described in US 2010/238400 A1, a statement is provided herewith that spectacle lenses are regularly subject to one or more finishing processes. In particular, functional layers are applied to one or both sides. Such functional layers are layers which equip the spectacle lenses with predetermined properties, which are advantageous to the spectacle wearer and which the spectacle lenses would not have purely on the basis of the properties of the base or carrier material, onto which the functional layers are applied where necessary, and the forming. In addition to optical properties, such as an antireflection coating, silvering, light polarization, coloring, self-tinting etc., such advantageous properties also include mechanical properties, such as hardening, reduction of the adherence of dirt or reduction in steaming up, etc., and/or electrical properties such as shielding from electromagnetic radiation, conduction of electrical current, etc., and/or other physical or chemical properties. Examples of functional coatings are gathered e.g. from the documents WO 10/109154 A1, WO 01/55752 A1 and DE 10 2008 041 869 A1. These functional layers have no influence, or a negligible influence, on the dioptric properties of the spectacle lens discussed within the scope of the present patent application. The layers described in US 2010/238400 A1, by contrast, do not have a negligible effect on the dioptric power of the progressive power spectacle lens.

EP 2 177 943 A1 describes a method for optimizing an optical system such as, for example, an ophthalmic lens with the aid of a cost function. The ophthalmic lens is defined by the coefficients of the equations of all its surfaces, the refractive index of the spectacle lens and the position of each surface relative to one another (offset, rotation and inclination). In one embodiment, at least the coefficients of the equations of two optical surfaces of a working optical system are modified in order to obtain the optical system.

It is possible to gather from the document that, in general, it is difficult to optimize a lens taking account of a multiplicity of criteria of different nature if only the equation of a surface is considered to be variable. This embodiment allows optical builders to take account of a larger number of criteria in the optimization process and opens up the way for the geometric power increase of the optical system and for a better response to the physiological requirements of spectacle wearers. The use for the wearer is improved if a plurality of surfaces of the optical system are optimized at the same time.

In one embodiment, in which the optical system to be optimized comprises at least two optical surfaces, the modification of the optical working system is carried out in such a way that at least the index of the optical working system is modified. It is possible to manufacture a lens from an inhomogeneous material in which a gradient is present in the refractive index (this is known as a GRIN lens). By way of example, the distribution of the optimized index can be axial or radial and/or depend on the wavelength.

EP 0 347 917 A1 describes the spectacle lens with a front and an eye-side delimiting surface and with a changing refractive index, which contributes to the correction of the imaging aberrations. The spectacle lens is distinguished by at least a family of level surfaces with the constant refractive index, that, in the direction of their surface normals, respectively have the same distance at all points, and that, or the extension thereof, intersect the axis that connects the lens vertex of the front surface and the eye-side surface.

The document explains the variation in the refractive index is regularly used for reducing the image aberrations of single vision spectacles in the case of a specifically selected surface form and/or for reducing the central thickness.

However, it is also possible to use the gradient for producing an astigmatic and/or progressive power, with the surface form contributing nothing, or only in part, to the astigmatic and/or progressive power.

A progressive power spectacle lens with two progressive surfaces, in which the back surface is formed in such a way that the minimum of the absolute value of the mean curvature lies in the intermediate corridor can be gathered from WO 2011/093929 A1.

SUMMARY

Now, the object of the disclosure is considered that of providing a progressive power spectacle lens which, in relation to the progressive power spectacle lenses known from the prior art, has further improved optical properties for the spectacle wearer and of providing a method with which a progressive power spectacle lens with further improved optical imaging properties can be planned and manufactured.

This object is achieved by means of a progressive power spectacle lens having a front surface, a back surface, and a spatially varying refractive index, wherein either (i) the front surface is a progressive surface or (ii) the back surface is a progressive surface, and a method for planning a progressive power spectacle lens having an addition or a degression power with a front surface and a back surface, and having a spatially varying refractive index as disclosed herein.

Advantageous embodiments and developments are disclosed below.

While WO 89/04986 A1 proposes a reduction in the complexity of the required surface geometry by introducing a complicated but, counter to earlier assumptions, technically realizable refractive index distribution so as to simplify the manufacturing thereof (see ibid., page 2, fourth paragraph, last line; page 4, first paragraph, last sentence; page 5, first paragraph; page 5, second paragraph; page 5, last paragraph, last sentence; page 6, penultimate paragraph) and thus reduce the large deviations, which impair the optical properties, of the manufactured surface from the calculated surface (see ibid., page 1, 3rd paragraph), the inventors have recognized that this procedure does not necessarily lead to progressive power spectacle lenses with optical properties that are improved for the spectacle wearer. The inventors have recognized that the interplay of the degree of complexity of the geometry of the progressive surface and the degree of the complexity of the refractive index distribution is decisive. Deviating from the solution described in WO 89/04986 A1, the inventors therefore propose a product comprising a progressive power spectacle lens or a representation, situated on a data medium, of the progressive power spectacle lens. The progressive power spectacle lens comprises a front surface and a back surface and a spatially varying refractive index. The front surface or the back surface or the front and back surfaces is/are embodied as a progressive surface. The progressive power spectacle lens is distinguished according to the disclosure by virtue of the fact that the front surface embodied as a progressive surface is embodied as a free-form surface or that the back surface embodied as a progressive surface is embodied as a free-form surface. Thus, the case in which only one of the two surfaces is merely present as a free-form surface is also included.

Within the scope of the present disclosure, the expression "a representation of a progressive power spectacle lens situated on a data medium" is understood to mean, for example, a representation of the progressive power spectacle lens stored in a memory of a computer.

The representation of the progressive power spectacle lens comprises, in particular, a description of the geometric form and of the medium of the progressive power spectacle lens. By way of example, such a representation may comprise a mathematical description of the front surface, the back surface, the arrangement of these surfaces with respect to one another (including the thickness) and the edge of the progressive power spectacle lens, and the refractive index distribution of the medium from which the progressive power spectacle lens should consist. The representation can be present in encoded form or even in encrypted form. Here, medium means the material/materials or the substance used to manufacture the progressive power spectacle lens. The progressive power spectacle lens may also consist of a plurality of layers, for example also of a thin glass with a thickness of between 10 μm and 500 μm and plastic applied thereon.

Pursuant to section 5.8 of DIN EN ISO 13666:2013-10, the front surface or object-side surface of a spectacle lens is that surface of a spectacle lens which is intended to face away from the eye in the spectacles. Accordingly, pursuant to section 5.9 of this standard, the back surface is the eye-side surface, i.e., the surface of a spectacle lens which is intended to face the eye in the spectacles.

Pursuant to section 7.7 of DIN EN ISO 13666:2013-10, a progressive surface is a surface, which is non-rotationally symmetrical, with a continuous change of curvature over part or all of the surface, generally intended to provide increasing addition or degression power. A continuous change excludes jump-like changes. Generally means, particularly within the scope of the disclosure, that the addition or the degression power can be provided, although this need not be the case. In particular, the spatially varying refractive index can at least partly assume this task within the scope of the present disclosure. According to this definition, any free-form surface is a progressive surface, but the converse does not hold true.

In a broad sense, a free-form surface is understood to mean a complex surface which, in particular, can be represented exclusively by means of (in particular piecewise) polynomial functions (in particular polynomial splines such as, for example, bicubic splines, higher-order splines of fourth order or higher, Zernike polynomials, Forbes surfaces, Chebyshev polynomials, Fourier series, polynomial non-uniform rational B-splines (NURBS)). These should be distinguished from simple surfaces such as, for example, spherical surfaces, aspherical surfaces, cylindrical surfaces, toric surfaces or else the surfaces described in WO 89/04986 A1, which are described as circles, at least along the principal meridian (see ibid., page 12, line 6-13). Expressed differently, free-form surfaces cannot be represented in the form of conventional regular bodies such as, for example, spherical surfaces, aspherical surfaces, cylindrical surfaces, toric surfaces or else the surfaces described in WO 89/04986 A1 (see, e.g., www.computerwoche.de/a/die-natur-kennt-auch-nur-freiformflaechen, 1176029, retrieved on Jan. 18, 2018; www.megacad.de/kennenlernen/megacad-schulungen/schulungsinhalte/schulung-freiformflaechen.html, retrieved on Jan. 18, 2018), but for example can be represented exclusively by means of (in particular piecewise) polynomial functions (in particular polynomial splines such as, for example, bicubic splines, higher-order splines of fourth order or higher, Zernike polynomials, Forbes surfaces, Chebyshev polynomials, Fourier series, polynomial non-uniform rational B-splines (NURBS)). Accordingly, free-form surfaces are surfaces that do not correspond to regular geometry (see, e.g., www.infograph.de/de/nurbs, retrieved on Jan. 18, 2018; books.google.de/ books?id=QpugBwAAQBAJ&pg=PA101&lpg=PA101&dq =regelgeometrie+definition&source=bl&ots=CJjmQwg-hvo&sig=MvsGv0sqbAVEygCaW-JQhfJ99jw&hl=de& sa=X&ved=0ahUKEwi_jcD5y-HYAhXDXCwKHUaQC-Bw4ChDoAQgsMAI#v=onepage&q=regelgeometrie% 20definition &f=false, retrieved on Jan. 18, 2018) or that are not describable by means of forms of analytic geometry (see, e.g., books.google.de/books?id=LPzBgAAQBAJ&pg= PA26&lpg=PA26&dq=regelgeometrie+definition&source= bl&ots=e1upL5jinn&sig=hUNimu8deH5x8OvCiYsa2-42ddn8&hl=de&sa=X&ved=0ahUKEwi cD5y-HYAhXDX-CwKHUaQCBw4ChDoAQgvMAM#v=onepage&q=regel-geometrie %20definition&f=false, retrieved on Jan. 18, 2018).

The object described at the outset is achieved in its entirety by the embodiments, labeled below as variants, of a progressive power spectacle lens.

In a further configuration of the disclosure, provision is made for the free-form surface to be a free-form surface in the narrower sense, corresponding to section 2.1.2 of the DIN SPEC 58194, dated December 2015, specifically a spectacle lens surface manufactured using free-form technology, which is described mathematically within the limits of differential geometry and which is neither point symmetric nor axially symmetric.

Further particularly, the free-form surface may have no point symmetry, no axial symmetry, no rotational symmetry and no symmetry with respect to the plane of symmetry. Even though it is expedient to remove all restrictions in respect to the surface geometry, in view of currently usual requirements on the optical properties of progressive power spectacle lenses, it is sufficient to only admit free-form surfaces with a high degree of complexity as progressive surfaces. If, moreover, the same degree of complexity is admitted for the refractive index distribution over the progressive power spectacle lens, to be precise in at least two or preferably three spatial dimensions, these progressive power spectacle lenses will meet the requirements of the spectacle wearer in respect of their optical properties to the greatest possible extent.

In the case of a progressive power spectacle lens according to the disclosure with an intermediate corridor, a first variant of the disclosure consists of the front surface embodied as a free-form surface to be formed in such a way that the mean curvature has a maximum in the intermediate corridor and decreases to the periphery and/or in the downward direction. As an alternative or in addition thereto, the back surface embodied as a free-form surface can also be formed in such a way that the mean curvature has a minimum in the intermediate corridor and increases to the periphery and/or in the upward direction. Expressed differently, the front surface embodied as a free-form surface is formed in such a way that the maximum of the absolute value of the mean curvature of the front surface lies in the intermediate corridor and/or the back surface embodied as a free-form surface is formed in such a way that the minimum of the absolute value of the mean curvature of the back surface lies in the intermediate corridor.

Here, pursuant to DIN EN ISO 13666:2013-10, section 14.1.25, the intermediate corridor is the region of a progressive power spectacle lens providing clear vision for ranges intermediate between distance and near.

Such surfaces can be manufactured with very high accuracy using the currently available production processes. Advantages during the manufacturing emerge, in particular, when this surface geometry is chosen for the front surface. The abrasion due to polishing when currently conventional polishing tools, whose at least approximately spherical polishing surface corresponds to approximately a third of the spectacle lens surface to be polished, are used can be kept sufficiently homogeneous over the spectacle lens surface to be polished such that the deviation from the calculated spectacle lens geometry is comparatively small. Consequently, the deviation of the actual optical properties from the calculated optical properties of the spectacle lens is very small.

A further variant of the disclosure is characterized in that the progressive power spectacle lens according to the disclosure is formed in such a way that it has more advantageous optical properties described below for the progressive power spectacle wearer in relation to a comparison progressive power spectacle lens, which has no spatial refractive index variation but an identical distribution of the spherical equivalent.

A statement that a spectacle lens is designed for a predetermined arrangement in front of an eye of a spectacle lens wearer and for one or more predetermined object distances, at which the spectacle lens wearer should perceive an object in focus, is provided for explanatory purposes. The spectacle lens is worthless or the optical quality is very restricted for the spectacle wearer in the case of an arrangement deviating therefrom in front of the eye of the spectacle wearer and for other object distances. This applies even more to progressive power spectacle lenses. Accordingly, a progressive power spectacle lens is only characterized by way of the knowledge of the predetermined arrangement in front of the eye of the spectacle wearer. Expressed differently, the knowledge of the arrangement of the spectacle lens in terms of location and alignment in space in relation to the eye is necessary but also sufficient to characterize the spectacle lens in one-to-one fashion in terms of the optical power thereof for the spectacle wearer. Moreover, an optician is only able to insert the spectacle lens into a spectacle frame with the correct positioning if they are aware of the arrangement of the spectacle lens in terms of location and alignment in relation to the eye of the spectacle wearer. A representation of the predetermined arrangement of the progressive power spectacle lens in front of an eye of a progressive power spectacle wearer, for whom the progressive power spectacle lens is intended, is therefore an inseparable component of the product or of the commercial ware of a "progressive power spectacle lens."

For the purposes of ensuring an arrangement with the correct position and orientation in the progressive power spectacle lens by the optician, the manufacturer attaches permanently present markings. From DIN EN ISO 13666: 2013-10, section 14.1.24, it is possible to gather that these are referred to as markings for the alignment or permanent markings and that these were attached by the manufacturer to establish the horizontal alignment of the lens [ . . . ] or to re-establish other reference points. Pursuant to section 6.1 of DIN EN ISO 14889:2009, the manufacturer of uncut finished spectacle lenses must facilitate an identification by statements on the individual packaging or in an accompanying document. In particular, there should be correction values for use situations, the near addition power, the type designation or the brand name and the necessary information to measure the addition power. The underlying object distance model used by the manufacturer of the progressive power spectacle lens emerges from the type designation or the brand name. According to 3.1 of this standard, the manufacturer should be understood to be a natural person or legal entity who commercially distributes the uncut finished spectacle lens.

In this variant according to the disclosure, the product further comprises a representation, situated on a data medium, of a predetermined arrangement of the progressive power spectacle lens in front of an eye of a progressive power spectacle wearer, for whom the progressive power spectacle lens is intended. As already explained, the progressive power spectacle lens embodied according to the disclosure (not only) in this variant has a distribution of a spherical equivalent for the predetermined arrangement of the progressive power spectacle lens in front of the eye of the progressive power spectacle wearer, for whom the progressive power spectacle lens is intended. Further, the progressive power spectacle lens embodied according to the disclosure comprises an intermediate corridor with a width. The progressive power spectacle lens according to the disclosure designed according to this variant has a refractive index which varies in space in such a way that the width of the intermediate corridor of the progressive power spectacle lens, at least in a section or over the entire length of the intermediate corridor, is greater than the width of the intermediate corridor of a comparison progressive power spectacle lens, of the same prescription, with the same distribution of the spherical equivalent in the case of the same arrangement of the comparison progressive power spectacle lens in front of the eye of the progressive power spectacle wearer, but with a spatially non-variable refractive index.

Here, the term "spherical equivalent" is defined as the arithmetic mean of the focusing power, as emerges, for example, from Albert J. Augustin: Augenheilkunde. 3rd, completely reworked and extended edition. Springer, Berlin et. al. 2007, ISBN 978-3-540-30454-8, p. 1272 or Heinz Diepes, Ralf Blendowske: Optik and Technik der Brille. 1st edition, Optische Fachveröffentlichung GmbH, Heidelberg 2002, ISBN 3-922269-34-6, page 482:

$$\text{spherical equivalent} = \text{sphere} + \tfrac{1}{2} \times \text{cylinder}$$

Pursuant to section 9.2 of DIN EN ISO 13666:2013-10, focal power is the collective term for the spherical and astigmatic powers of a spectacle lens. In the equation, the spherical power is abbreviated by "sphere" in the equation; the astigmatic power is represented by "cylinder." The term mean spherical power is also used for the term of spherical equivalent.

Here, pursuant to DIN EN ISO 13666:2013-10, section 14.1.25, the intermediate corridor—as already explained above—is the region of a progressive power spectacle lens providing clear vision for ranges intermediate between distance and near. The principal line of sight, which represents the totality of all visual points through the progressive surface during the gazing movement of the eye on object points straight in front of a spectacle wearer from distance to near, extends through the center of the intermediate channel. The principal line of sight is regularly assumed on the front surface. Expressed differently, the principal line of sight denotes that line on the front surface of a spectacle lens that interconnects the principal visual points through the progressive power lens for distance and near vision and on which the intersection points of the visual rays for intermediate distances lie in the "straight-ahead" direction (Note: the use of the back surface as a reference surface on which the principal line of sight lies is rather unusual). Regularly, the principal line of sight is a line extending approximately perpendicular in the distance and near portion and a line extending in twisted fashion in the intermediate corridor, i.e., the portion of the progressive power spectacle lens that has the dioptric power for vision at ranges intermediate between distance and near. By way of example, the length of the intermediate corridor can arise from the positions of the distance and near design reference points or from the positions of the distance and near reference points. Pursuant to 5.13 of DIN EN ISO 13666:2013-10, the distance design reference point is that point, stipulated by the manufacturer, on the front surface of a finished lens or on the finished surface of a lens blank, at which the design specifications for the distance portion apply. Accordingly, pursuant to 5.14 of this standard, the near design reference point is that point, stipulated by the manufacturer, on the front surface of a finished lens or on the finished surface of a lens blank, at which the design specifications for the near portion apply. Pursuant to 5.15, the distance reference point or the major reference point is that point on the front surface of the lens at which the dioptric power for the distance portion applies and, pursuant to 5.17, the near visual point is the assumed position of the visual point on a lens, which is used for near vision under given conditions.

In principle, the properties of the progressive power spectacle lens can be set and determined one-to-one in relation to a comparison progressive power spectacle lens on the basis of the specifications provided above. A simple criterion arises if the assumption is made that the at least one section is a variant of the group:

horizontal section,
section at half addition (more particularly on the principal line of sight),
horizontal section at half addition (more particularly on the principal line of sight),
horizontal section at half addition (more particularly on the principal line of sight) and horizontal section at 25% of the addition (more particularly on the principal line of sight),
horizontal section at half addition (more particularly on the principal line of sight) and horizontal section at 75% of the addition (more particularly on the principal line of sight),
horizontal section at half addition (more particularly on the principal line of sight) and horizontal section at 25% of the addition (more particularly on the principal line of sight) and horizontal section at 75% of the addition (more particularly on the principal line of sight).

In section 14.2.1, DIN EN ISO 13666:2013-10 defines the addition power as a difference between the vertex power of the near portion and the vertex power of the distance portion, measured under specified conditions. This standard specifies that corresponding measuring methods are contained in the decisive standard for spectacle lenses. As the decisive standard, DIN EN ISO 13666:2013-10 refers to DIN EN ISO 8598-1:2012: "Optics and optical instruments—Focimeters—Part 1: General purpose instruments." In DIN EN ISO 13666:2013-10, section 9.7, the vertex power is defined as follows. A distinction is made between the back vertex power, defined as the reciprocal of the paraxial back vertex focal length measured in meters, and the front vertex power, defined as the reciprocal of the paraxial front vertex focal length measured in meters. It is noted that, according to ophthalmic convention, the back vertex power is specified as the "power" of a spectacle lens but the front vertex power is, however, required for certain purposes, e.g. in the measurement of addition power in some multifocal and progressive power spectacle lenses.

A further variant of defining the properties of the progressive power spectacle lens by way of a comparison with the properties of a comparison progressive lens spectacle lens one-to-one with predetermined properties, namely the same distribution of the spherical equivalent over the lens under the same position of the spectacle lens in front of the eye of the same progressive power spectacle wearer on the basis of the same object distance model, consists of the product further comprising
(i) a representation, situated on a data medium, of a residual astigmatism distribution for the predetermined arrangement of the progressive power spectacle lens in front of the eye of the progressive power spectacle wearer, for whom the progressive power spectacle lens is intended, and/or
(ii) a representation, situated on a data medium, of an astigmatic power distribution, required for a full correction, for the predetermined arrangement of the progressive power spectacle lens in front of the eye of the progressive power spectacle wearer, for whom the progressive power spectacle lens is intended, and/or
(iii) a representation, situated on a data medium, of a prescription and an object distance model for the predetermined arrangement of the progressive power spectacle lens in front of the eye of a progressive power spectacle wearer, for whom the progressive power spectacle lens is intended, and/or
(iv) a representation, situated on a data medium, of a distribution of the spherical equivalent for the predetermined arrangement of the progressive power spectacle lens in front of the eye of the progressive power spectacle wearer, for whom the progressive power spectacle lens is intended.

In this variant of the progressive spectacle lens according to the disclosure comprising a distance portion and a near portion, the width of the intermediate corridor is defined by the dimension transverse to a longitudinal direction of the intermediate corridor extending between the distance portion and near portion, within which the absolute value of the residual astigmatism lies below a predetermined limit value, which is selected within a range from the group specified below:
(a) the limit value lies in the range between 0.25 dpt and 1.5 dpt,
(b) the limit value lies in the range between 0.25 dpt and 1.0 dpt,
(c) the limit value lies in the range between 0.25 dpt and 0.75 dpt,
(d) the limit value lies in the range between 0.25 dpt and 0.6 dpt,
(e) the limit value lies in the range between 0.25 dpt and 0.5 dpt,
(f) the limit value is 0.5 dpt.

Residual astigmatism is understood to be the astigmatism (according to absolute value and axis direction) by which the astigmatism or the astigmatic power of the progressive power spectacle lens deviates from the astigmatic power required for a full correction at the respective location on a progressive power spectacle lens surface for a beam intersecting the progressive power spectacle lens at this location for the progressive power spectacle wearer, for whom the progressive power spectacle lens is intended, when the progressive power spectacle wearer wears the progressive power spectacle lens as intended (such that it is arranged in front of the eye of the progressive power spectacle wearer in predetermined fashion). The term "distribution" clarifies that this residual astigmatism can be different locally over the spectacle lens and, as a rule, will also be different.

Expressed differently, a residual astigmatism is understood to mean the deviation of the astigmatic power (actual astigmatic power) of the progressive power spectacle lens from the "prescribed" astigmatic power in respect of absolute value and axis position. Expressed differently, the residual astigmatism is the difference, depending on the direction of view, between the actual astigmatic power and the intended astigmatic power for the wearer of the progressive power spectacle lens in the use position. In the use position, the position and orientation of the spectacle lens with respect to the eye when used as intended is taken into account. The direction of view-dependence of the astigmatic power can result, in particular, from the direction of view-dependence of the object distance and the direction of view-dependence of the astigmatic power of the eye. The expression "prescribed power" should therefore be understood in the broadest sense as an intended power that the spectacle lens should have on account of its underlying position and orientation in relation to the eye, for the respective direction of view and the distance at which the spectacle wearer should see the object in focus for this direction of view.

For the specific calculation of the residual astigmatism distribution (or other aberration distributions, such as, e.g., the spherical aberration distribution or other aberration distributions of higher order described in, e.g., EP 2 115 527 B1 or actual power distributions, such as, e.g., the actual astigmatic power, the actual spherical power or the actual prismatic power), the vertex distance, the pupillary distance, the pantoscopic tilt of the spectacle lens, the face form angle of the spectacle lens and the spectacle lens size, including, in particular, the thickness and/or the edge (edge profile), too, for example, are regularly taken into account. Furthermore, this is regularly based on an object distance model which describes the position of object points in the spectacle wearer's field of view relative to the centers of rotation of the wearer's eyes.

The residual astigmatism distribution can already be present as a calculated mathematical description (like in case (i)) or it can be ascertained from the prescription and an object distance model (like in case (iii)) or from an already calculated astigmatic power distribution for a full correction (like in case (ii)).

In addition to conventional refraction values, the prescription may also comprise further physiological parameters inherent to the spectacle wearer (i.e., generally those parameters that are inherent to the spectacle wearer) and the use conditions (i.e., generally those parameters that are assignable to the surroundings of the spectacle wearer) under which the prescribed progressive power spectacle lens should be worn. The inherent physiological parameters include, inter alia, the refractive error, the accommodation capability and the (possibly monocular) pupillary distance of the spectacle wearer. The use conditions include information about the seat of the lenses in front of the eye and also data that characterize the object distance model, such as, e.g., whether these should be spectacles for working in front of a screen, which are based on a distance deviating from infinity for the distance direction of view of an object, specifically the screen. Certain standard values are assumed for the case where the individually measured or determined prescription does not contain certain use conditions (e.g., a standard pantoscopic tilt of 9°).

The object distance model is understood to mean an assumption for distances in space at which the spectacle wearer should see objects in focus. The object position is generally related to the center of rotation of the eyes in the object distance model, as already explained above.

The model calculation can take account of the fact that the power and axis position of the eye changes in the case of different object differences and directions of view. In particular, the model calculation can take account of Listing's law. By way of example, the model calculation can also take account of the change in the astigmatic power of the eye for near and distance, for example in the way described in DE 10 2015 205 721 A1.

Within the scope of the present disclosure, a full correction describes a correction caused by wearing the progressive power spectacles as intended which, taking account of the visual properties of their eye represented by the prescription, allows the progressive power spectacle wearer to see in focus objects arranged at the distances on which the object distance model is based.

For the sake of completeness, reference is made to the fact that the data medium on which the predetermined representation is situated may also be, for example, a sheet of paper instead of a memory of a computer. This relates, in particular, to the aforementioned case (iii), in which the prescription may also be noted on a sheet of paper.

A further embodiment of the product according to the disclosure comprises the following constituent parts:
a representation, situated on a data medium, of a predetermined arrangement of the progressive power spectacle lens in front of an eye of a progressive power spectacle wearer, for whom the progressive power spectacle lens is intended, and one or more of the following representations on a data medium:
  (i) a representation, situated on a data medium, of a residual astigmatism distribution for the predetermined arrangement of the progressive power spectacle lens in front of the eye of the progressive power spectacle wearer, for whom the progressive power spectacle lens is intended, and/or
  (ii) a representation, situated on a data medium, of an astigmatic power distribution, required for a full correction, for the predetermined arrangement of the progressive power spectacle lens in front of the eye of the progressive power spectacle wearer, for whom the progressive power spectacle lens is intended, and/or
  (iii) a representation, situated on a data medium, of a prescription and an object distance model for the predetermined arrangement of the progressive power spectacle lens in front of the eye of a progressive power spectacle wearer, for whom the progressive power spectacle lens is intended, and/or
  (iv) a representation, situated on a data medium, of a distribution of the spherical equivalent for the predetermined arrangement of the progressive power spectacle lens in front of the eye of the progressive power spectacle wearer, for whom the progressive power spectacle lens is intended.

The progressive power spectacle lens according to this embodiment has a distribution of a spherical equivalent for the predetermined arrangement of the progressive power spectacle lens in front of the eye of the progressive power spectacle wearer, for whom the progressive power spectacle lens is intended. In this embodiment, the refractive index of the progressive power spectacle lens varies in space in such a way that the maximum value of the residual astigmatism of the progressive power spectacle lens is less than the maximum value of the residual astigmatism of a comparison progressive power spectacle lens, for the same prescription, with the same distribution of the spherical equivalent in the case of the same arrangement of the comparison progressive power spectacle lens in front of the eye of the progressive power spectacle wearer, but with a spatially non-variable refractive index.

According to this embodiment of the disclosure, the optical properties of the progressive power spectacle lens perceivable by the spectacle wearer are improved over all conventional progressive power spectacle lenses.

Another variant of the product according to the disclosure comprises the constituent parts specified below:
a representation, situated on a data medium, of a predetermined arrangement of the progressive power spectacle lens in front of an eye of a progressive power spectacle wearer, for whom the progressive power spectacle lens is intended,
at least one of the following representations on a data medium:
  (i) a representation, situated on a data medium, of a residual astigmatism distribution for the predetermined arrangement of the progressive power spectacle lens in front of the eye of the progressive power spectacle wearer, for whom the progressive power spectacle lens is intended, and/or
  (ii) a representation, situated on a data medium, of an astigmatic power distribution, required for a full correction, for the predetermined arrangement of the progressive power spectacle lens in front of the eye of the progressive power spectacle wearer, for whom the progressive power spectacle lens is intended, and/or
  (iii) a representation, situated on a data medium, of a prescription and an object distance model for the predetermined arrangement of the progressive power spectacle lens in front of the eye of a progressive power spectacle wearer, for whom the progressive power spectacle lens is intended, and/or
  (iv) a representation, situated on a data medium, of a distribution of the spherical equivalent for the predetermined arrangement of the progressive power spectacle lens in front of the eye of the progressive power spectacle wearer, for whom the progressive power spectacle lens is intended.

The progressive power spectacle lens according to this embodiment variant has a distribution of a spherical equivalent for the predetermined arrangement of the progressive power spectacle lens in front of the eye of the progressive power spectacle wearer, for whom the progressive power spectacle lens is intended. The progressive power spectacle lens comprises an intermediate corridor. The refractive index of the progressive power spectacle lens varies in space in such a way that, for a predetermined residual astigmatism value $A_{Rest,Grenz}$ from the group
  (a) the residual astigmatism value $A_{Rest,Grenz}$ lies in the range between 0.25 dpt and 1.5 dpt,
  (b) the residual astigmatism value $A_{Rest,Grenz}$ lies in the range between 0.25 dpt and 1.0 dpt,
  (c) the residual astigmatism value $A_{Rest,Grenz}$ lies in the range between 0.25 dpt and 0.75 dpt,
  (d) the residual astigmatism value $A_{Rest,Grenz}$ lies in the range between 0.25 dpt and 0.6 dpt,
  (e) the residual astigmatism value $A_{Rest,Grenz}$ lies in the range between 0.25 dpt and 0.5 dpt,
  (f) the residual astigmatism value $A_{Rest,Grenz}$ is 0.5 dpt
on a horizontal section at the narrowest point of the intermediate corridor (e.g., where the isoastigmatism lines for 1 dpt have the smallest distance from one another) or on a horizontal section through the point on the principal line of sight at which the half addition is achieved, the following relationship applies within a region with a horizontal distance of 10 mm on both sides of the principal line of sight:

$$B > c \times \frac{A_{Rest,Grenz}}{\operatorname{grad} W}$$

where grad W describes the power gradient of the spherical equivalent of the progressive power spectacle lens at the point on the principal line of sight at the narrowest point of the intermediate corridor or in the point on the principal line of sight at which the half addition is achieved, B describes the width of the region in the progressive power spectacle lens in which the residual astigmatism is $A_{Rest} \leq A_{Rest,Grenz}$, where c is a constant selected from the group:
  (a) 1.0<c
  (b) 1.1<c
  (c) 1.2<c
  (d) 1.3<c.

According to this embodiment of the disclosure, the optical properties of the progressive power spectacle lens perceivable by the spectacle wearer are improved over all conventional progressive power spectacle lenses.

A further variant of a product according to the disclosure comprises a progressive power spectacle lens or a representation, situated on a data medium, of the progressive power spectacle lens, wherein the progressive power spectacle lens has a front surface and back surface and a spatially varying refractive index. The front surface or the back surface or both surfaces are embodied as progressive surfaces. The front or surface embodied as progressive surface is embodied according to the disclosure as a free-form surface and/or the back surface embodied as a progressive surface is embodied according to the disclosure as a free-form surface.

The progressive power spectacle lens consists of a substrate comprising no individual layers, and a front surface coating, comprising one or more individual layers, on the front surface of the substrate and/or a back surface coating, comprising one or more individual layers, on the back surface of the substrate. Only the substrate has the spatially varying refractive index.

According to the disclosure, a difference between the spherical equivalent measured at each point on the front surface of the progressive power spectacle lens with the front surface coating and/or the back surface coating and the spherical equivalent measured at each corresponding point on the front surface of a comparison progressive power spectacle lens without front surface coating and without back surface coating but with an identical substrate (with identical geometry and identical refractive index) is less than a value from the group specified below:
  (a) the difference value is less than 0.001 dpt
  (b) the difference value is less than 0.002 dpt
  (c) the difference value is less than 0.003 dpt
  (d) the difference value is less than 0.004 dpt.

Naturally, this variant may also have one or more of the features described above.

There are statements above to the effect of the inventors having recognized that the interplay of the degree of complexity of the geometry of the progressive surface and the degree of the complexity of the refractive index distribution is decisive. Thus, deviating from the solution described in WO 89/04986 A1, they propose a computer-implemented method, in the form of a ray tracing method, for planning a progressive power spectacle lens having a front surface and a back surface and a spatially varying refractive index, in which the front surface or the back surface or both surfaces are embodied as progressive surfaces. Optical properties of the progressive power spectacle lens are calculated by means of the ray tracing method at a plurality of evaluation points, at which visual rays pass through the progressive power spectacle lens. In this ray tracing method, at least one intended optical property for the progressive power spectacle lens is set at the respective evaluation point. Initially, a plan for the progressive power spectacle lens is set, wherein this plan comprises a representation of a local surface geometry of the progressive surface and a local refractive index of the progressive power spectacle lens in the respective visual beam path through the evaluation points. The plan of the progressive power spectacle lens is modified in view of an approximation of the at least one intended optical property of the progressive power spectacle lens. According to the disclosure, the modification comprises not only modification of the representation of the local surface geometry of the progressive surface but also modification of the local refractive index of the progressive power spectacle lens in the respective visual beam path through the evaluation points, wherein the at least one intended optical property comprises an intended residual astigmatism of the progressive power spectacle lens.

As a rule, the surface lying opposite the modified progressive surface is fixedly prescribed. In general, the former comprises a simple surface geometry, such as, e.g., a spherical, rotationally symmetric aspherical or toric geometry. In the case of a toric surface, the surface geometry and axis position are frequently chosen in such a way that (apart from an unwanted residual astigmatism) they compensate the astigmatic refraction deficit of the eye of the progressive power spectacle wearer. The surface lying opposite the modified progressive surface can also be a progressive surface, optionally a free-form surface, too, with a fixedly prescribed surface geometry. The former surface can contribute to the increase in power required for providing the addition. The modified progressive surface, too, can contribute to the increase in power required for providing the addition. It is also possible for both surfaces, specifically the front surface and back surface, to be modified together with the refractive index distribution for the purposes of approximating the intended residual astigmatism distribution.

Ray tracing methods for use when planning progressive power spectacle lenses are known. In particular, reference is made to Werner Koppen: Konzeption and Entwicklung von Progressivgläsern, in Deutsche Optiker Zeitung DOZ 10/95, pages 42-46 as well as EP 2 115 527 B1 and the documents specified therein. taken into account. The calculation of optimized spatially dependent refractive index distributions by means of optical computing programs, for example the computing program ZEMAX by Zemax, LLC, is likewise known. By way of example, reference is made to their Internet presence at www.zemax.com/.

Setting intended properties for a spectacle lens relates to the so-called design of a spectacle lens. A design of a spectacle lens usually comprises the distribution of the intended values for one or more imaging aberrations, which preferably are included in the optimization of the spectacle lens as target values or when determining the target values In particular, a spectacle lens design is characterized by the distribution of the refractive error (i.e., the difference between the spherical equivalent of the progressive power spectacle lens in the beam path in the use position and the spherical equivalent ascertained by determining refraction)

and/or the distribution of the residual astigmatism (i.e., the difference between the astigmatism of the spectacle lens and the astigmatism which is ascertained by determining the refraction). Instead of the term residual astigmatism distribution, the literature also uses the terms of astigmatic aberration distribution and astigmatic deviation. Further, a spectacle lens design may likewise comprise the distribution of the intended values for magnification, distortion or other imaging aberrations, more particularly higher order imaging aberrations, as described in EP 2 115 527 B1. Here, these may relate to surface values or, preferably, use values, i.e., values in the use position of the spectacle lens.

According to the disclosure, the plan of the progressive power spectacle lens is modified with the target of coming as close as possible to the predetermined intended residual astigmatism. By way of example, the intended residual astigmatism can be set to be zero at all evaluation points. Thus, it is possible to predetermine a residual astigmatism distribution that preferably has far smaller values than those that are even achievable by means of a conventional progressive power spectacle lens with a spatially non-varying refractive index but free-formed back surface (and/or front surface) or that are predetermined for the optimization of such a progressive power spectacle lens. The number of evaluation points, according to Werner Koppen: Konzeption and Entwicklung von Progressivglasern, in Deutsche Optiker Zeitung DOZ 10/95, pages 42-46, typically lies in the range between 1000 and 1500. EP 2 115 527 B1 proposes that the evaluation points number more than 8000.

In order to come as close as possible to this target, it is, according to the disclosure, not only the surface geometry of the (subsequent) progressive surface that is locally modified at the evaluation point, but also the local refractive index in the medium of the progressive power spectacle lens, passed by the beam path, at the evaluation point. The medium is understood to mean the material or materials that make up the progressive power spectacle lens.

In order to come as close to the target as possible, this procedure of modifying must, as a rule, be carried out multiple times, i.e., iteratively. Here, it should once again be clarified that both the local surface geometry and the local refractive index can vary freely and neither the local surface geometry nor the local refractive index is fixed during the modification, in particular during the iteration. By contrast, WO 89/04986 A1 teaches the prescription of comparatively simple geometries for the front and back surface and the search for a suitable refractive index distribution in order to establish the power increase necessary for providing the addition and, optionally, in order to wholly or partly rectify the (residual) astigmatism along the principal line of sight and further undertake corrections of imaging aberrations to the side of the principal meridian where necessary.

Even though, as a rule, the refractive index is wavelength-dependent, dispersion is generally not taken into account and the calculation is implemented for a so-called design wavelength. However, an optimization process taking account of different design wavelengths, as described in EP 2 383 603 B1, for example, is not precluded.

Since the modification is carried out with the target of coming as close as possible to intended optical properties, a person skilled in the art also talks about an optimization. The modification is carried out until a termination criterion is satisfied. In the ideal case, the termination criterion consists of the planned progressive power spectacle lens having the predetermined intended optical properties. In the case where the residual astigmatism is set to be zero at all evaluation points, this ideal case would be that the residual astigmatism of the calculated spectacle lens is in fact a zero at all evaluation points. However, since this will regularly not be the case, particularly in the described case, there is a termination of the calculation, e.g., after reaching one or more limit values in the surroundings of the intended property (properties) or after reaching a predetermined number of iterations.

Usually the ascertainment of the intended properties and the calculation of the actual properties is based on model calculations that take account of the use conditions, specifically, e.g., the seat of the spectacle lenses in front of the eye and an object distance model, and physiological parameters of the spectacle wearer, specifically, e.g., the refractive error, the accommodation capability and the pupillary distance. Details were already described above.

As a rule, the result of the approximation of the at least one intended optical property (properties) of the progressive power spectacle lens by modifying the local refractive index and the local surface geometry is that the front surface embodied as a progressive surface is embodied as a free-form surface and/or that the back surface embodied as a progressive surface is embodied as a free-form surface.

The object stated at the outset is achieved in its entirety by the method according to the disclosure described above.

An embodiment variant of this method according to the disclosure is characterized in that the modification of the plan of the progressive power spectacle lens is implemented in view of a minimization of a target function. Such a target function is also referred to as "Kostenfunktion" in the German literature and as merit function in the English literature. When planning progressive power spectacle lenses, the method of least squares is very frequently applied is a method for minimizing a target function, as practiced, for example, in EP 0 857 993 B2, EP 2 115 527 B1 or else Werner Koppen: Konzeption and Entwicklung von Progressivglasern, in Deutsche Optiker Zeitung DOZ 10/95, pages 42-46. The embodiment variant according to the disclosure applies this method with the target function reproduced below:

$$F = \Sigma_m P_m \Sigma_n W_n (T_n - A_n)^2.$$

In this target function F, $P_m$, is the weighting at the evaluation point m, $W_n$ is the weighting of the optical property n, $T_n$ is the intended value of the optical property n at the respective evaluation point m and $A_n$ is the actual value of the optical property n at the evaluation point m.

The application of this method has proven its worth for planning conventional type progressive power spectacle lenses. The disclosure proposes to also use this method for planning gradient index (GRIN) progressive power spectacle lenses according to the disclosure.

A particularly advantageous embodiment variant of the method according to the disclosure is characterized in that an intended residual astigmatism is predetermined for at least one evaluation point, the intended residual astigmatism being less than the theoretically achievable residual astigmatism at the at least one corresponding evaluation point on a comparison progressive power spectacle lens, for the same prescription, with the same distribution of the spherical equivalent and the same arrangement of the comparison progressive power spectacle lens in front of the eye of the progressive power spectacle wearer, but with a spatially non-variable refractive index, and in that modifying the representation of the local surface geometry of the progressive surface and of the local refractive index of the progressive power spectacle lens in the respective visual beam path through the evaluation points is only terminated if the residual astigmatism at the at least one evaluation point, achieved for the planned progressive power spectacle lens, is less than the theoretically achievable residual astigmatism at the at least one corresponding evaluation point on the comparison progressive power spectacle lens.

It is possible—as already explained above—to set the intended residual astigmatism to be zero at all evaluation points. In order to plan a progressive power spectacle lens that, over the entire surface, has better optical properties than a conventional comparison progressive power spectacle lens, the intended residual astigmatism at all evaluation points will be chosen to be lower, at least by significant percentage of, e.g., 10-50%, than what is usually set when planning the comparison progressive power spectacle lens. In general, at least at the evaluation points, an intended residual astigmatism will be predetermined that is less than the theoretically achievable residual astigmatism at the at least corresponding evaluation points in the comparison progressive power spectacle lens that should lie within the subsequent intermediate corridor. This is because a broadening of the intermediate corridor is always desirable.

As an alternative or in addition to the advantageous embodiment variant described above, one method variant consists in carrying out a modification of the representation of the local surface geometry of the progressive surface and of the local refractive index of the progressive power spectacle lens in the respective visual beam path through the evaluation points with the stipulation that the maximum value of the residual astigmatism of the progressive power spectacle lens is less than the maximum value of the residual astigmatism of a comparison progressive power spectacle lens, for the same prescription, with the same distribution of the spherical equivalent and the same arrangement of the comparison progressive power spectacle lens in front of the eye of the progressive power spectacle wearer, but with a spatially non-variable refractive index. In principle, the maximum value for the residual astigmatism in the progressive power spectacle lens planned according to the disclosure need not be placed at the "same" location or the "same" evaluation point as the maximum value for the residual astigmatism in the comparison progressive power spectacle lens. However, this may also be considered as a constraint when carrying out the method. As a result of these prescriptions, the optical properties of the progressive power spectacle lens according to the disclosure are further improved in relation to a comparison progressive power spectacle lens that was manufactured in a conventional way.

In one embodiment variant, the method according to the disclosure can be carried out in such a way that, when planning the progressive power spectacle lens, a progressive power spectacle lens corresponding to a product of the above-described types arises. The advantages of these products were already described in detail above.

In a further method variant according to the disclosure, provision is even made for the progressive power spectacle lens to be planned precisely with the stipulation of producing a progressive power spectacle lens according to a product according to any one of the types described above. The intended properties and the termination conditions in this further variant are chosen in such a way that the corresponding progressive power spectacle lens with the above-described optical properties necessarily arises in the arrangement in front of the eye of the future spectacle wearer, as predetermined by the representation, when carrying out planning.

Further, the disclosure provides a computer program with program code for carrying out all of the process steps according to any one of the above-described methods when the computer program is loaded onto a computer and/or run on a computer. The computer program can be saved on any computer-readable medium, in particular on a hard disk drive of a computer, on a USB stick or else in a cloud.

Accordingly, the disclosure also seeks protection for a computer-readable medium with a computer program of the type described above.

The disclosure also relates to a method for manufacturing, by way of an additive method, a progressive power spectacle lens according to any one of the products described above or a progressive power spectacle lens planned using a method of the above-described variants.

Additive methods are methods in which the progressive power spectacle lens is constructed sequentially. Particularly in this context, it is known that so-called digital fabricators, in particular, offer manufacturing options for virtually any structure, the structures not being realizable or only being realizable with difficulty using conventional abrasive methods. Within the digital fabricator machine class, 3D printers represent the most important subclass of additive, i.e., accumulating, building fabricators. The most important techniques of 3D printing are selective laser melting (SLM) and electron-beam melting for metals and selective laser sintering (SLS) for polymers, ceramics and metals, stereolithography (SLA) and digital light processing for liquid artificial resins and multijet or polyjet modeling (e.g., inkjet printers) and fused deposition modeling (FDM) for plastics and, in part, artificial resins. Further, construction with the aid of nanolayers is also known, as described, for example, at peaknano.com/wp-content/uploads/PEAK-1510-GRIN-Optics-Overview.pdf, retrieved on Jan. 12, 2017.

Source materials for manufacturing by means of 3D printing and options for the 3D manufacturing method itself can be gathered from, for example, the European patent application number 16195139.7.

A development of the disclosure consists in a method for manufacturing a progressive power spectacle lens comprising a method for planning a progressive power spectacle lens as described above and manufacturing the progressive power spectacle lens according to the plan.

Manufacturing the progressive power spectacle lens according to the plan can, according to the disclosure, once again be implemented by an additive method.

Another development of the disclosure consists in a computer with a processor configured to carry out a method for planning a progressive power spectacle lens according to any one of the above-described types or variants.

BRIEF DESCRIPTION OF THE DRAWINGS

The disclosure is described in greater detail below with reference to the drawings. In the figures:

FIG. 6 shows a comparison of the contour of the front surface of the GRIN progressive power spectacle lens according to the first exemplary embodiment with the contour of the front surface of the comparison progressive power spectacle lens
   (1) a: sagittal heights of the front surface of the comparison progressive power spectacle lens
   (2) b: sagittal heights of the front surface of the GRIN progressive power spectacle lens according to the disclosure according to the first exemplary embodiment.

FIG. 12 shows a comparison of the contour of the front surface of the GRIN progressive power spectacle lens according to the second exemplary embodiment with the contour of the front surface of the comparison progressive power spectacle lens; the sagittal heights are specified in relation to a plane tilted through −7.02° about the horizontal axis
   (1) a: sagittal heights of the front surface of the GRIN progressive power spectacle lens according to the disclosure according to the second exemplary embodiment
   (2) b: sagittal heights of the front surface of the comparison progressive power spectacle lens

(1) a: residual astigmatism distribution of the comparison progressive power spectacle lens (2) b: residual astigmatism distribution of the GRIN progressive power spectacle lens according to the disclosure according to the third exemplary embodiment; and FIG. 18 shows a comparison of the contour of the front surface of the GRIN progressive power spectacle lens according to the third exemplary embodiment with the contour of the front surface of the comparison progressive power spectacle lens (1) a: sagittal heights of the front surface of the comparison progressive power spectacle lens (2) b: sagittal heights of the front surface of the GRIN progressive power spectacle lens according to the disclosure according to the third exemplary embodiment.

DESCRIPTION OF EXEMPLARY EMBODIMENTS

Figure 1A:
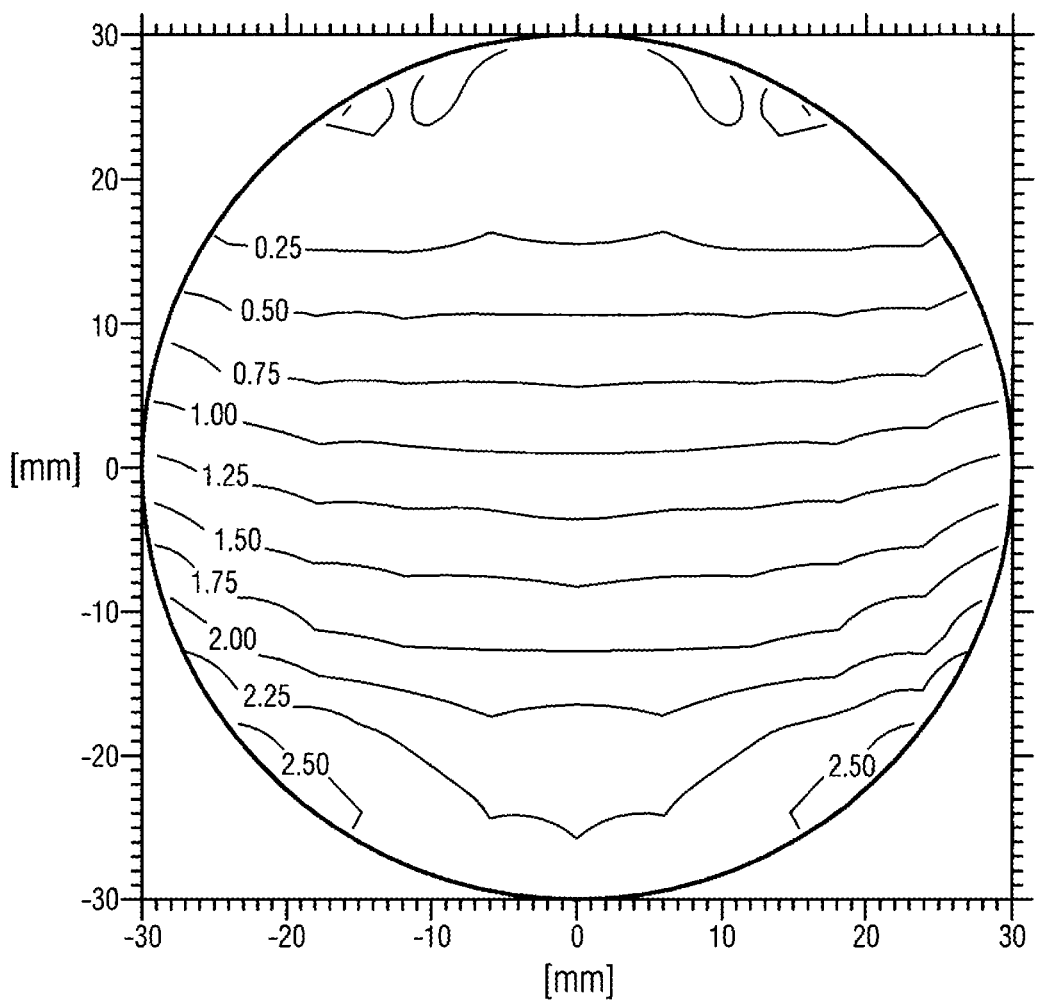
FIG. 1 shows optical properties of a comparison progressive power spectacle lens of conventional construction made of a material with a refractive index of n=1.600 in relation to a GRIN progressive power spectacle lens with a vertical plane of symmetry according to a first exemplary embodiment of the disclosure (1) a: mean spherical power of the comparison progressive power spectacle lens (2) b: mean surface optical power of the comparison progressive power spectacle lens, object-side free-form surface (3) c: mean surface astigmatism for n=1.600 of the object-side free-form surface of the comparison progressive power spectacle lens of FIG. 1A.

The first three exemplary embodiments relate to GRIN progressive power spectacle lenses or the representation thereof in a memory of a computer according to a product of the type according to the disclosure. The fourth exemplary embodiment shows, in exemplary fashion, a method according to the disclosure for planning a GRIN progressive power spectacle lens.

First Exemplary Embodiment

A progressive power spectacle lens with a particularly simple surface geometry is chosen in the first example. It is constructed in mirror symmetric fashion in relation to a plane perpendicular to the plane of the drawing and substantially only consists of a zone with continuously increasing power that is arranged in a central region and extends perpendicularly from top to bottom.

FIG. 1A shows the distribution of the mean spherical power in the beam path for the spectacle wearer for a progressive power spectacle lens made of a standard material (refractive index n=1.600) with an object-side free-form surface, which is described by so-called bicubic splines. This progressive power spectacle lens serves as a comparison progressive power spectacle lens for a progressive power spectacle lens embodied according to the disclosure, which is referred to below as a GRIN progressive power spectacle lens on account of its spatially varying refractive index.

The back side of the comparison progressive power spectacle lens is a spherical surface with a radius of 120 mm and the center of rotation of the eye lies behind the geometric center of the lens at a distance of 25.5 mm from the back surface. The lens has a central thickness of 2.5 mm and a prismatic power of 0 at the geometric center. The back surface is untilted, i.e., both front surface and back surface have a normal in the direction of the horizontally straight-ahead direction of view at the geometric center.

The plotted coordinate axes x and y serve to determine points on this surface. On the perpendicular central axis of the lens, the power exceeds the 0.00 diopter at a height of approximately y=20 mm; a power of 2.25 dpt (diopter) is reached at approximately y=−25 mm. Accordingly, the lens power increases by 2.25 diopter along this length of 50 mm. Accordingly, the progressive power spectacle lens has no spherical power (sphere=0) and no astigmatic power (cylinder=0) in the distance portion and an addition of 2.25 dpt for the spectacle wearer in the intended use position. According to section 11.1 of DIN EN ISO 13666:2013-10, a spectacle lens with spherical power is a lens which brings a paraxial pencil of parallel light to a single focus. According to section 12.1 of DIN EN ISO 13666:2013-10, a spectacle lens with astigmatic power is a lens bringing a paraxial pencil of parallel light to two separate line foci mutually at right angles and hence having vertex power in only the two principal meridians. Section 14.2.1 of this standard defines the addition as difference between the vertex power of the near portion and the vertex power of the distance portion.

Figure 1B:
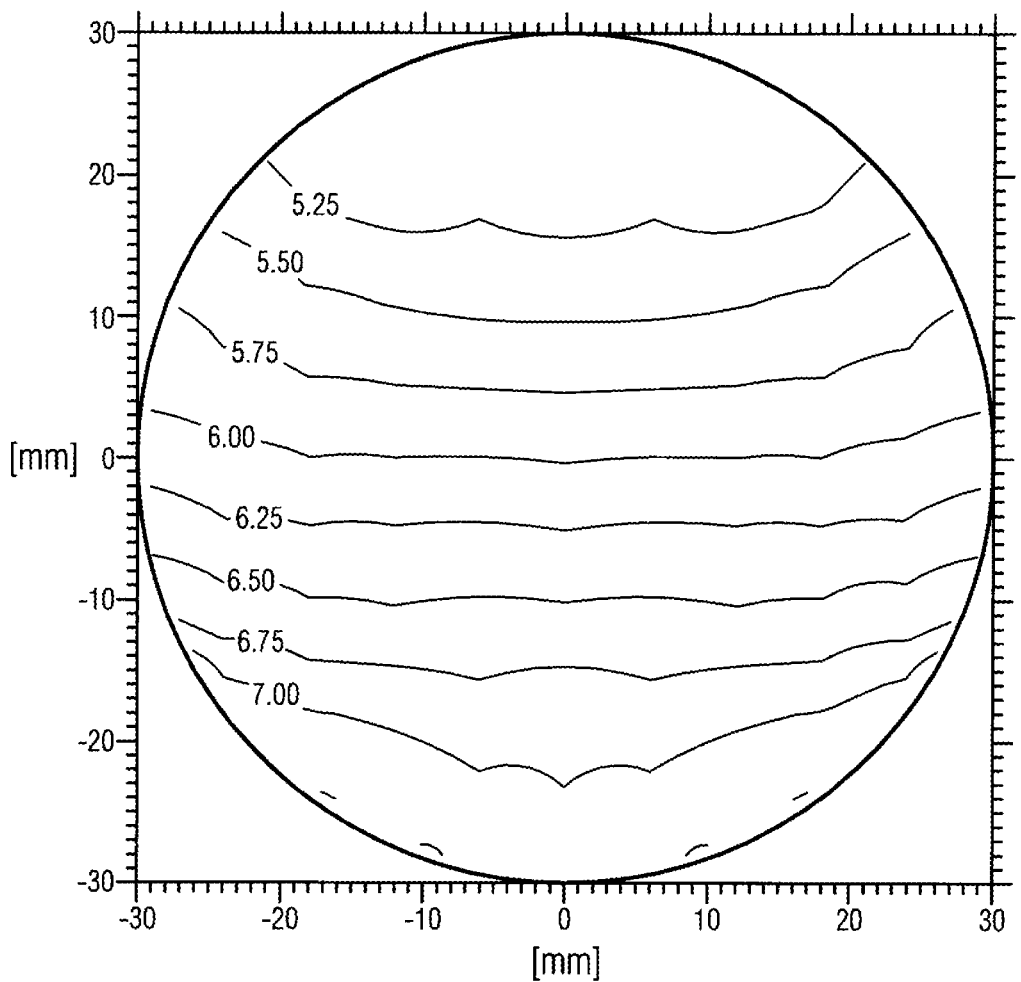

FIG. 1B shows the mean surface optical power for n=1.600 of the object-side free-form surface of the comparison progressive power spectacle lens of FIG. 1A. The surface curvature increases continuously from top to bottom; the mean surface power value increases from approximately 5.3 dpt at y=15 mm to approximately 7.0 dpt at y=−25 mm.

Figure 1C:
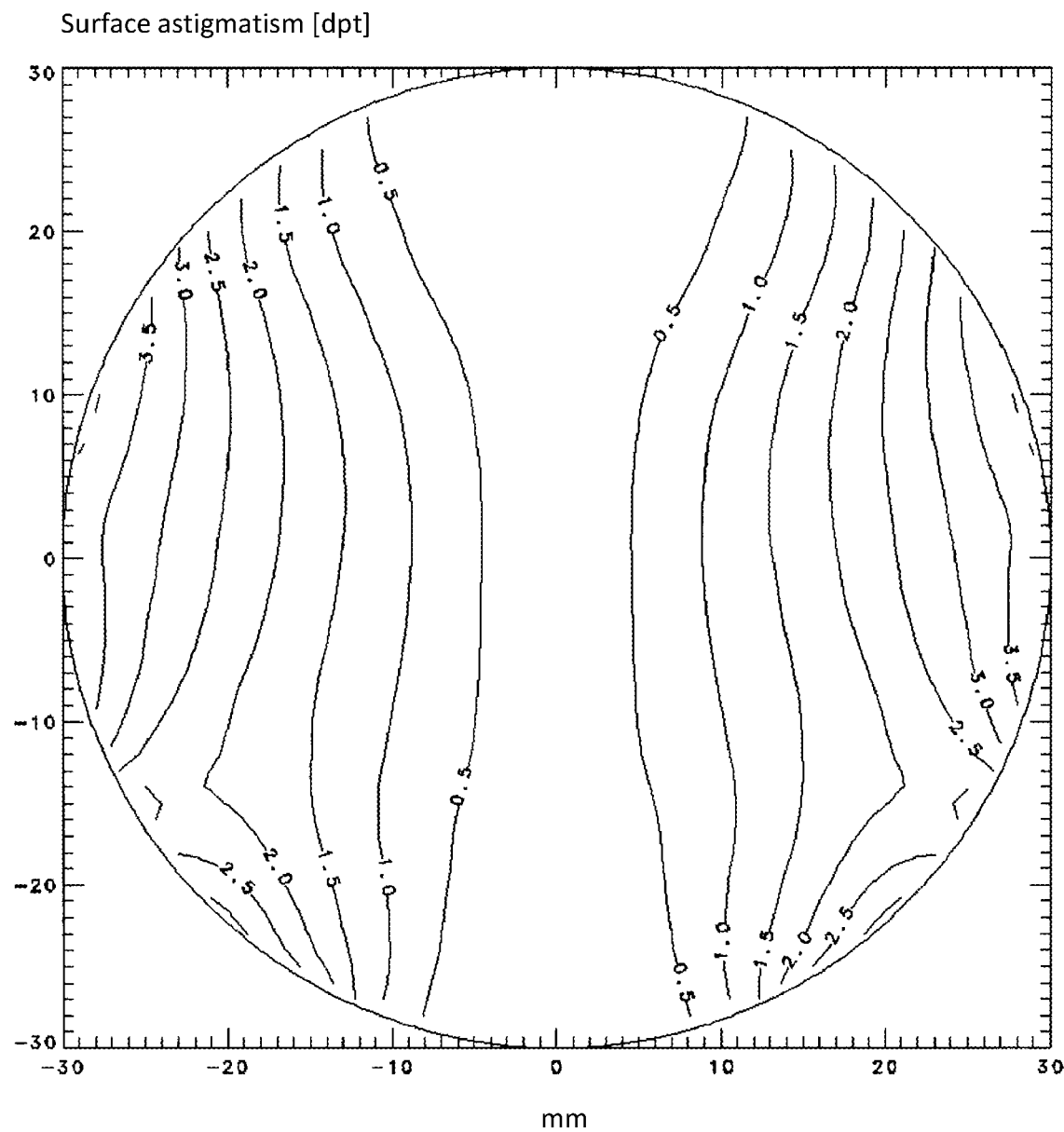

FIG. 1C shows the mean surface astigmatism for n=1.600 of the object-side free-form surface of the comparison progressive power spectacle lens of FIG. 1A.

Figure 2A:
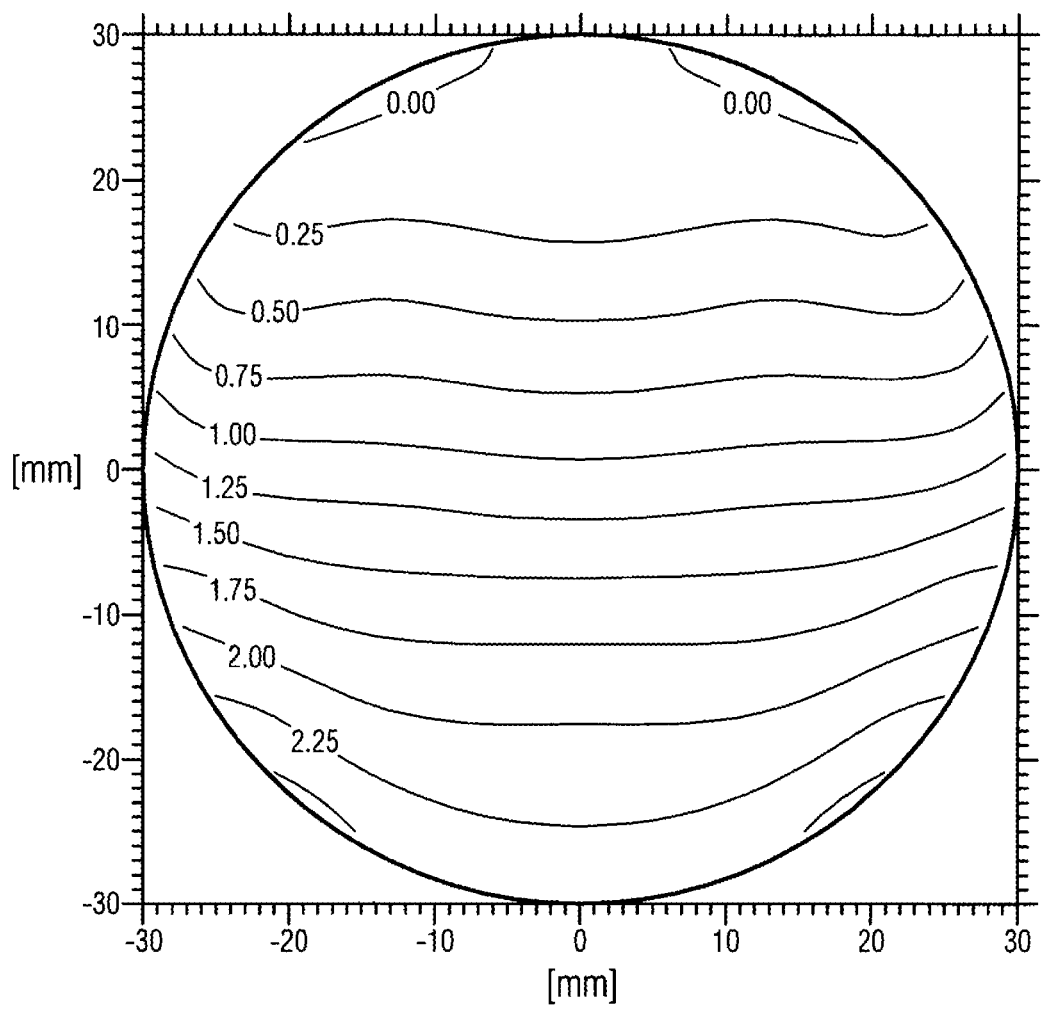
FIG. 2 shows optical properties of the GRIN progressive power spectacle lens according to the first exemplary embodiment
   (1) a: mean spherical power
   (2) b: mean surface optical power, calculated for a constant refractive index of n=1.600 for the object-side free-form surface
   (3) c: mean surface astigmatism for n=1.600 of the object-side free-form surface of the GRIN progressive power spectacle lens of FIG. 2A.
Figure 2B:
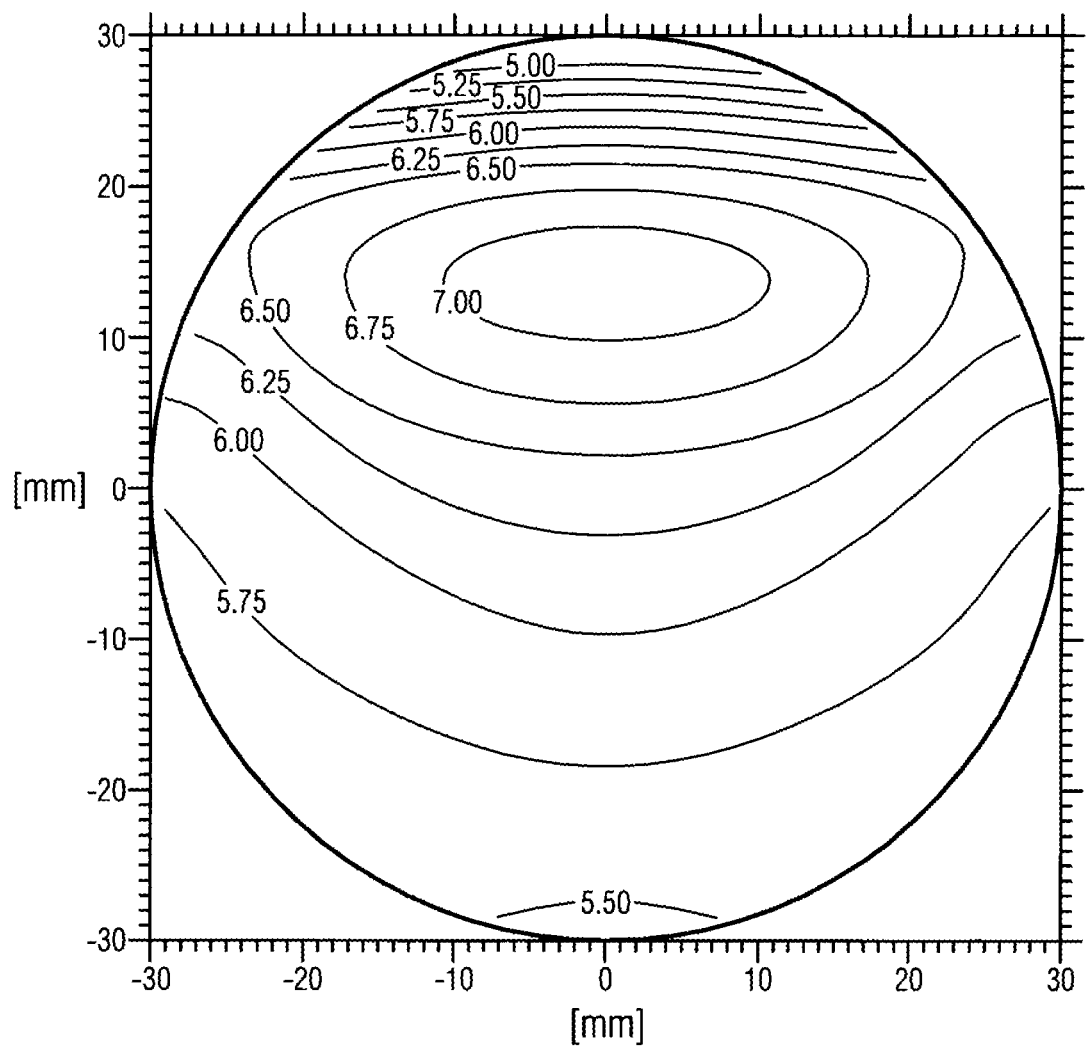
Figure 2C:
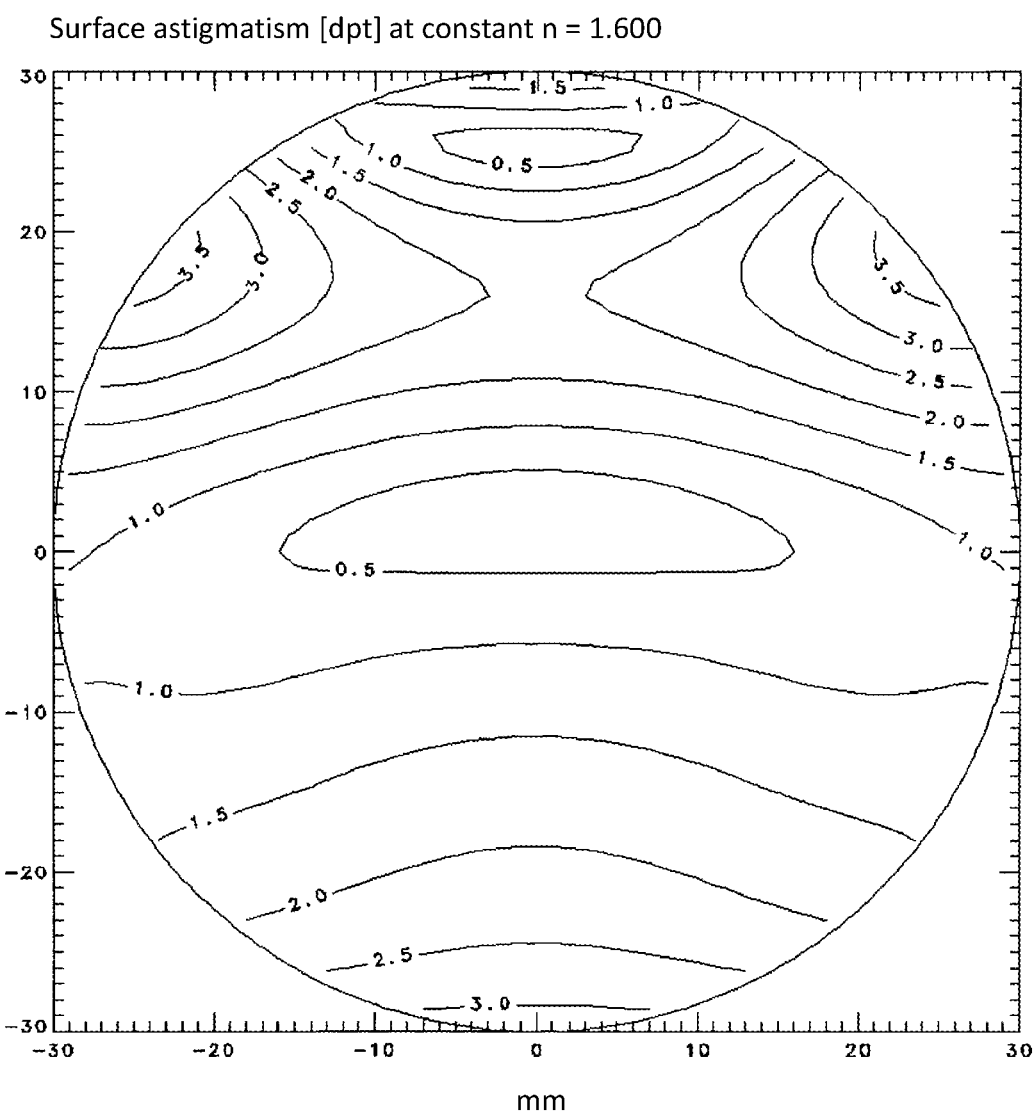

FIGS. 2A, 2B, and 2C show the reproduction of the comparison progressive power spectacle lens using a GRIN material. In this respect, FIG. 2A shows the distribution of the mean spherical power. From the comparison of FIG. 1A and FIG. 2A, it is possible to gather that the power distribution of the two progressive power spectacle lenses is the same. FIG. 2B illustrates the profile of the mean surface optical power and FIG. 2C illustrates the profile of the surface astigmatism of the front surface of the GRIN progressive power spectacle lens embodied according to the disclosure. In order to allow a comparison with FIG. 1B in respect of the mean curvatures and with FIG. 1C in respect of the surface astigmatism, it was not the GRIN material that was used when calculating the mean surface optical power and the surface astigmatism but, like previously, the material with the refractive index of n=1.600.

The mean surface optical power and the surface astigmatism are defined according to Heinz Diepes, Ralf Blendowske: Optik and Technik der Brille; 2nd edition, Heidelberg 2005, page 256.

The comparison of FIGS. 2B and 2C with FIGS. 1B and 1C shows that the form of the free-form surface has changed significantly: The mean surface optical power (calculated with n=1.600) now decreases from top to bottom, i.e., the mean curvature of the surface reduces from top to bottom. The profile of the surface astigmatism no longer exhibits a typical intermediate corridor.

Figure 3:
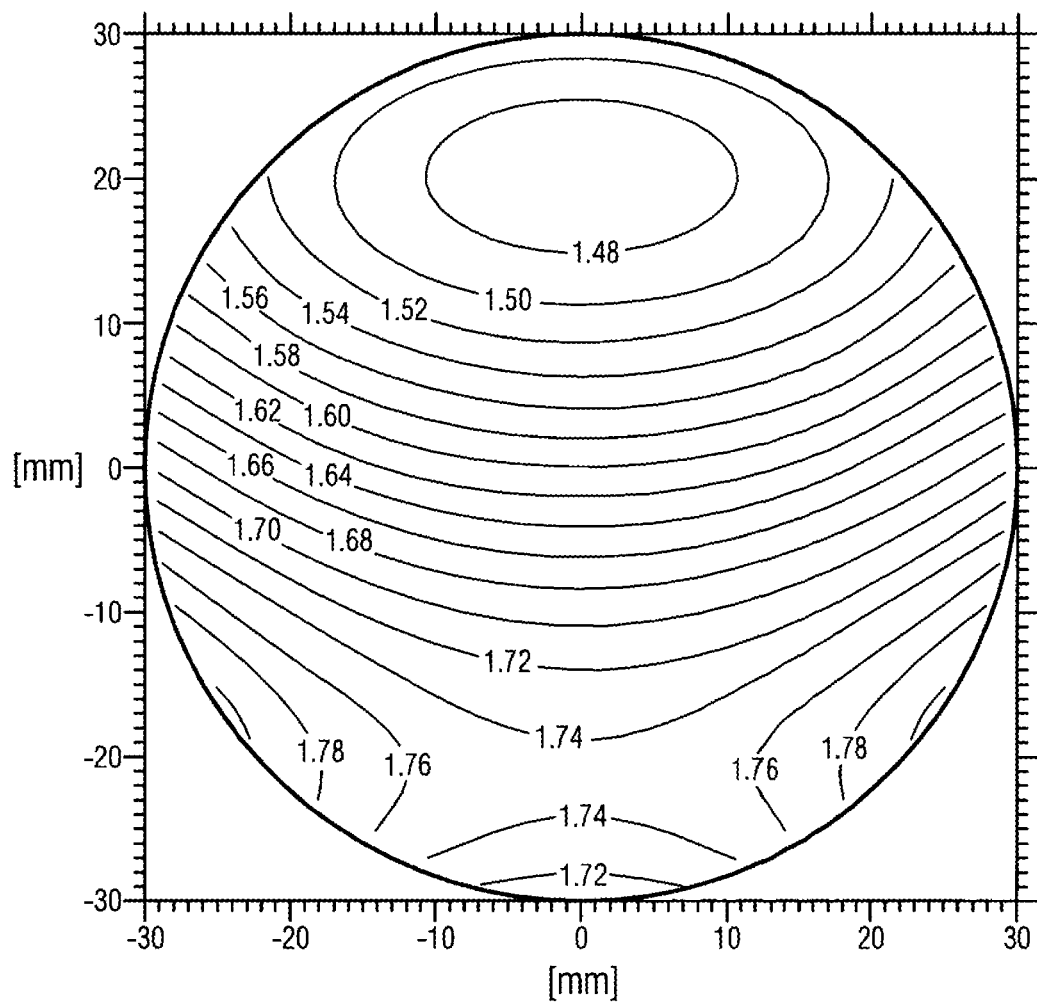
FIG. 3 shows the distribution of the refractive index of the GRIN progressive power spectacle lens according to the first exemplary embodiment.

FIG. 3 shows the distribution of the refractive index over the GRIN progressive power spectacle lens according to the disclosure. Here, the refractive index increases from top to bottom from approximately n=1.48 to approximately n=1.75 in the lower region.

Figure 4A:
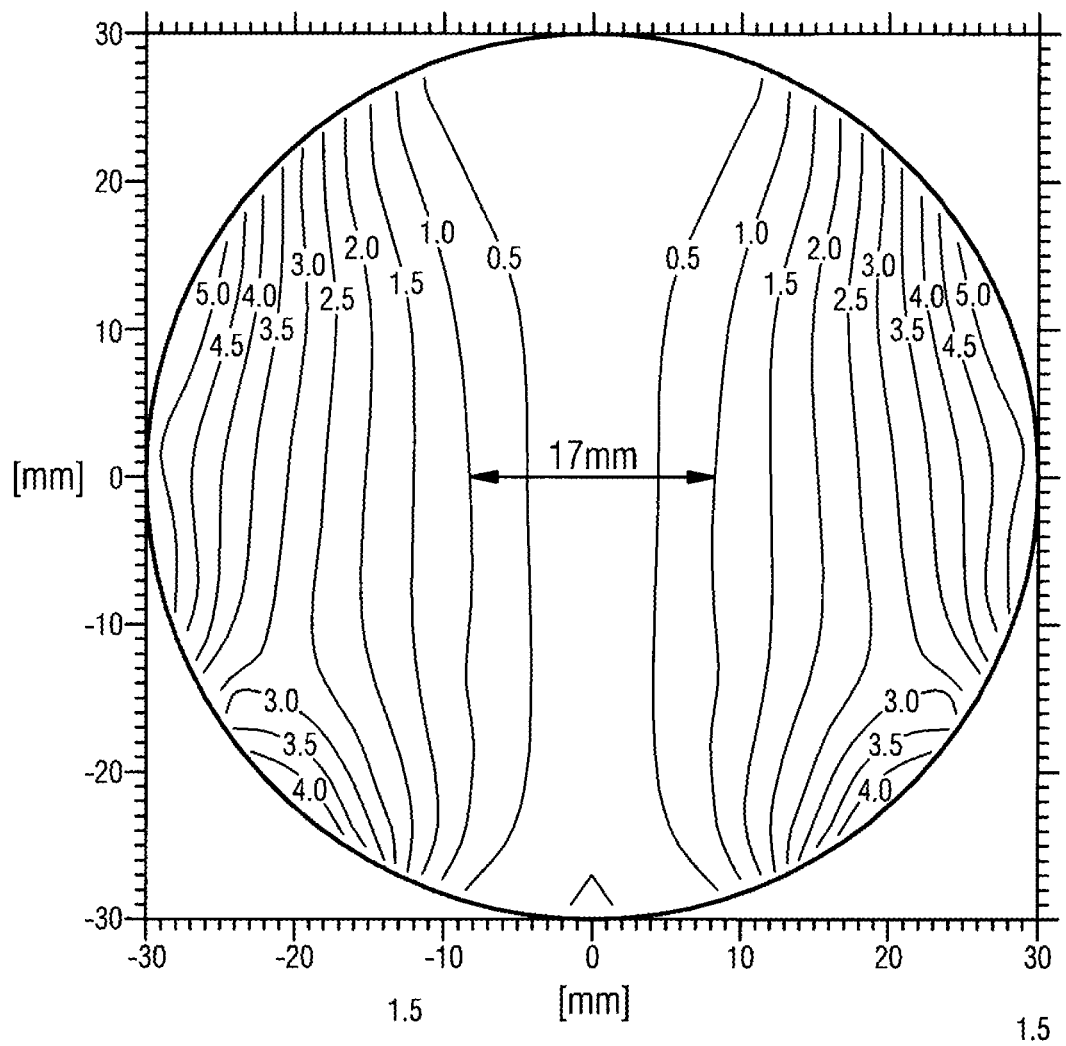
FIG. 4 shows a comparison of the residual astigmatism distribution of the GRIN progressive power spectacle lens according to the first exemplary embodiment with the residual astigmatism distribution of the comparison progressive power spectacle lens
   (1) a: residual astigmatism distribution of the comparison progressive power spectacle lens
   (2) b: residual astigmatism distribution of the GRIN progressive power spectacle lens according to the disclosure according to the first exemplary embodiment.
Figure 4B:
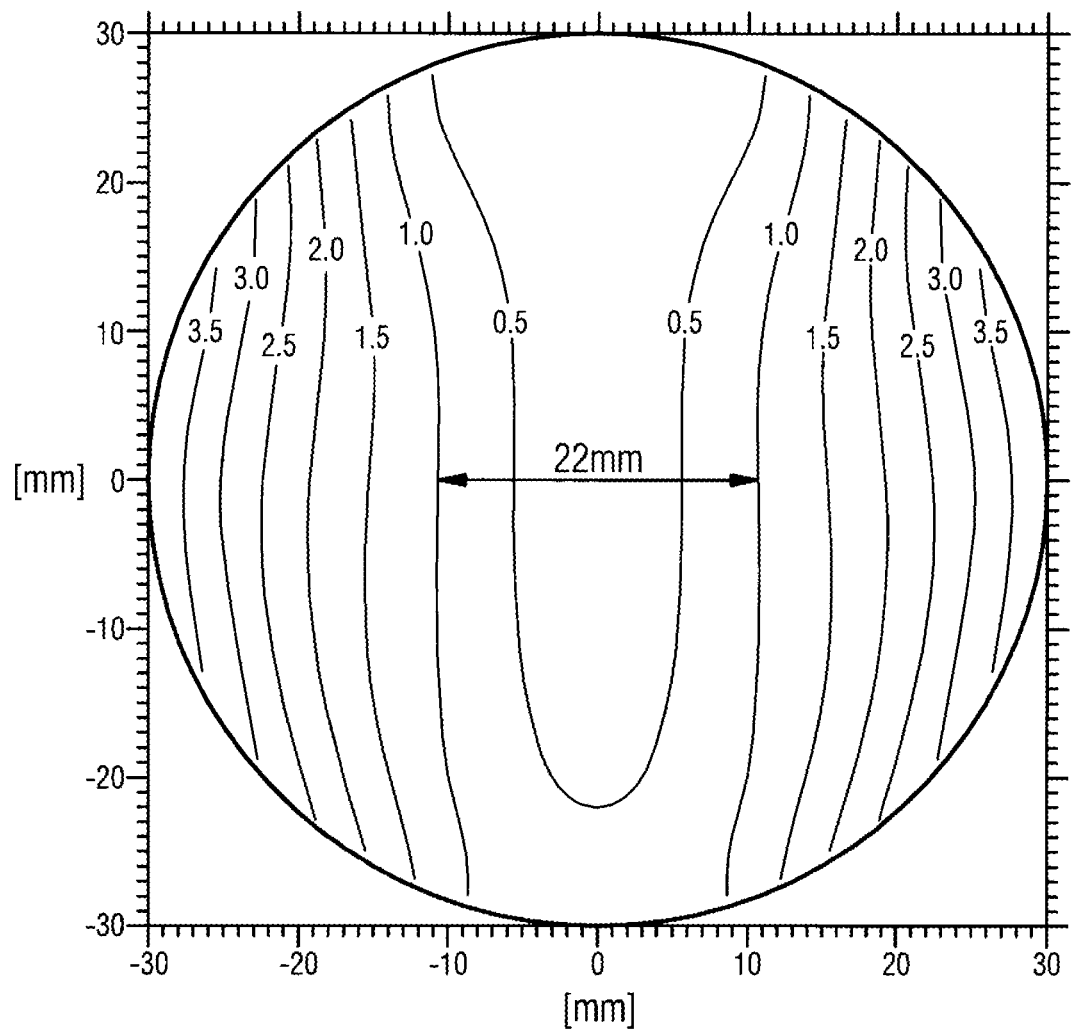

FIG. 4A and FIG. 4B represent the effects of using the GRIN material with its specific refractive index distribution and of the design of the free-form surface for this GRIN progressive power spectacle lens on the width of the intermediate corridor in comparison with the standard lens. The figures show the distribution of the residual astigmatic aberration in the beam path for the spectacle wearer, for a spectacle wearer with only a prescription for sphere.

In this example, the intermediate corridor, defined here by the isoastigmatism line of 1 dpt, increases from 17 mm to 22 mm, i.e., by approximately 30 percent.

Figure 5A:
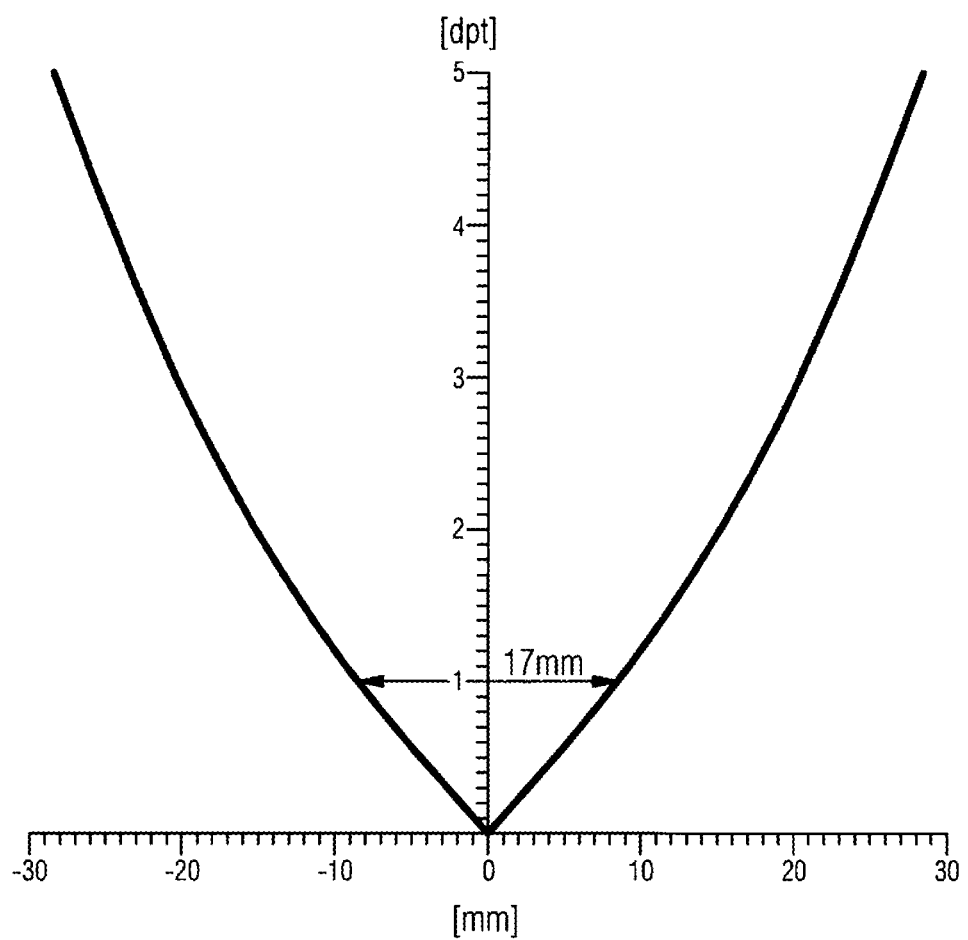
FIG. 5 shows a comparison of the residual astigmatism profile of the GRIN progressive power spectacle lens according to the first exemplary embodiment with the residual astigmatism profile of the comparison progressive power spectacle lens along a section at y=0 according to FIG. 4
   (1) a: residual astigmatism profile of the comparison progressive power spectacle lens
   (2) b: residual astigmatism profile of the GRIN progressive power spectacle lens according to the disclosure according to the first exemplary embodiment.
Figure 5B:
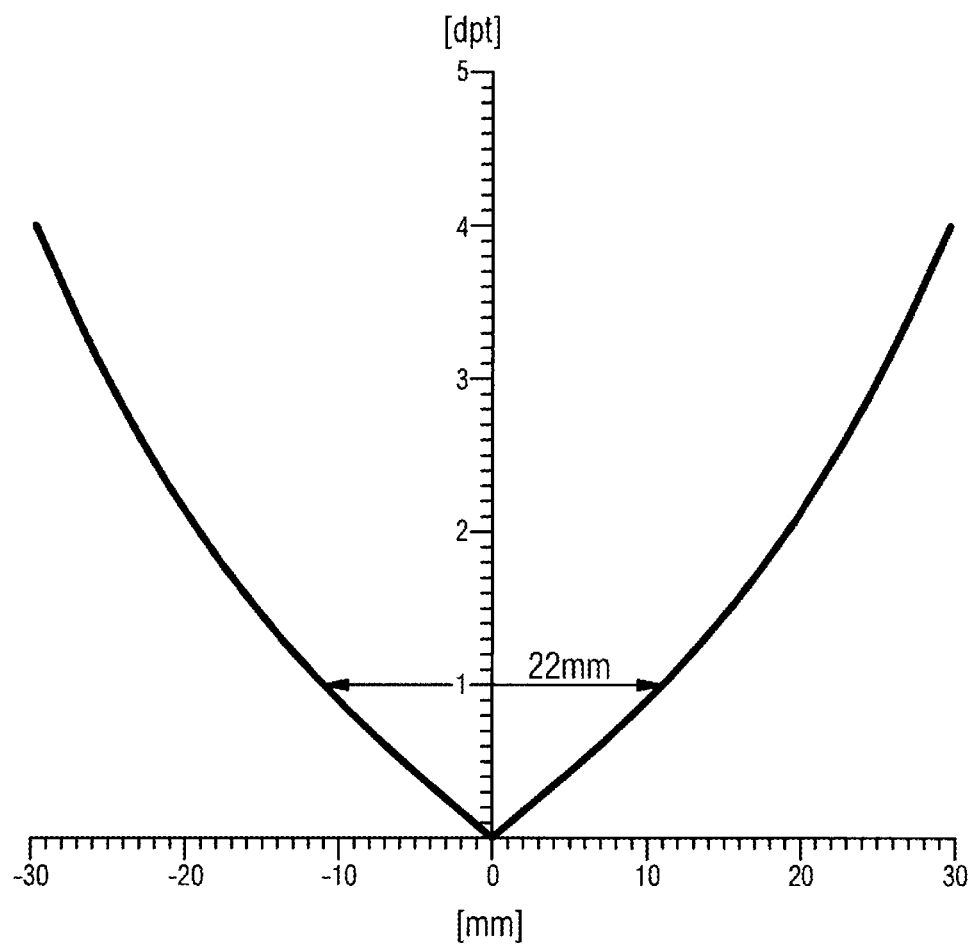

FIG. 5A and FIG. 5B show cross sections through the residual astigmatism distributions from FIG. 4A and FIG. 4B. Here, the conventional relationship between increasing power and the lateral increase in the astigmatic aberration induced thereby (similar to the relationship of the mean surface optical power to the surface astigmatism according to Minkwitz's theorem) becomes particularly clear. The increase of the astigmatism in the surroundings of the center of the intermediate corridor (y=0) is significantly lower for the GRIN lens, even though the same power increase is present as in the standard lens. Precisely this increase is explained by Minkwitz's statement in the theory of optics of progressive power lenses.

FIG. 6 compares the contour of the front surface of the GRIN progressive power spectacle lens according to the first exemplary embodiment with the contour of the front surface of the comparison progressive power spectacle lens with the aid of a sagittal height representation. FIG. 6B shows the sagittal heights of the front surface of the GRIN progressive power spectacle lens according to the disclosure according to the first exemplary embodiment and, in comparison therewith, FIG. 6A shows the sagittal heights of the front surface of the comparison progressive power spectacle lens.

Second Exemplary Embodiment

All of the following figures correspond in subject matter and sequence to those of the first exemplary embodiment.

Figure 7A:
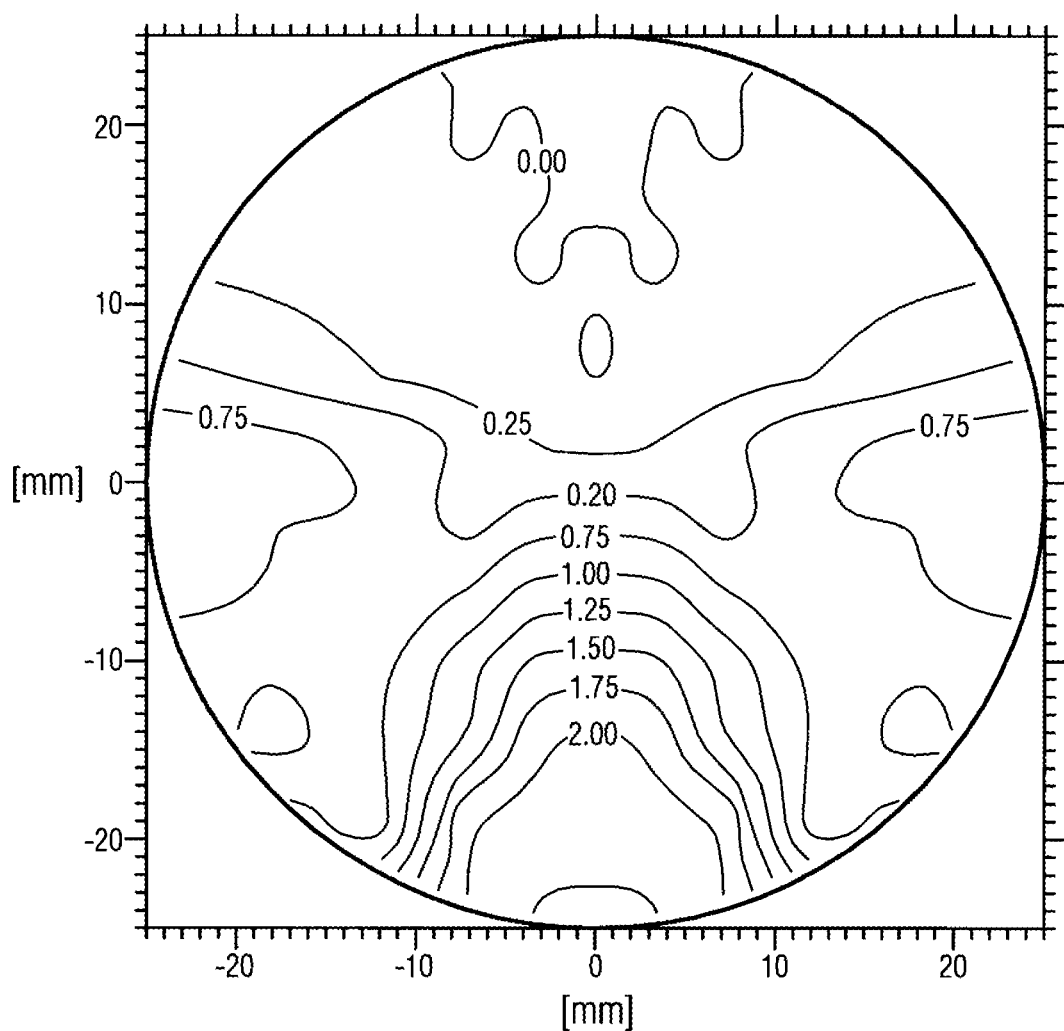
FIG. 7 shows optical properties of a comparison progressive power spectacle lens of conventional construction made of a material with a refractive index of n=1.600 in relation to a GRIN progressive power spectacle lens with a vertical plane of symmetry according to a second exemplary embodiment of the disclosure
   (1) a: mean spherical power
   (2) b: mean surface optical power, object-side free-form surface
   (3) c: surface astigmatism for n=1.600 of the object-side free-form surface of the comparison progressive power spectacle lens of FIG. 7A.

FIG. 7A shows the distribution of the mean spherical power in the beam path for the progressive power spectacle wearer for a comparison progressive power spectacle lens made of a standard material (refractive index n=1.600) with an object-side free-form surface. The back side is, again, a spherical surface with a radius of 120 mm and the center of rotation of the eye lies 4 mm above the geometric center of the comparison progressive power spectacle lens at a horizontal distance of 25.8 mm from the back surface. The comparison progressive power spectacle lens has a central thickness of 2.6 mm and a prismatic power 1.0 cm/m base 270°, 2 mm below the geometric center. The back surface is tilted through −8° about the horizontal axis.

The plotted coordinate axes serve to determine points on this surface. On the perpendicular central axis of the comparison progressive power spectacle lens, the power exceeds the 0.00 diopter line at a height of approximately y=6 mm (i.e., the spectacle wearer obtains virtually a power of 0 dpt when gazing horizontally straight-ahead); a power of 2.00 diopters is achieved at approximately y=−14 mm. Accordingly, the lens power increases by 2.00 dpt along this length of 20 mm.

Figure 7B:
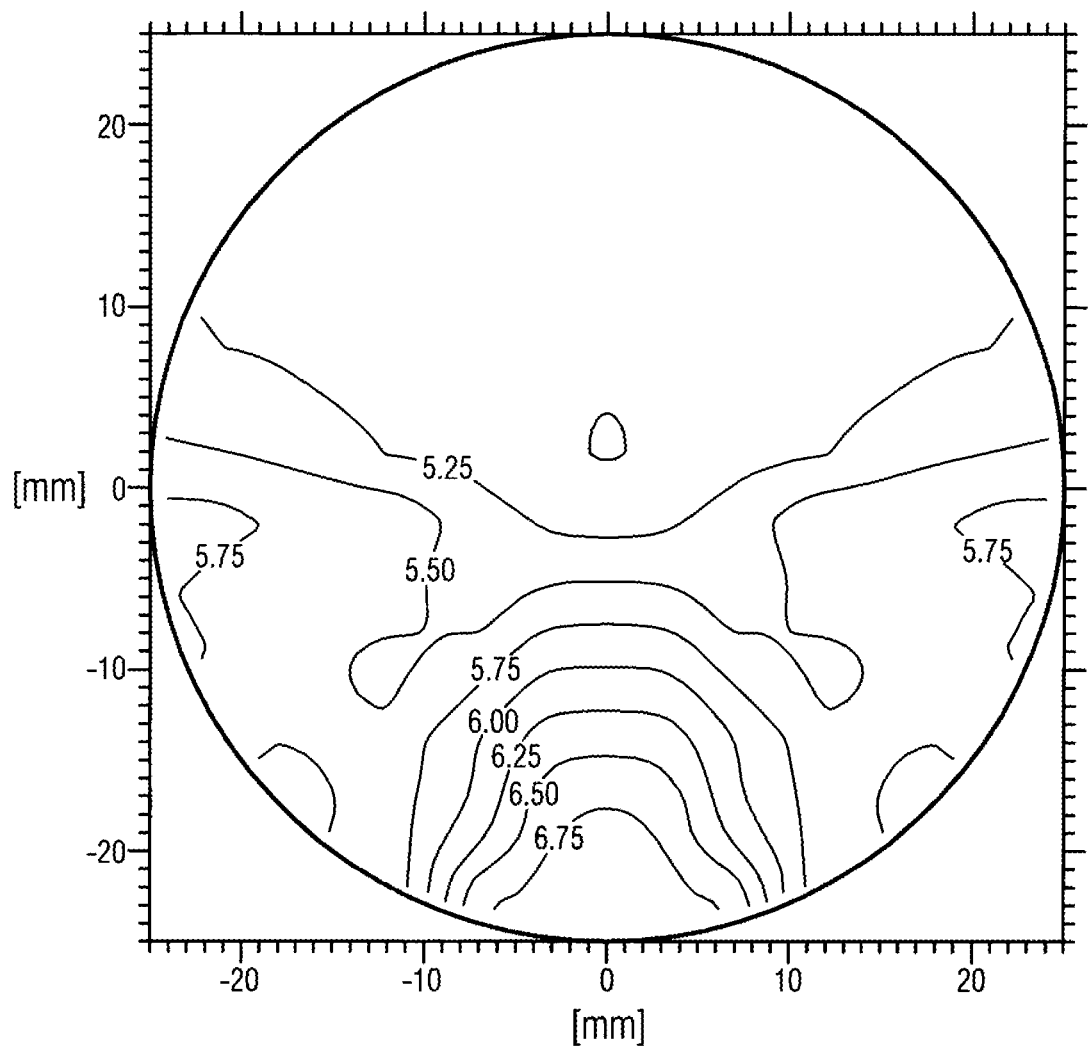

FIG. 7B shows the mean surface optical power for n=1.600 of the object-side free-form surface of the comparison progressive power spectacle lens of FIG. 7A. The surface curvature increases continuously from top to bottom; the mean surface power value increases from 5.00 dpt at y=2 mm to 6.75 dpt at y=−18 mm.

Figure 7C:
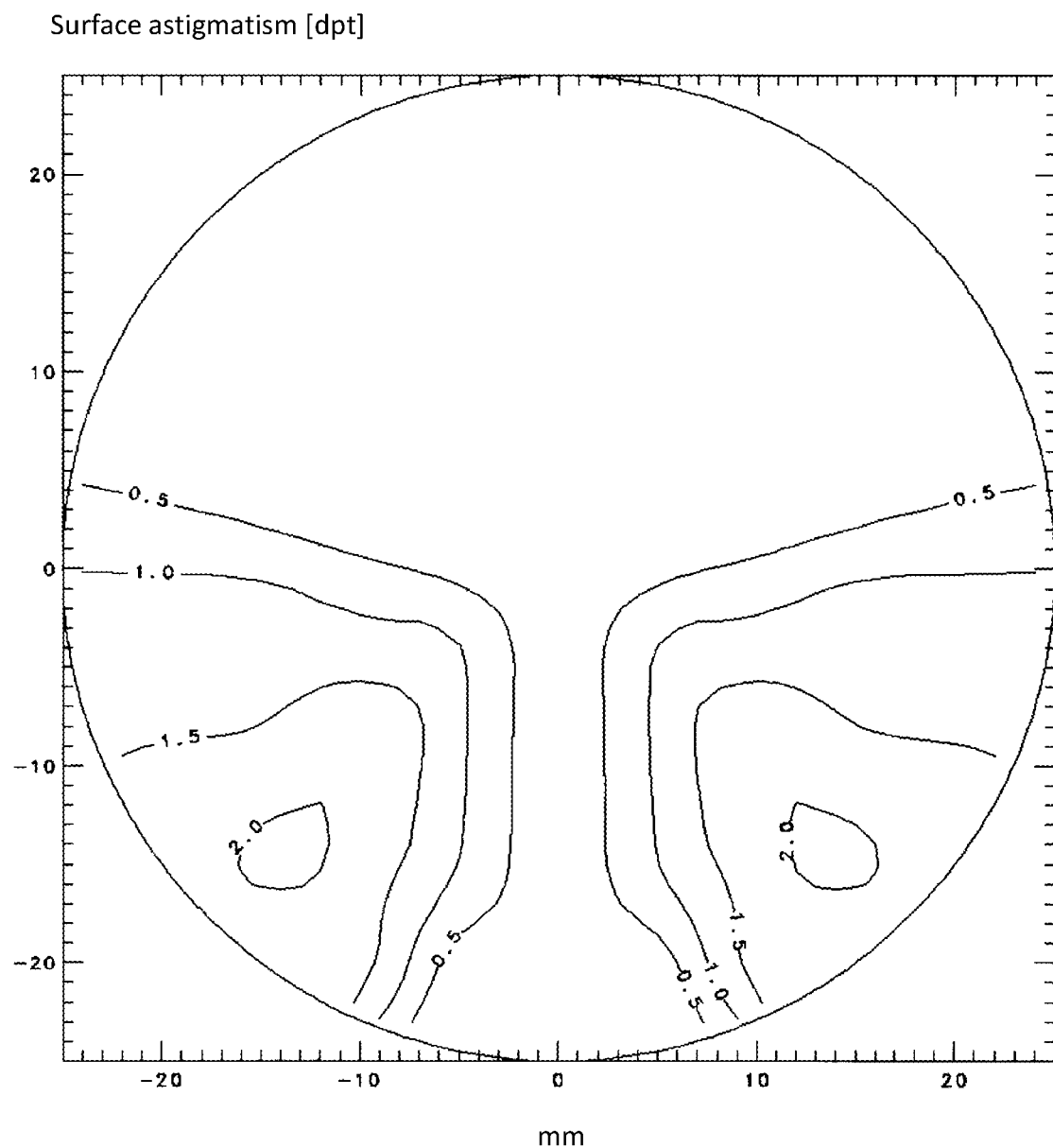

FIG. 7C shows the surface astigmatism for n=1.600 of the object-side free-form surface of the comparison progressive power spectacle lens of FIG. 7A.

Figure 8A:
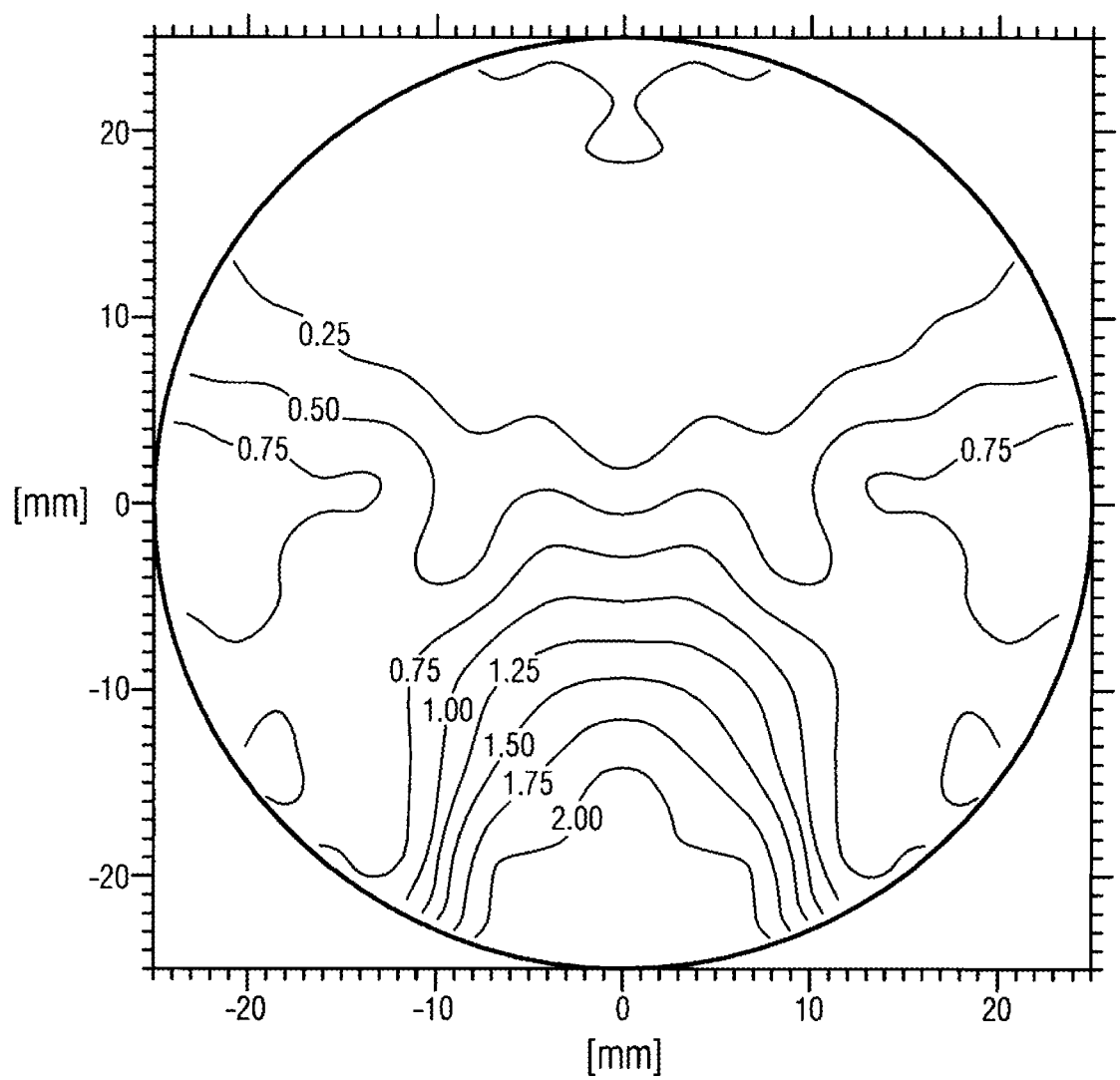
FIG. 8 shows optical properties of the GRIN progressive power spectacle lens according to the second exemplary embodiment
   (1) a: mean spherical power
   (2) b: mean surface optical power, calculated for a refractive index of n=1.600 for the 1. object-side surface
   (3) c: profile of the surface astigmatism of the front surface of the GRIN progressive power spectacle lens according to the disclosure according to the second exemplary embodiment.
Figure 8B:
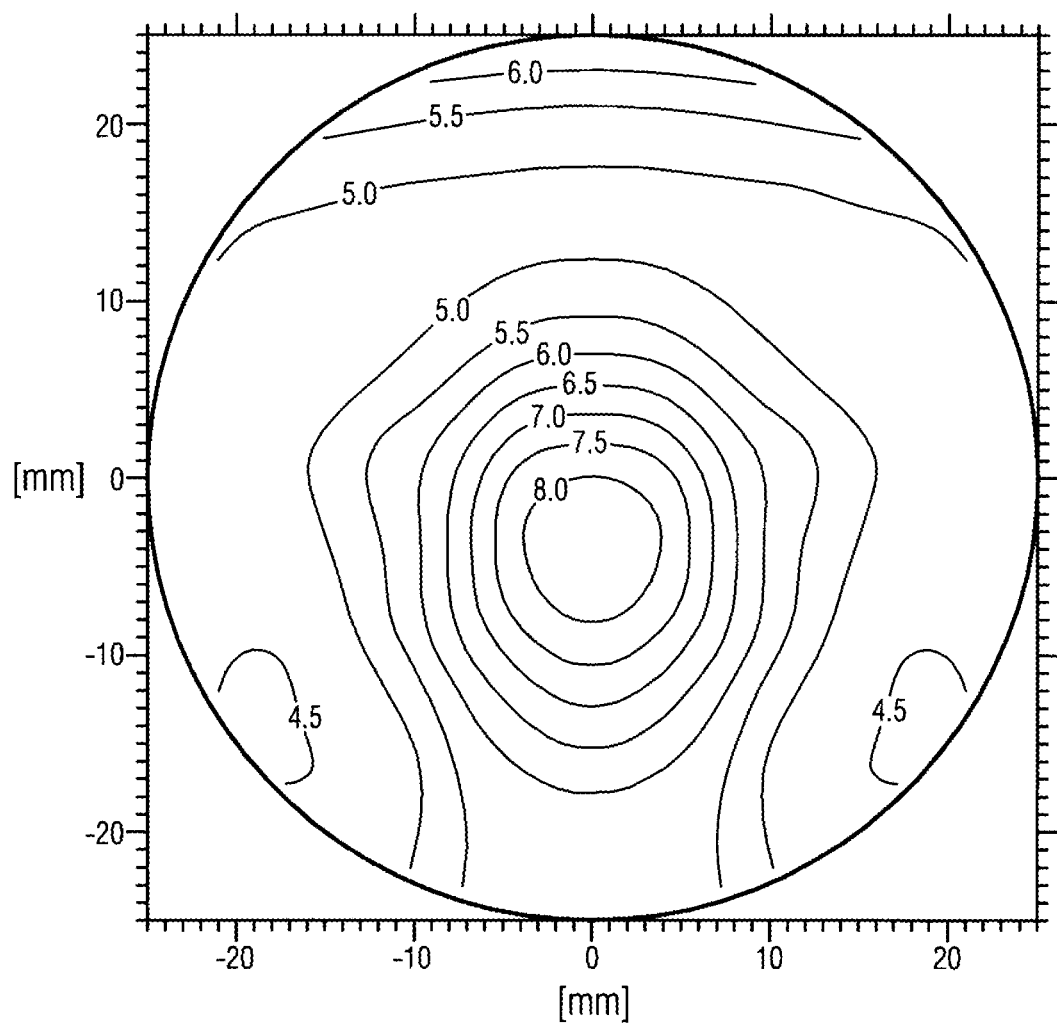
Figure 8C:
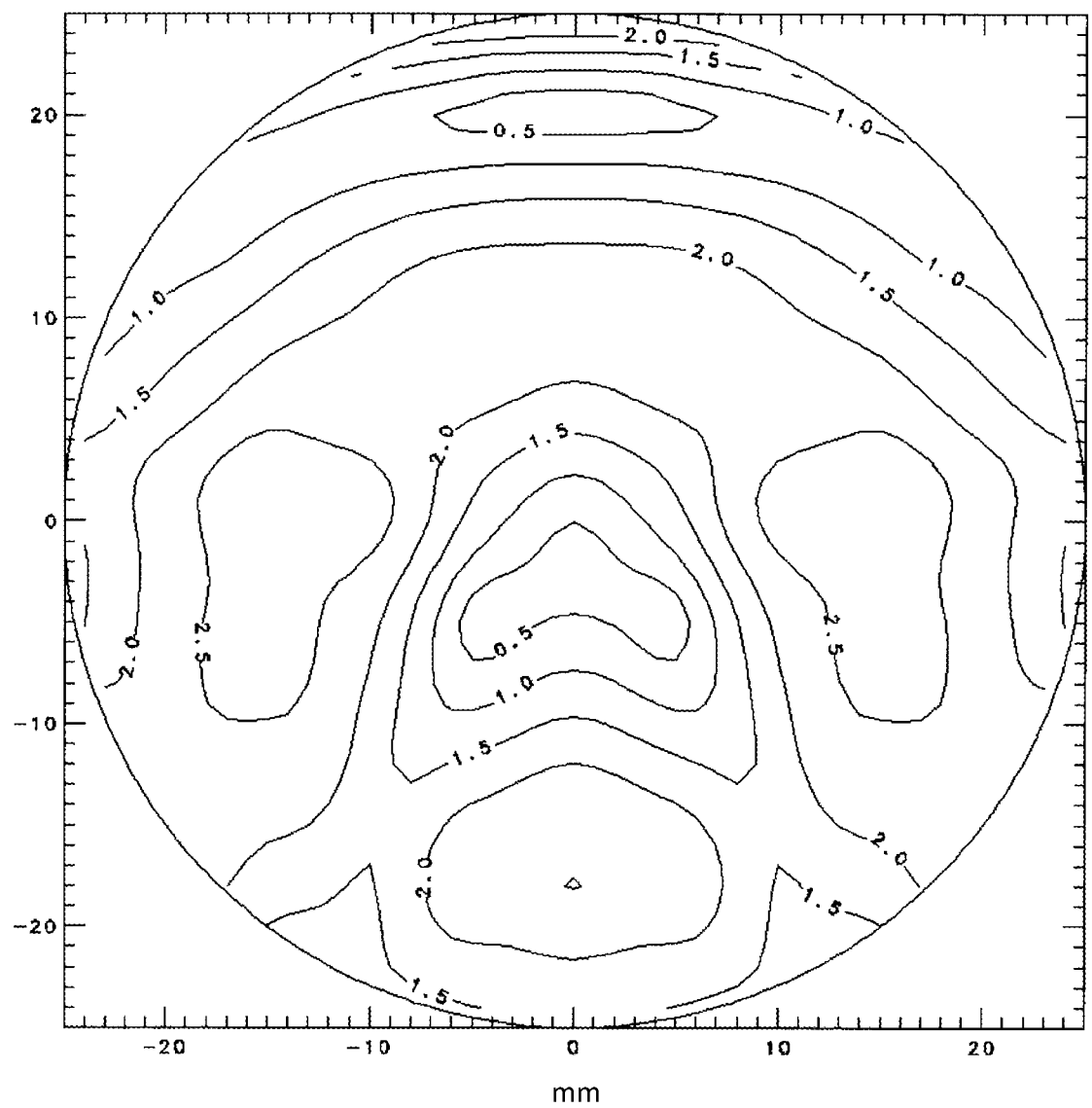

FIGS. 8A, 8B, and 8C show the reproduction of the comparison progressive power spectacle lens using a GRIN material (progressive power spectacle lens according to the disclosure). In this respect, FIG. 8A shows the distribution of the mean spherical power. From the comparison of FIGS. 7A and 8A, it is possible to gather that the power increase along the perpendicular central line of the two lenses is the same. FIG. 8B illustrates the profile of the mean surface optical power and FIG. 8C illustrates the profile of the surface astigmatism of the front surface of the GRIN progressive power spectacle lens according to the disclosure. In order to allow a comparison with FIG. 7B in respect of the mean curvatures and with FIG. 7C in respect of the surface astigmatism, it was not the GRIN material that was used during the calculation but, like previously, the material with the refractive index of n=1.600.

The comparison of FIGS. 8B and 8C with FIGS. 7B and 7C shows that the form of the free-form surface has changed significantly: the mean surface optical power (calculated with n=1.600) now decreases from the lens center to the edge in irregular fashion. The profile of the surface astigmatism no longer exhibits a typical intermediate corridor.

Figure 9:
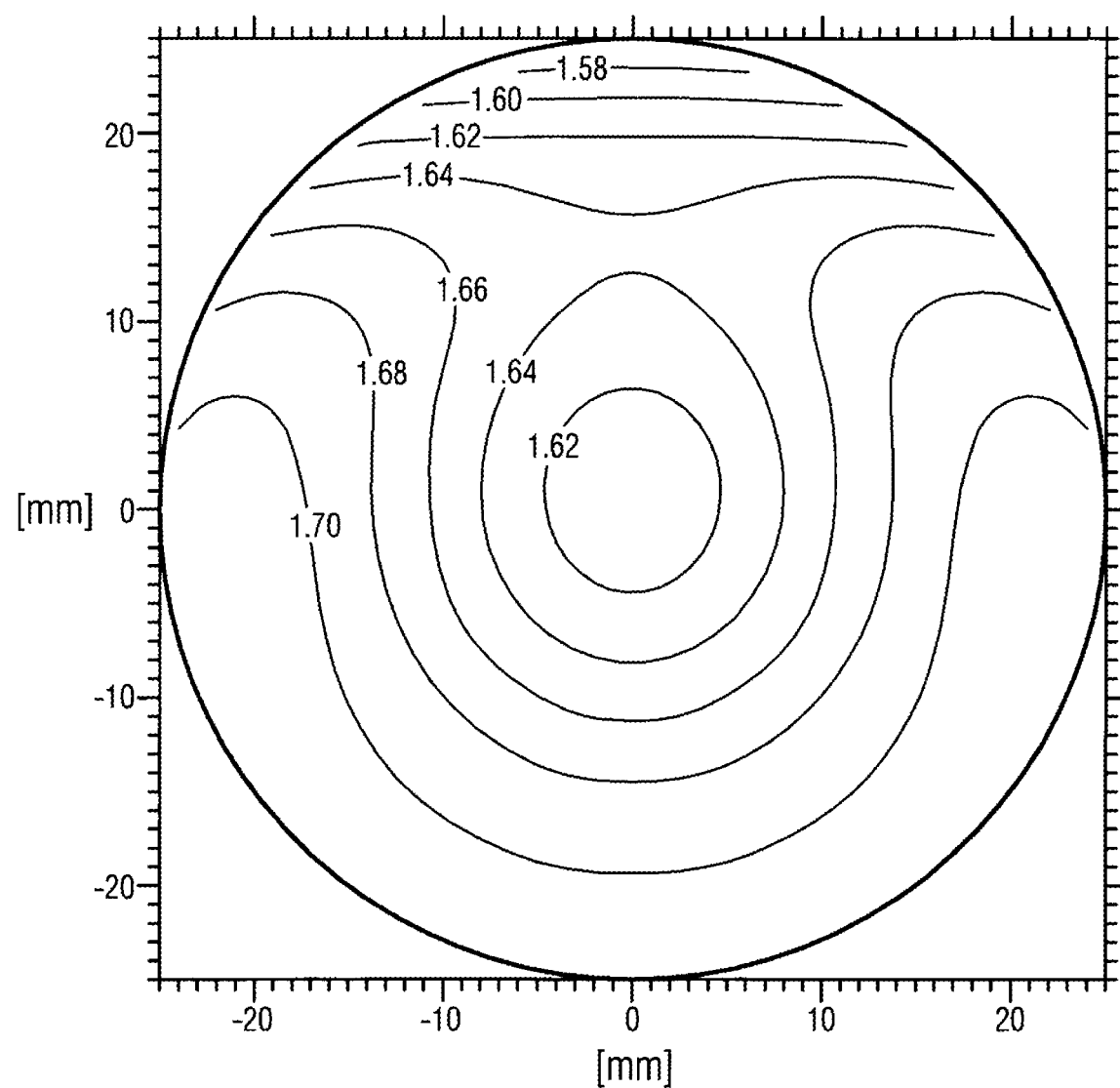
FIG. 9 shows the distribution of the refractive index of the GRIN progressive power spectacle lens according to the second exemplary embodiment.

FIG. 9 shows the distribution of the refractive index over the spectacle lens. Here, the refractive index increases from approximately 1.60 in the center of the lens to approximately n=1.70 in the lower region.

Figure 10A:
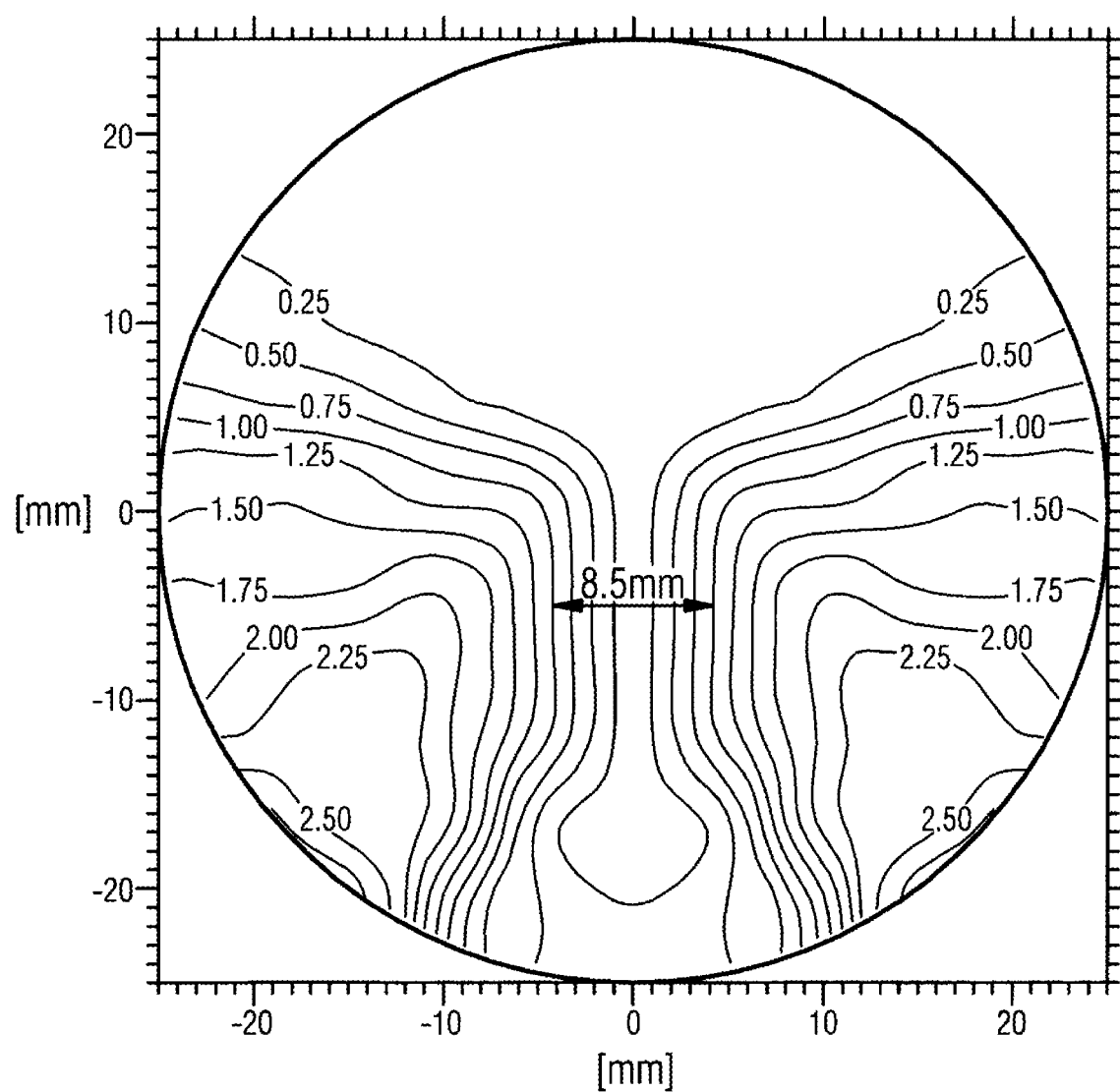
FIG. 10 shows a comparison of the residual astigmatism distribution of the GRIN progressive power spectacle lens according to the second exemplary embodiment with the residual astigmatism distribution of the comparison progressive power spectacle lens
   (1) a: residual astigmatism distribution of the comparison progressive power spectacle lens
   (2) b: residual astigmatism distribution of the GRIN progressive power spectacle lens according to the disclosure according to the second exemplary embodiment.
Figure 10B:
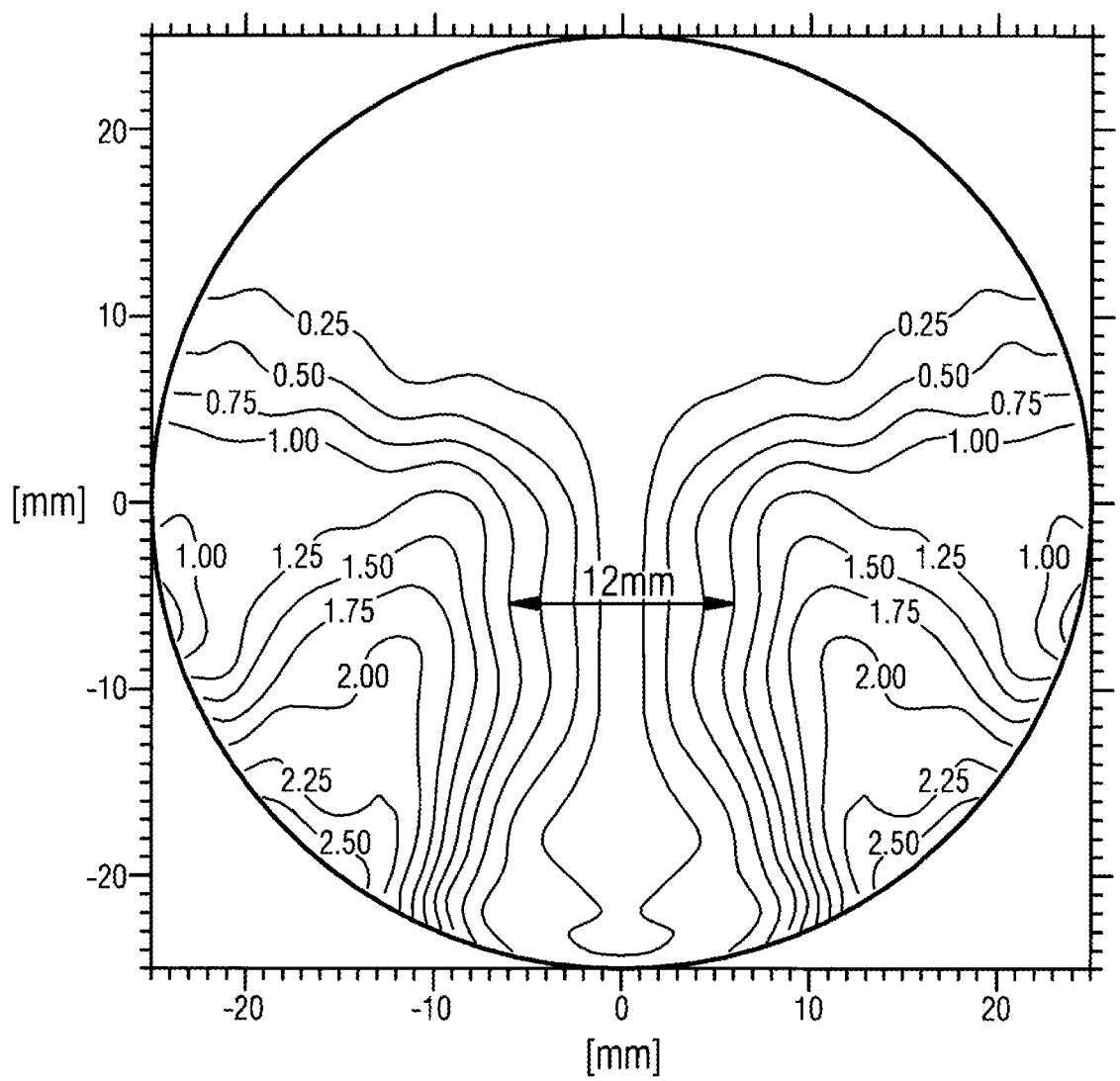

FIG. 10A and FIG. 10B represent the effects of using the GRIN material with its specific refractive index distribution and of the design of the free-form surface for this GRIN progressive power spectacle lens on the width of the intermediate corridor in comparison with the comparison progressive power spectacle lens. The figures show the distribution of the residual astigmatic aberration in the beam path for the spectacle wearer, for a spectacle wearer with only a prescription for sphere.

In this example, the intermediate corridor, defined here by the isoastigmatism line of 1 dpt, increases from 8.5 mm to 12 mm, i.e., by approximately 41 percent.

Figure 11A:
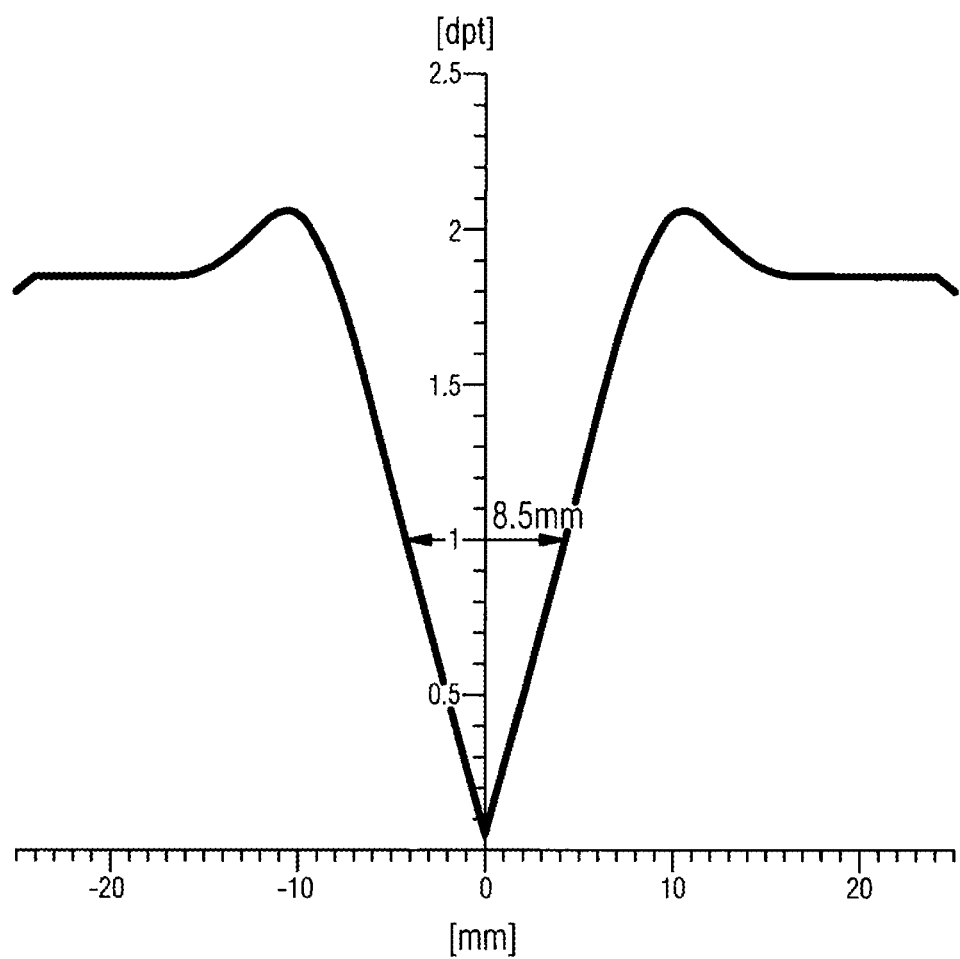
FIG. 11 shows a comparison of the residual astigmatism profile of the GRIN progressive power spectacle lens according to the second exemplary embodiment with the residual astigmatism profile of the comparison progressive power spectacle lens along a section at y=−5 mm according to FIG. 10
   (1) a: residual astigmatism profile of the comparison progressive power spectacle lens
   (2) b: residual astigmatism profile of the GRIN progressive power spectacle lens according to the disclosure according to the first exemplary embodiment.
Figure 11B:
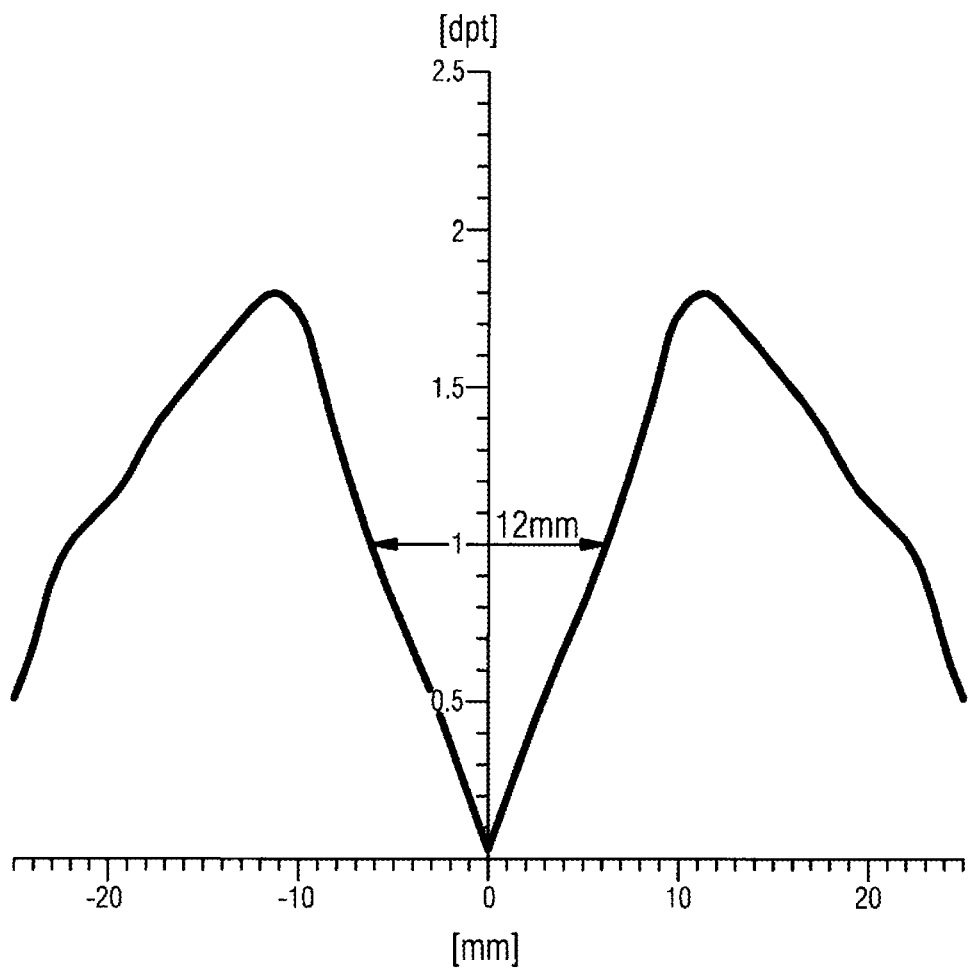

FIG. 11A and FIG. 11B show cross sections through the residual astigmatism distributions from FIG. 10A and FIG. 10B. Here, the conventional relationship between increasing power and the lateral increase in the astigmatic aberration induced thereby (similar to the relationship of the mean surface optical power to the surface astigmatism according to Minkwitz's theorem) becomes particularly clear. The increase of the astigmatism in the surroundings of the center of the intermediate corridor (y=−5 mm) is significantly lower for the GRIN progressive power spectacle lens according to the disclosure, even though the same power increase is present as in the comparison progressive power spectacle lens. In a manner analogous to the first exemplary embodiment, there is a significant deviation of the astigmatism gradient of the GRIN progressive power spectacle lens from the behavior predicted by Minkwitz: The intermediate corridor becomes significantly wider.

FIG. 12 compares the contour of the front surface of the GRIN progressive power spectacle lens according to the second exemplary embodiment with the contour of the front surface of the comparison progressive power spectacle lens with the aid of a sagittal height representation. FIG. 12B shows the sagittal heights of the front surface of the GRIN progressive power spectacle lens according to the disclosure according to the second exemplary embodiment and, in comparison therewith, FIG. 12A shows the sagittal heights of the front surface of the comparison progressive power spectacle lens, in each case with respect to a coordinate system tilted through −7.02 about a horizontal axis (i.e., the vertical Y-axis of this system is tilted through −7.02° in relation to the vertical in space).

Third Exemplary Embodiment

All of the following figures correspond in subject matter and sequence to those of the second exemplary embodiment.

The third exemplary embodiment shows two progressive power lenses, in which the convergence movement of the eye when gazing at objects in the intermediate distances and at near objects, which lie straight-ahead in front of the eye of the spectacle wearer, are taken into account. This convergence movement cause the visual points through the front surface of the spectacle lens when gazing on these points not to lie on an exactly perpendicular straight piece, but along a vertical line pivoting toward the nose, the line being referred to as principal line of sight.

Therefore, the center of the near portion is also displaced horizontally in the nasal direction in these examples. The examples have been calculated in such a way that this principal line of sight lies in the intermediate corridor, centrally between the lines on the front surface for which the astigmatic residual aberration is 0.5 dpt (see FIGS. 16A and 16B in this respect).

Figure 13A:
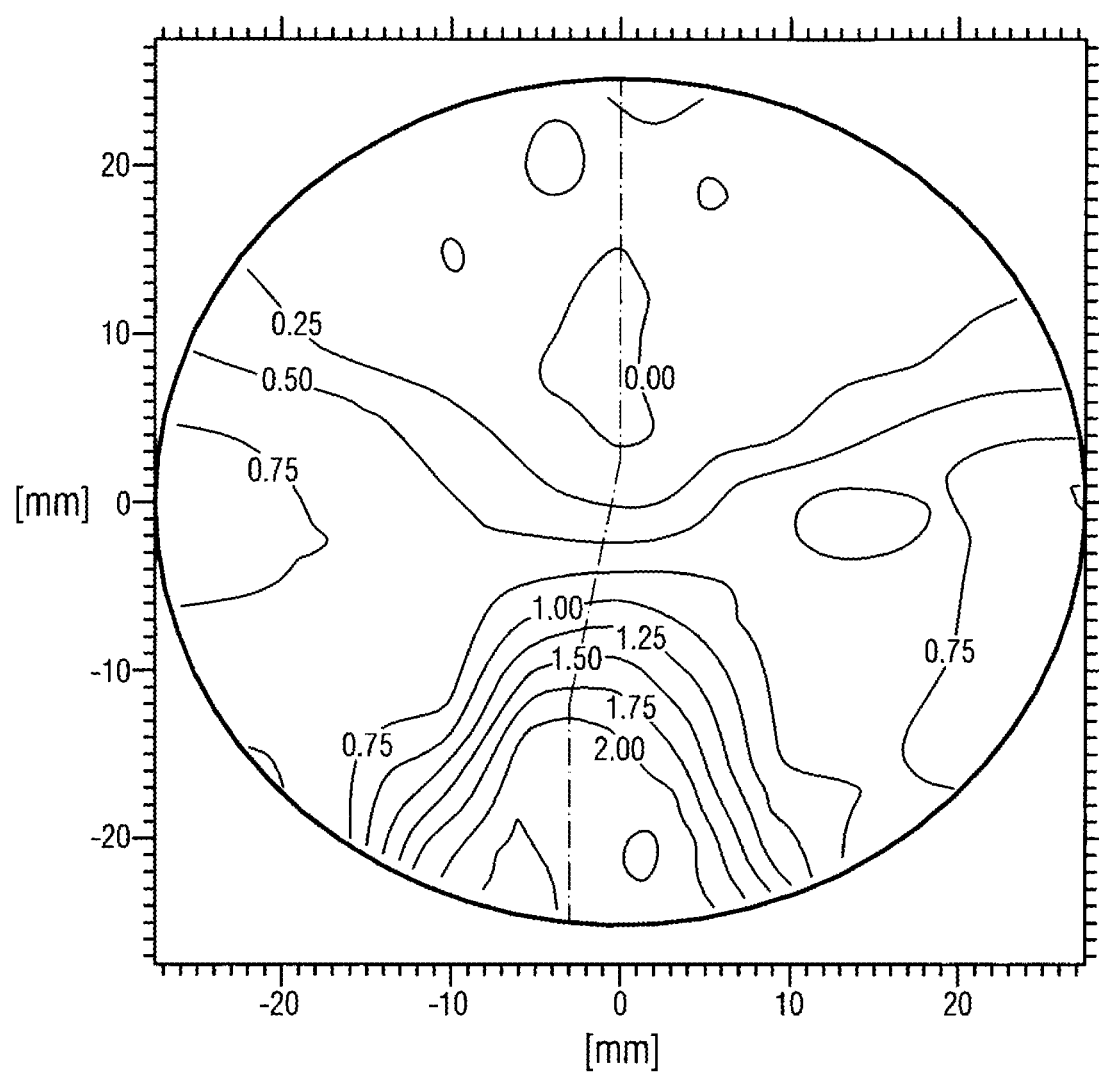
FIG. 13 shows optical properties of a comparison progressive power spectacle lens of conventional construction made of a material with a refractive index of n=1.600 in relation to a GRIN progressive power spectacle lens without any symmetry according to a third exemplary embodiment of the disclosure;
   (1) a: mean spherical power of the comparison progressive power spectacle lens
   (2) b: mean surface optical power of the comparison progressive power spectacle lens, object-side free-form surface.

FIG. 13A shows the distribution of the mean spherical power in the beam path for the progressive power spectacle wearer for a comparison progressive power spectacle lens made of a standard material (refractive index n=1.600) with an object-side free-form surface. The back side is, again, a spherical surface with a radius of 120 mm and the center of rotation of the eye lies 4 mm above the geometric center of the comparison progressive power spectacle lens at a horizontal distance of 25.5 mm from the back surface. The comparison progressive power spectacle lens has a central thickness of 2.5 mm and a prismatic power 1.0 cm/m base 270°, 2 mm below the geometric center. The back surface is tilted in such a way that, when gazing horizontally straight-ahead, the eye-side ray is perpendicular to the back surface.

When gazing horizontally straight-ahead (i.e., for a visual point through the lens of 4 mm above the geometric center), the spectacle wearer receives a mean power of 0 dpt and, when gazing through the point 13 mm below the geometric center and −2.5 mm horizontally in the nasal direction, the spectacle wearer receives a mean power of 2.00 dpt. That is to say, the lens power increases by approximately 2.00 dpt along a length of 17 mm.

Figure 13B:
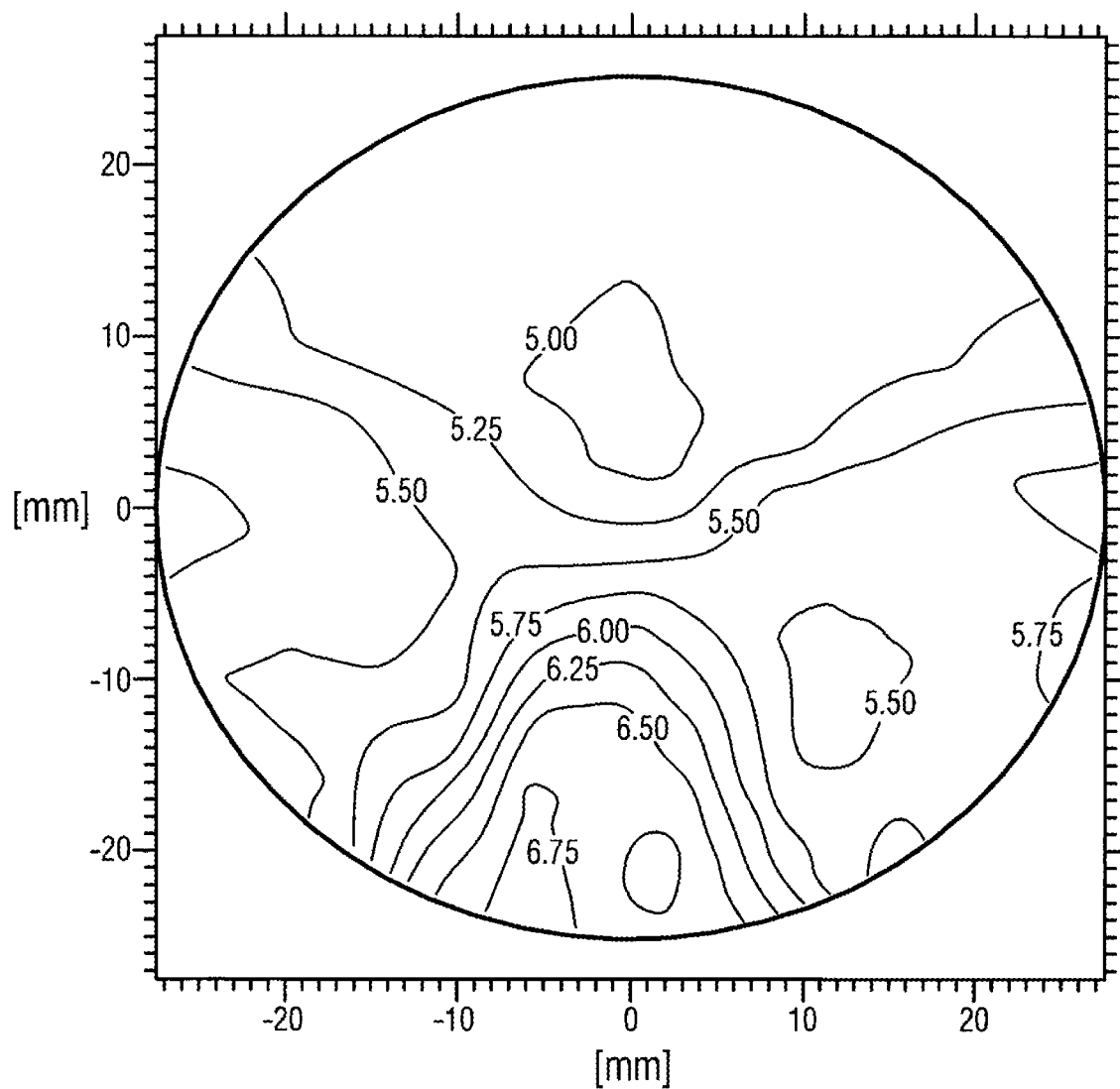

FIG. 13B shows the distribution of the mean surface optical power for a refractive index n=1.600 of the object-side free-form surface of the comparison progressive power spectacle lens of the third exemplary embodiment, which brings about a distribution of the mean power as illustrated in FIG. 13A. The surface curvature increases continuously from top to bottom; the mean surface power value increases from 5.00 dpt at y=approximately 2 mm to 6.50 dpt at y=−12 mm.

Figure 14A:
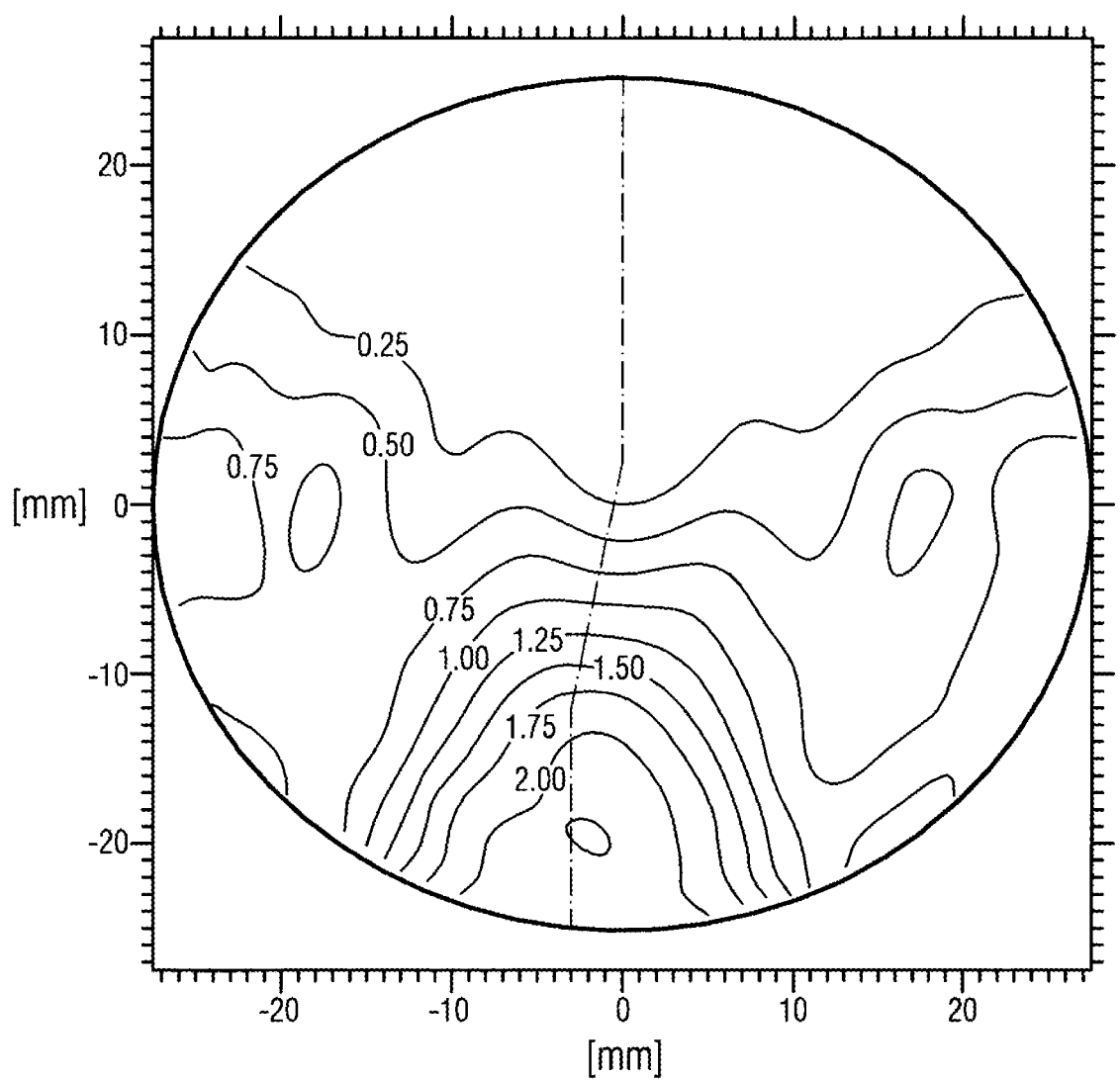
FIG. 14 shows optical properties of the GRIN progressive power spectacle lens according to the third exemplary embodiment
   (1) a: mean spherical power
   (2) b: mean surface optical power, calculated for a refractive index of n=1.600.
Figure 14B:
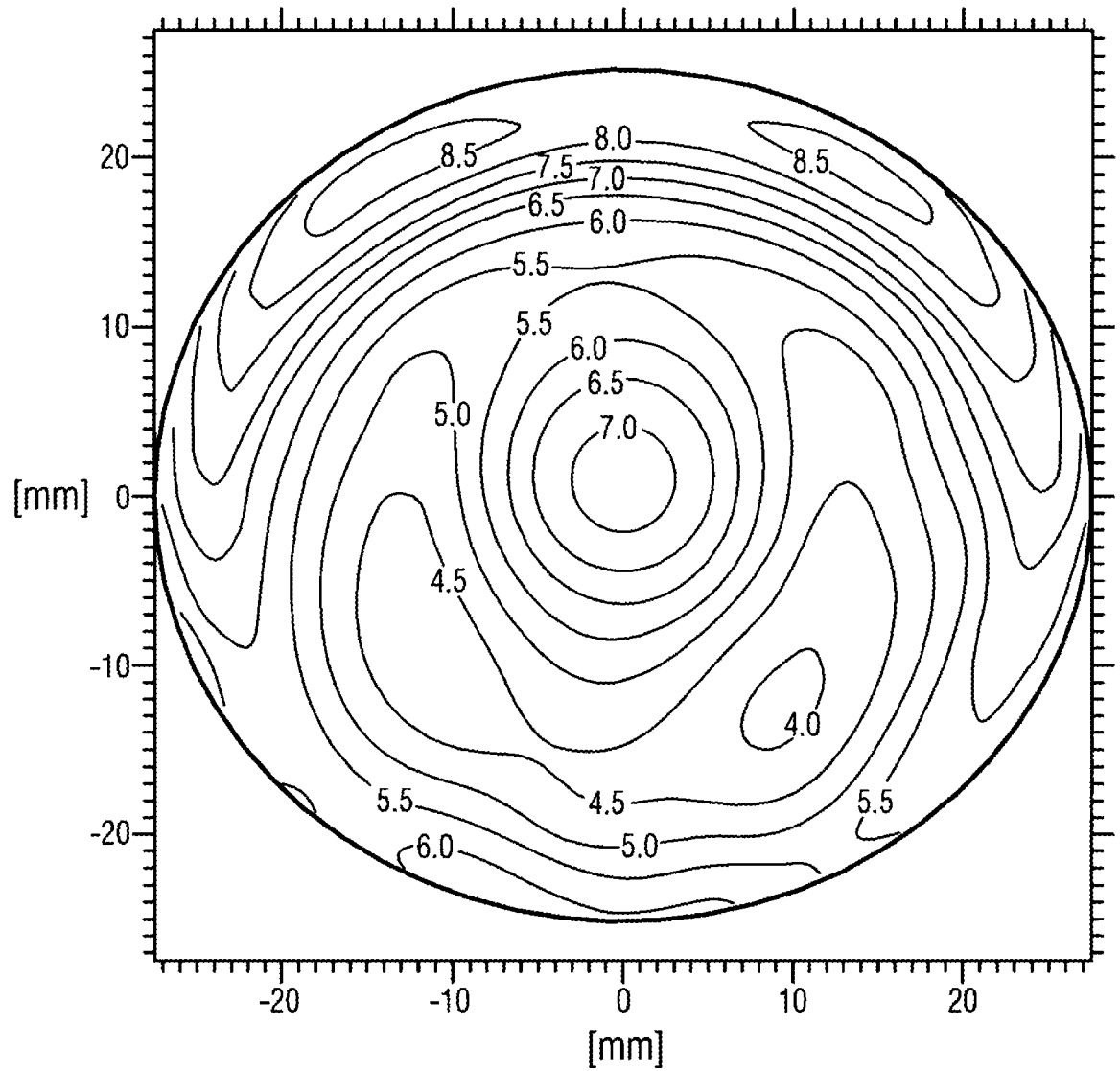

FIGS. 14A and 14B show the reproduction of the comparison progressive power spectacle lens using a GRIN material (progressive power spectacle lens according to the disclosure). In this respect, FIG. 14A shows the distribution of the mean spherical power. From the comparison of FIGS. 13A and 14A, it is possible to gather that the power increase along the principal line of sight in the intermediate corridor is the same. FIG. 14B illustrates the profile of the mean surface optical power of the front surface of the GRIN progressive power spectacle lens according to the disclosure. In order to allow a comparison in respect of the mean curvatures with FIG. 13B, it was not the GRIN material that was used during the calculation but, like previously, the material with the refractive index of n=1.600.

The comparison of FIG. 13B with FIG. 14B shows that the form of the free-form surface has changed significantly: the mean surface optical power (calculated with n=1.600) now decreases from the lens center to the edge in irregular fashion, in order to increase again in the peripheral regions.

Figure 15:
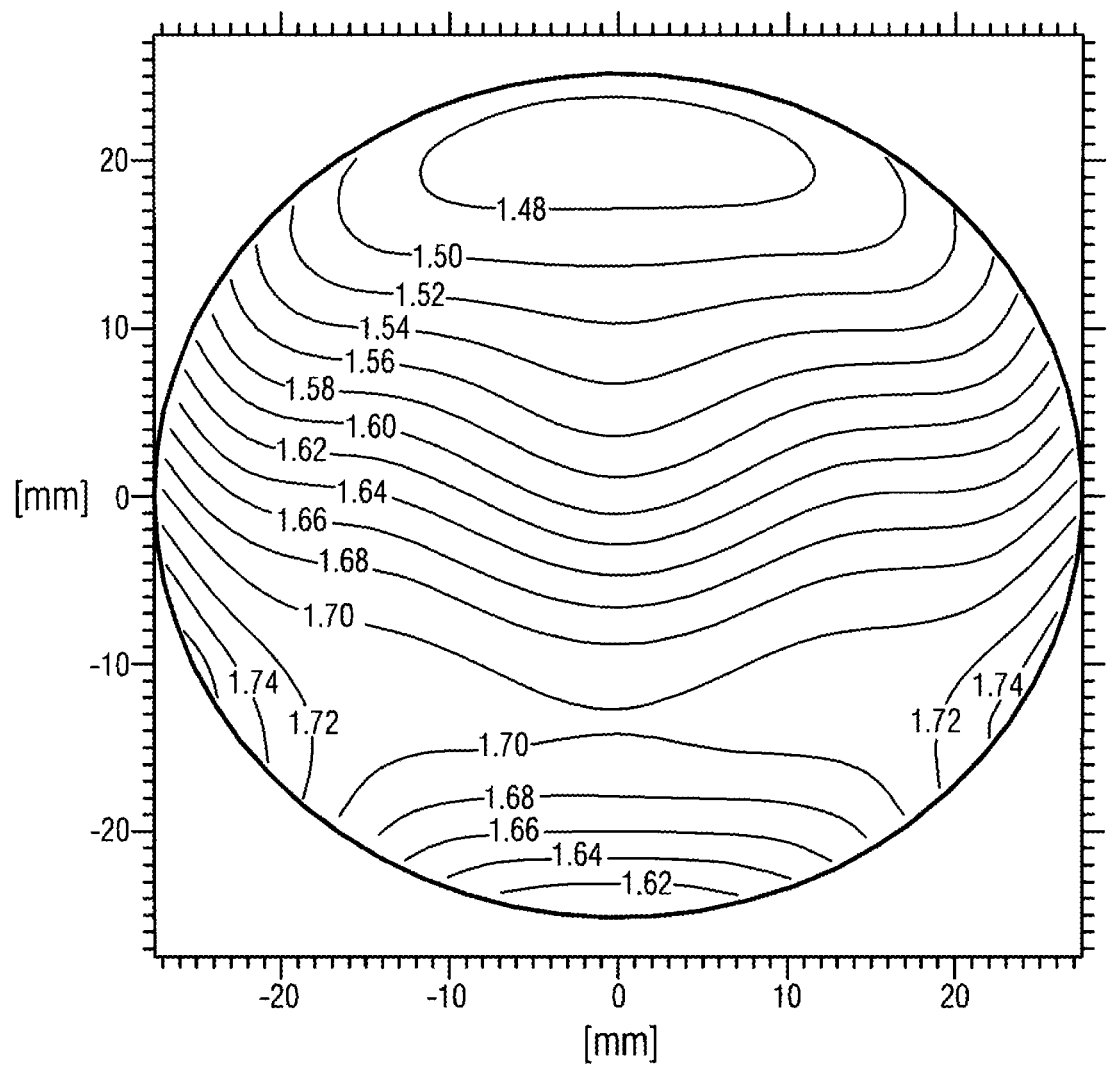
FIG. 15 shows the distribution of the refractive index of the GRIN progressive power spectacle lens according to the third exemplary embodiment.

FIG. 15 shows the distribution of the refractive index over the spectacle lens. Here, the refractive index increases from approximately 1.48 in the upper region of the lens to approximately 1.70 at the height of y=−13 in the lower region.

Figure 16A:
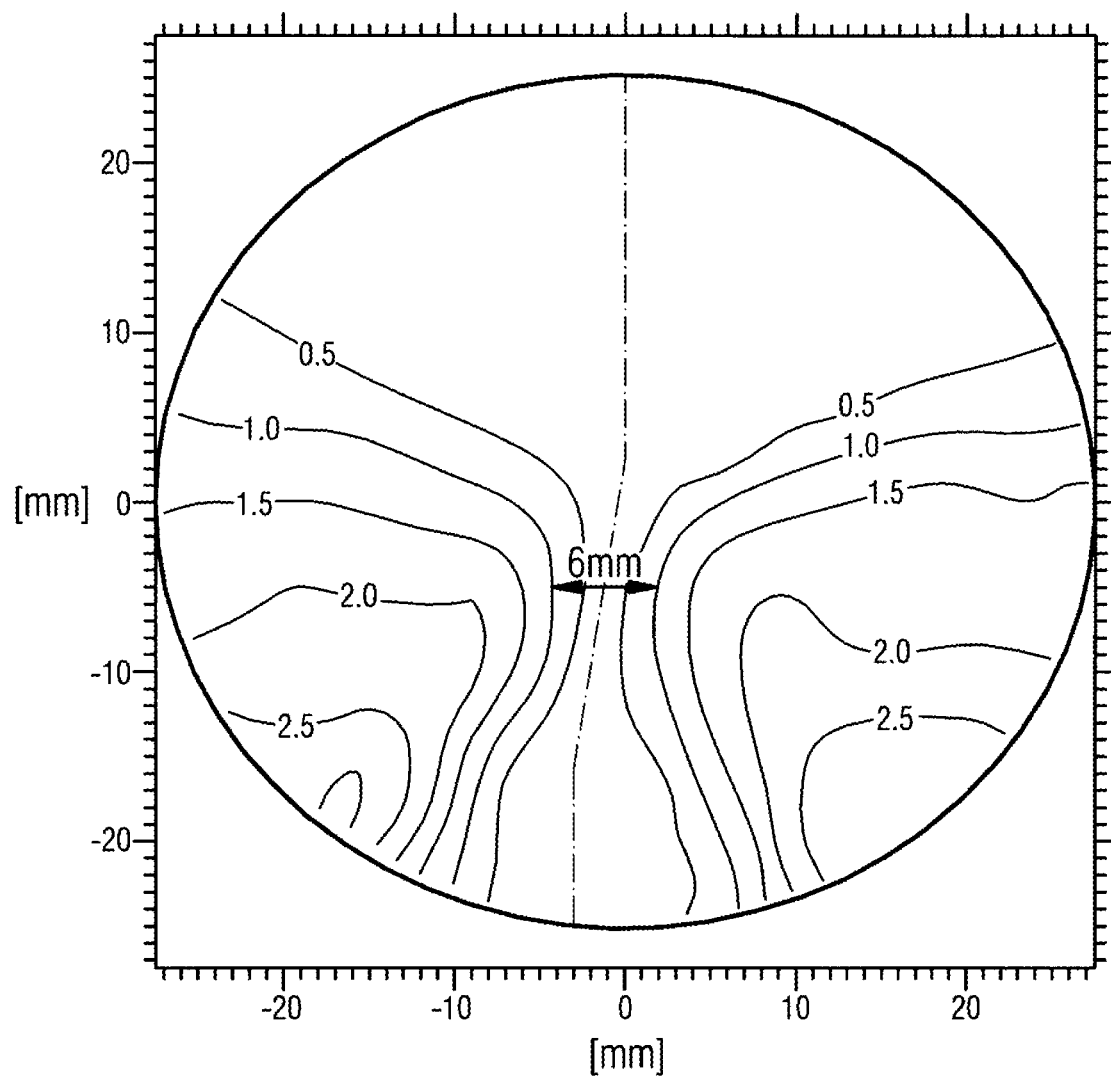
FIG. 16 shows a comparison of the residual astigmatism distribution of the GRIN progressive power spectacle lens according to the third exemplary embodiment with the residual astigmatism distribution of the comparison progressive power spectacle lens
   (1) a: residual astigmatism distribution of the comparison progressive power spectacle lens
   (2) b: residual astigmatism distribution of the GRIN progressive power spectacle lens according to the disclosure according to the third exemplary embodiment.
Figure 16B:
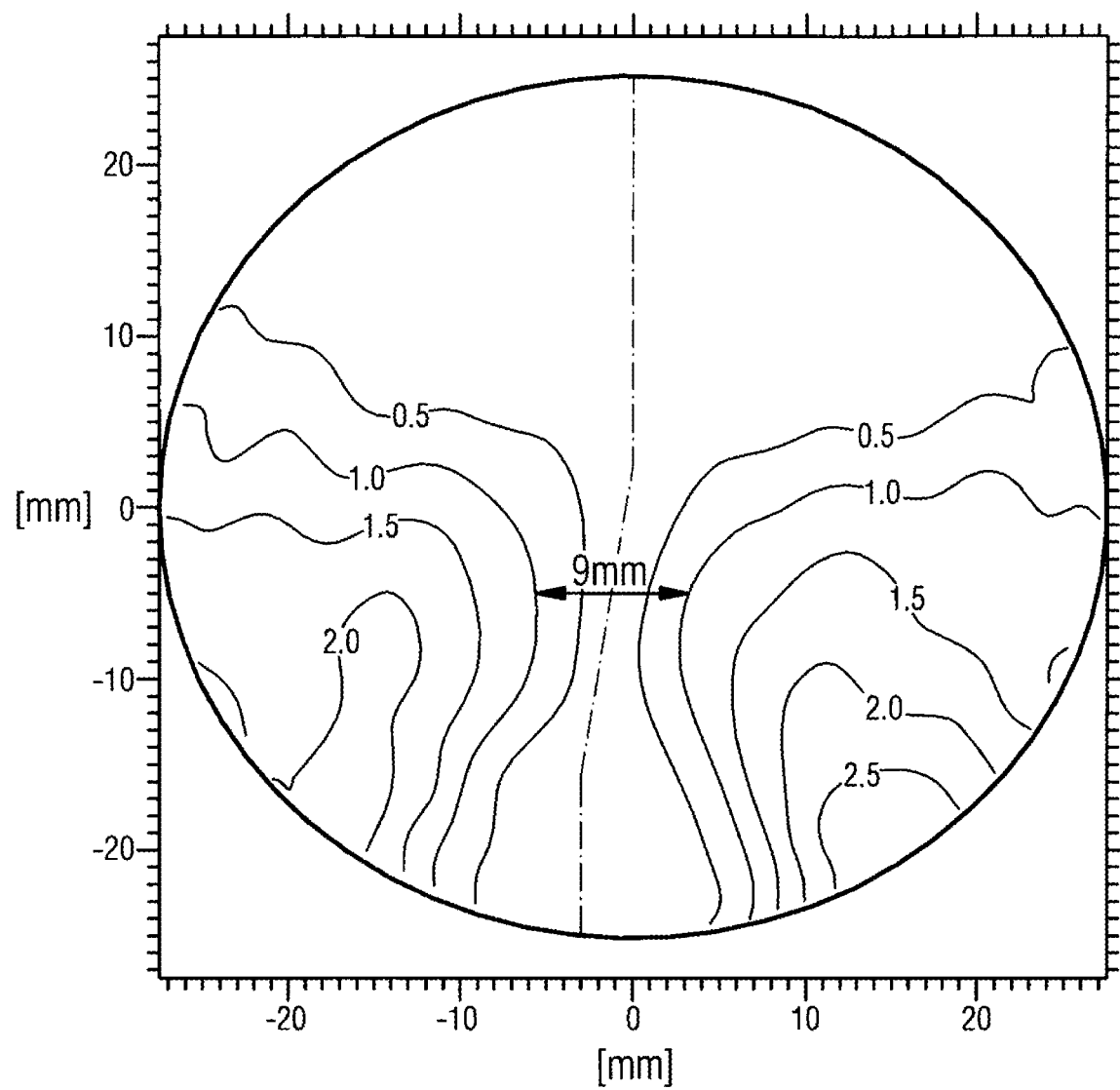

FIGS. 16A and 16B represent the effects of using the GRIN material with its specific refractive index distribution and of the design of the free-form surface for this GRIN progressive power spectacle lens on the width of the intermediate corridor in comparison with the comparison progressive power spectacle lens. The figures show the distribution of the residual astigmatic aberration in the beam path for the spectacle wearer, for a spectacle wearer with only a prescription for sphere.

In this third example, the intermediate corridor, defined here by the isoastigmatism line of 1 dpt, increases from 6 mm to 9 mm, i.e., by approximately 50 percent.

Figure 17A:
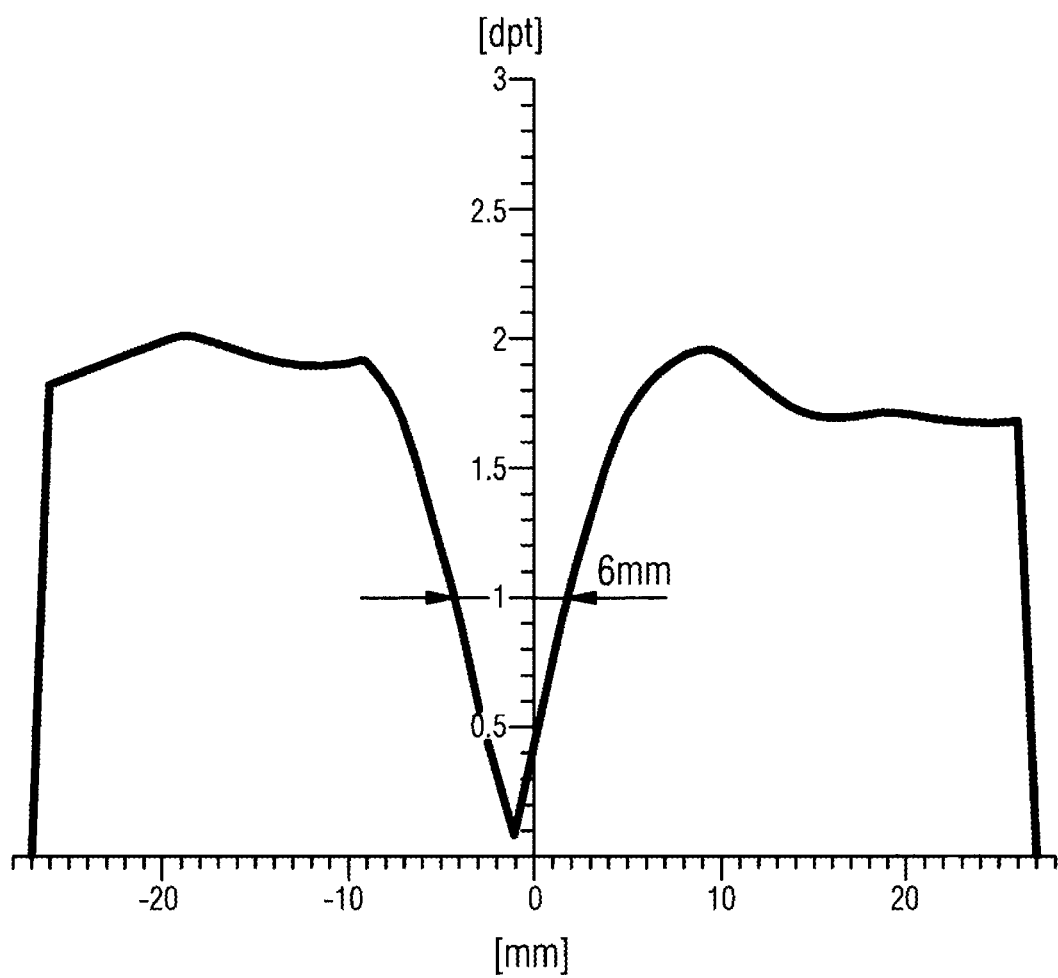
FIG. 17 shows a comparison of the residual astigmatism distribution of the GRIN progressive power spectacle lens according to the third exemplary embodiment with the residual astigmatism distribution of the comparison progressive power spectacle lens along a section at y=−5 mm according to FIG. 16
Figure 17B:
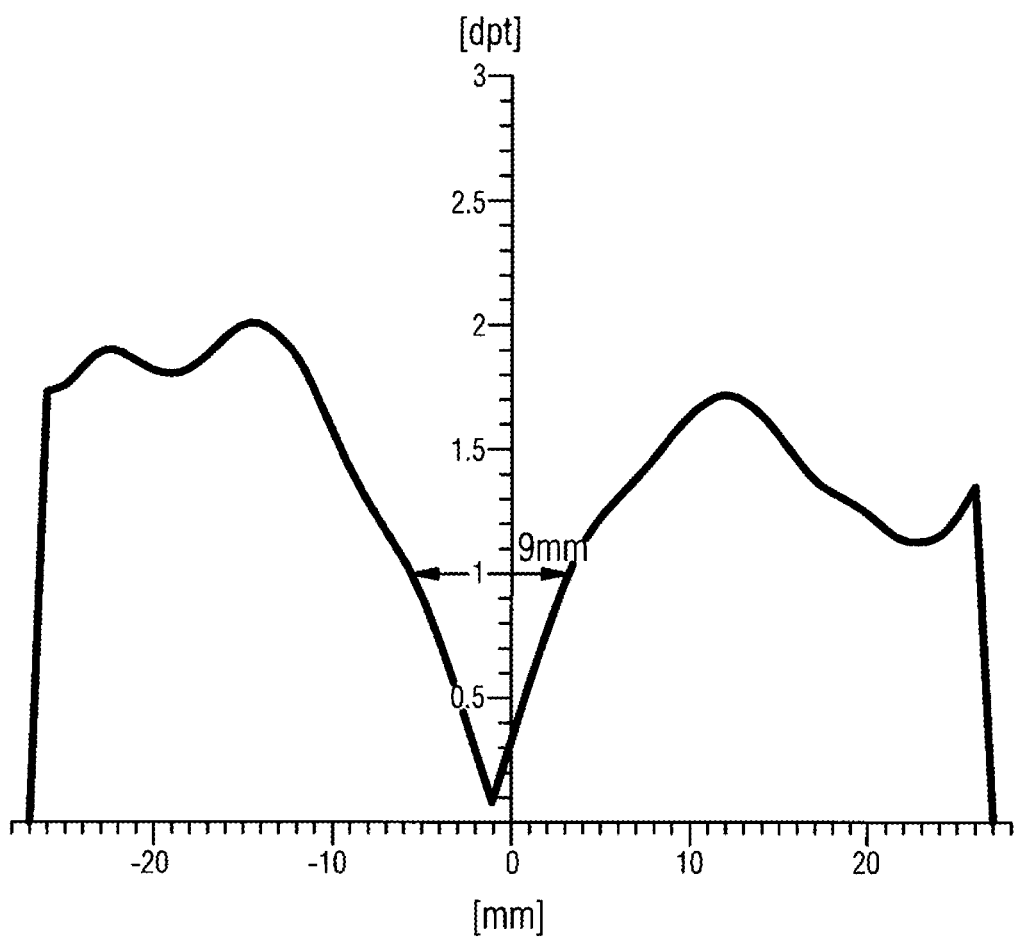

FIG. 17A and FIG. 17B show cross sections through the residual astigmatism distributions from FIG. 16A and FIG. 16B. These figures once again elucidate the conventional relationship between increasing power and the lateral increase in the astigmatic aberration induced thereby (similar to the relationship of the mean surface optical power to the surface astigmatism according to Minkwitz's theorem). The increase of the astigmatic residual aberration in the surroundings of the center of the intermediate corridor (y=−5 mm) is significantly lower for the GRIN progressive power spectacle lens according to the disclosure, even though the same power increase is present as in the comparison progressive power spectacle lens.

FIG. 18 compares the contour of the front surface of the GRIN progressive power spectacle lens according to the first exemplary embodiment with the contour of the front surface of the comparison progressive power spectacle lens with the aid of a sagittal height representation. FIG. 18B shows the sagittal heights of the front surface of the GRIN progressive power spectacle lens according to the disclosure according to the third exemplary embodiment and, in comparison therewith, FIG. 18A shows the sagittal heights of the front surface of the comparison progressive power spectacle lens, in each case with respect to a plane that is perpendicular to the horizontally straight-ahead direction of view.

Fourth Exemplary Embodiment

The essential steps of a method according to the disclosure for planning a GRIN progressive power spectacle lens are sketched out below:

Individual user data or application data of the spectacle wearer are captured in a first step. This includes the capture of (physiological) data that are assignable to the spectacle wearer and the capture of use conditions, under which the spectacle wearer will wear the progressive power spectacles to be planned.

By way of example, the physiological data of the spectacle wearer include the refractive error and the accommodation capability, which are determined by means of a refraction measurement and which are regularly included in the prescription in the form of the prescription values for sphere, cylinder, axis, prism and base, as well as addition. Furthermore, the pupillary distance and the pupil size, for example, are determined in different light conditions. By way of example, the age of the spectacle wearer is considered; this has an influence on the expected accommodation capability and pupil size. The convergence behavior of the eyes emerges from the pupil distance for different directions of view and object distances.

The use conditions include the seat of the spectacle lenses in front of the eye (usually in relation to the center of rotation of the eyes) and the object distances for different directions of views, at which the spectacle wearer should see in focus. The seat of the spectacle wearer in front of the eye can be determined, for example, by capturing vertex distance, pantoscopic tilt and lateral tilt. These data are included in an object distance model, for which a ray tracing method can be performed.

In a subsequent step, a design plan for the spectacle lens with a multiplicity of evaluation points is set on the basis of these captured data. The design plan comprises intended optical properties for the progressive power spectacle lens at the respective evaluation point. By way of example, the intended properties include the admissible deviation from the prescribed spherical and astigmatic power taking account of the addition, to be precise in the manner distributed over the entire progressive power spectacle lens as predetermined by the arrangement of the spectacle lens in front of the eye and by the underlying distance model.

Furthermore, a plan of surface geometries for the front and back surface and a plan for the refractive index distribution over the entire spectacle lens are set. By way of example, the front surface can be chosen to be a spherical surface and the back surface can be chosen to be a progressive surface. Additionally, both surfaces could initially be chosen as spherical surfaces. In general, the selection of surface geometry for the first plan merely determines the convergence (speed and success) of the applied optimization method below. By way of example, the assumption should be made that the front surface should maintain the spherical form and the back surface receives the form of a progressive surface.

The profile of chief rays through the multiplicity of evaluation points is determined in a further step. Optionally, it is possible to set a local wavefront for each of the chief rays in a surrounding of the respective chief ray.

In a subsequent step, the aforementioned optical properties of the spectacle lens are ascertained at the evaluation points by determining an influence of the spectacle lens on the beam path of the chief rays and, optionally, the local wavefronts in a surrounding of the respective evaluation point.

In a further step, the plan of the spectacle lens is evaluated depending on the ascertained optical properties and the individual user data. Then, the back surface and the refractive index distribution of the plan of the spectacle lens are modified in view of minimizing a target function $$F = \sum_m P_m \sum_n W_n (T_n - A_n)^2$$

where $P_m$ represents the weighting at the evaluation point m, $W_n$ represents the weighting of the optical property n, $T_n$ represents the intended value of the optical property n at the respective evaluation point m and $A_n$ represents the actual value of the optical property n at the evaluation point m.

Expressed differently, the local surface geometry of the back surface and the local refractive index of the progressive power spectacle lens is modified in the respective visual beam path through the evaluation points until a termination criterion has been satisfied.

The GRIN progressive power spectacle lens planned in this inventive manner can then be manufactured according to this plan.

The subject matter of the disclosure is sketched out below in the form of clauses within the meaning of the decision J15/88 of the Boards of Appeal of the European Patent Office:

The invention claimed is:

1. A product comprising a progressive power spectacle lens or a representation of the progressive power spectacle lens stored on a non-transitory data storage medium as computer-readable data, wherein the progressive power spectacle lens comprises:
   a front surface;
   a back surface; and
   a spatially varying refractive index,
   wherein either (i) the front surface is a progressive surface or (ii) the back surface is a progressive surface,
   wherein in case (i) the front surface is the progressive surface, a maximum of an absolute value of mean curvature of the front surface lies in an intermediate corridor or in case (ii) the back surface is the progressive surface, a minimum of the absolute value of the mean curvature of the back surface lies in the intermediate corridor, and
   wherein the intermediate corridor is a region of the progressive power spectacle lens providing a clear vision for ranges intermediate between distance and near.

2. The product as claimed in claim 1, wherein at least one of the front surface or the back surface is a free-form surface, wherein the free-form surface has no point symmetry and no axial symmetry or wherein the free-form surface has no point symmetry and no axial symmetry and no rotational symmetry and no symmetry with respect to a plane of symmetry.

3. The product as claimed in claim 1, wherein the product further comprises a representation, stored on the non-transitory data storage medium, of a predetermined arrangement of the progressive power spectacle lens in front of an eye of a progressive power spectacle wearer, for whom the progressive power spectacle lens is intended,
   wherein the progressive power spectacle lens has a distribution of a spherical equivalent for the predetermined arrangement of the progressive power spectacle lens in front of the eye of the progressive power spectacle wearer, for whom the progressive power spectacle lens is intended,
   wherein the intermediate corridor has a width, wherein a refractive index of the progressive power spectacle lens varies in space such that the width of the intermediate corridor of the progressive power spectacle lens, at least in a section or over an entire length of the intermediate corridor, is greater than the width of the intermediate corridor of a comparison progressive power spectacle lens with a spatially non-variable refractive index, but with a same distribution of the spherical equivalent in a same arrangement of the comparison progressive power spectacle lens in front of the eye of the progressive power spectacle wearer.

4. The product as claimed in claim 3, wherein the section is selected from the group consisting of:
   a horizontal section,
   a section at half addition,
   the horizontal section at half addition,
   the horizontal section at half addition and a horizontal section at 25% of an addition,
   the horizontal section at half addition and a horizontal section at 75% of the addition, and the horizontal section at half addition, the horizontal section at 25% of the addition, and the horizontal section at 75% of the addition.

5. The product as claimed in claim 3, further comprising at least one of:
(i) a representation, stored on the non-transitory data storage medium, of a residual astigmatism distribution for the predetermined arrangement of the progressive power spectacle lens in front of the eye of the progressive power spectacle wearer, for whom the progressive power spectacle lens is intended;
(ii) a representation, stored on the non-transitory data storage medium, of an astigmatic power distribution, required for a full correction, for the predetermined arrangement of the progressive power spectacle lens in front of the eye of the progressive power spectacle wearer, for whom the progressive power spectacle lens is intended;
(iii) a representation, stored on the non-transitory data storage medium, of a prescription and an object distance model for the predetermined arrangement of the progressive power spectacle lens in front of the eye of a progressive power spectacle wearer, for whom the progressive power spectacle lens is intended; or
(iv) a representation, stored on the non-transitory data storage medium, of a distribution of the spherical equivalent for the predetermined arrangement of the progressive power spectacle lens in front of the eye of the progressive power spectacle wearer, for whom the progressive power spectacle lens is intended,
wherein the progressive power spectacle lens has a distance portion and a near portion, and
wherein the width of the intermediate corridor corresponds to a dimension transverse to a longitudinal direction of the intermediate corridor extending between the distance portion and the near portion, within which the absolute value of the residual astigmatism lies below a predetermined limit value, which is selected within a range from the group consisting of:
(a) the limit value lies in the range between 0.25 dpt and 1.5 dpt,
(b) the limit value lies in the range between 0.25 dpt and 1.0 dpt,
(c) the limit value lies in the range between 0.25 dpt and 0.75 dpt,
(d) the limit value lies in the range between 0.25 dpt and 0.6 dpt,
(e) the limit value lies in the range between 0.25 dpt and 0.5 dpt, and
(f) the limit value is 0.5 dpt.

6. The product as claimed in claim 1, wherein the product further comprises a representation, stored on the non-transitory data storage medium, of a predetermined arrangement of the progressive power spectacle lens in front of an eye of a progressive power spectacle wearer, for whom the progressive power spectacle lens is intended,
wherein the progressive power spectacle lens has a distribution of a spherical equivalent for the predetermined arrangement of the progressive power spectacle lens in front of the eye of the progressive power spectacle wearer, for whom the progressive power spectacle lens is intended,
wherein the product further comprises at least one of:
(i) a representation, stored on the non-transitory data storage medium, of a residual astigmatism distribution for the predetermined arrangement of the progressive power spectacle lens in front of the eye of the progressive power spectacle wearer, for whom the progressive power spectacle lens is intended;
(ii) a representation, stored on the non-transitory data storage medium, of an astigmatic power distribution, required for a full correction, for the predetermined arrangement of the progressive power spectacle lens in front of the eye of the progressive power spectacle wearer, for whom the progressive power spectacle lens is intended;
(iii) a representation, stored on the non-transitory data storage medium, of a prescription and an object distance model for the predetermined arrangement of the progressive power spectacle lens in front of the eye of a progressive power spectacle wearer, for whom the progressive power spectacle lens is intended; or
(iv) a representation, stored on the non-transitory data storage medium, of a distribution of the spherical equivalent for the predetermined arrangement of the progressive power spectacle lens in front of the eye of the progressive power spectacle wearer, for whom the progressive power spectacle lens is intended,
wherein the refractive index of the progressive power spectacle lens varies in space such that a maximum value of the residual astigmatism of the progressive power spectacle lens is less than the maximum value of the residual astigmatism of a comparison progressive power spectacle lens with the same distribution of the spherical equivalent in the case of the same arrangement of the comparison progressive power spectacle lens in front of the eye of the progressive power spectacle wearer, but with a spatially non-variable refractive index.

7. The product as claimed in claim 1, wherein the product further comprises a representation, stored on the non-transitory data storage medium, of a predetermined arrangement of the progressive power spectacle lens in front of an eye of a progressive power spectacle wearer, for whom the progressive power spectacle lens is intended,
wherein the progressive power spectacle lens has a distribution of a spherical equivalent for the predetermined arrangement of the progressive power spectacle lens in front of the eye of the progressive power spectacle wearer, for whom the progressive power spectacle lens is intended,
wherein the product further comprises at least one of:
(i) a representation, stored on the non-transitory data storage medium, of a residual astigmatism distribution for the predetermined arrangement of the progressive power spectacle lens in front of the eye of the progressive power spectacle wearer, for whom the progressive power spectacle lens is intended;
(ii) a representation, stored on the non-transitory data storage medium, of an astigmatic power distribution, required for a full correction, for the predetermined arrangement of the progressive power spectacle lens in front of the eye of the progressive power spectacle wearer, for whom the progressive power spectacle lens is intended;
(iii) a representation, stored on the non-transitory data storage medium, of a prescription and an object distance model for the predetermined arrangement of the progressive power spectacle lens in front of the eye of a progressive power spectacle wearer, for whom the progressive power spectacle lens is intended; or
(iv) a representation, stored on the non-transitory data storage medium, of a distribution of the spherical equivalent for the predetermined arrangement of the progressive power spectacle lens in front of the eye of the progressive power spectacle wearer, for whom the progressive power spectacle lens is intended, wherein the progressive power spectacle lens has an intermediate corridor and a principal line of sight, wherein the refractive index of the progressive power spectacle lens varies in space such that a predetermined residual astigmatism value $A_{(Rest,Grenz)}$ selected from the group consisting of:
- (a) the residual astigmatism value $A_{(Rest,Grenz)}$ lies in the range between 0.25 dpt and 1.5 dpt,
- (b) the residual astigmatism value $A_{(Rest,Grenz)}$ lies in the range between 0.25 dpt and 1.0 dpt,
- (c) the residual astigmatism value $A_{(Rest,Grenz)}$ lies in the range between 0.25 dpt and 0.75 dpt,
- (d) the residual astigmatism value $A_{(Rest,Grenz)}$ lies in the range between 0.25 dpt and 0.6 dpt,
- (e) the residual astigmatism value $A_{(Rest,Grenz)}$ lies in the range between 0.25 dpt and 0.5 dpt, and
- (f) the residual astigmatism value $A_{(Rest,Grenz)}$ is 0.5 dpt on a horizontal section at a narrowest point of the intermediate corridor or for a horizontal section through a point on the principal line of sight at which the half addition is achieved, the following relationship applies within a region with a horizontal distance of 10 mm on both sides of the principal line of sight:

$$B > c \times A_{(Rest,Grenz)}/(\text{grad } W)$$

where grad W describes the power gradient of the spherical equivalent of the progressive power spectacle lens at the narrowest point of the intermediate corridor on the principal line of sight or in a point on the principal line of sight at which the half addition is achieved, B describes the width of the region in the progressive power spectacle lens in which the residual astigmatism is $A_{Rest} \leq A_{(Rest,Grenz)}$, where c is a constant selected from the group consisting of:
- (a) 1.0<c,
- (b) 1.1<c,
- (c) 1.2<c, and
- (d) 1.3<c.

8. A product comprising a progressive power spectacle lens or a representation of the progressive power spectacle lens stored on a non-transitory data storage medium as computer-readable data, wherein the progressive power spectacle lens comprises:
- (a) a front surface formed as a progressive surface with a front surface geometry and a back surface with a back surface geometry; or
- (b) the back surface formed as the progressive surface with the back surface geometry and the front surface with the front surface geometry; and a spatially varying refractive index,
wherein the product further includes a representation, stored on the non-transitory data storage medium, of a predetermined arrangement of the progressive power spectacle lens in front of an eye of a progressive power spectacle wearer, for whom the progressive power spectacle lens is intended, and
wherein the progressive power spectacle lens has a distribution of a spherical equivalent for the predetermined arrangement of the progressive power spectacle lens in front of the eye of the progressive power spectacle wearer, for whom the progressive power spectacle lens is intended; and at least one of:
- (i) a representation, stored on the non-transitory data storage medium, of a residual astigmatism distribution for the predetermined arrangement of the progressive power spectacle lens in front of the eye of the progressive power spectacle wearer, for whom the progressive power spectacle lens is intended;
- (ii) a representation, stored on the non-transitory data storage medium, of an astigmatic power distribution, required for a full correction, for the predetermined arrangement of the progressive power spectacle lens in front of the eye of the progressive power spectacle wearer, for whom the progressive power spectacle lens is intended;
- (iii) a representation, stored on the non-transitory data storage medium, of a prescription and an object distance model for the predetermined arrangement of the progressive power spectacle lens in front of the eye of a progressive power spectacle wearer, for whom the progressive power spectacle lens is intended; or
- (iv) a representation, stored on the non-transitory data storage medium, of a distribution of the spherical equivalent for the predetermined arrangement of the progressive power spectacle lens in front of the eye of the progressive power spectacle wearer, for whom the progressive power spectacle lens is intended, wherein the refractive index of the progressive power spectacle lens varies in space such that a maximum value of the residual astigmatism of the progressive power spectacle lens is less than the maximum value of the residual astigmatism of the comparison progressive power spectacle lens with a spatially non-varying refractive index, but with a same distribution of the spherical equivalent in the case of a same arrangement of the comparison progressive power spectacle lens in front of the eye of the progressive power spectacle wearer, wherein the maximum value of the residual astigmatism of the comparison progressive power spectacle lens is situated at a same location as the maximum value of the residual astigmatism of the progressive power spectacle lens, wherein in case (a), the front surface geometry of the front surface, formed as a progressive surface, of the progressive power spectacle lens has a modified shape in relation to a front surface geometry of a front surface, formed as a progressive surface, of the comparison progressive power spectacle lens and the back surface geometry of the back surface of the progressive power spectacle lens has an identical shape to a back surface geometry of a back surface of the comparison progressive power spectacle lens, and wherein in case (b), the back surface geometry of the back surface, formed as a progressive surface, of the progressive power spectacle lens has a modified shape in relation to a back surface geometry of a back surface, formed as a progressive surface, of the comparison progressive power spectacle lens and the front surface geometry of the front surface of the progressive power spectacle lens has an identical shape to a front surface geometry of a front surface of the comparison progressive power spectacle lens.

9. The product as claimed in claim 8, wherein at least one of the front surface or the back surface is a free-form surface, wherein the free-form surface has no point symmetry and no axial symmetry or wherein the free-form surface has no point symmetry and no axial symmetry and no rotational symmetry and no symmetry with respect to a plane of symmetry.

10. The product as claimed in claim 8, wherein the progressive power spectacle lens comprises an intermediate corridor and wherein at least one of:

the front surface is the free-form surface and the mean curvature has a maximum in the intermediate corridor, or the back surface is the free-form surface and the mean curvature has a minimum in the intermediate corridor.

11. The product as claimed in claim 8, wherein the product further comprises a representation, stored on the non-transitory data storage medium, of a predetermined arrangement of the progressive power spectacle lens in front of an eye of a progressive power spectacle wearer, for whom the progressive power spectacle lens is intended, wherein the progressive power spectacle lens has a distribution of a spherical equivalent for the predetermined arrangement of the progressive power spectacle lens in front of the eye of the progressive power spectacle wearer, for whom the progressive power spectacle lens is intended, wherein the progressive power spectacle lens has an intermediate corridor with a width, wherein the refractive index of the progressive power spectacle lens varies in space such that the width of the intermediate corridor of the progressive power spectacle lens, at least in a section or over the entire length of the intermediate corridor, is greater than the width of the intermediate corridor of a comparison progressive power spectacle lens with a same distribution of the spherical equivalent in the case of a same arrangement of the comparison progressive power spectacle lens in front of the eye of the progressive power spectacle wearer, but with a spatially non-variable refractive index.

12. The product as claimed in claim 11, wherein the section is selected from the group consisting of:

a horizontal section, a section at half addition, a horizontal section at half addition, a horizontal section at half addition and a horizontal section at 25% of the addition, a horizontal section at half addition and a horizontal section at 75% of the addition, and a horizontal section at half addition, the horizontal section at 25% of the addition, and the horizontal section at 75% of the addition.

13. The product as claimed in claim 11, further comprising at least one of:

(i) a representation, stored on a non-transitory data storage medium, of a residual astigmatism distribution for the predetermined arrangement of the progressive power spectacle lens in front of the eye of the progressive power spectacle wearer, for whom the progressive power spectacle lens is intended;

(ii) a representation, stored on the non-transitory data storage medium, of an astigmatic power distribution, required for a full correction, for the predetermined arrangement of the progressive power spectacle lens in front of the eye of the progressive power spectacle wearer, for whom the progressive power spectacle lens is intended;

(iii) a representation, stored on the non-transitory data storage medium, of a prescription and an object distance model for the predetermined arrangement of the progressive power spectacle lens in front of the eye of a progressive power spectacle wearer, for whom the progressive power spectacle lens is intended; or (iv) a representation, stored on the non-transitory data storage medium, of a distribution of the spherical equivalent for the predetermined arrangement of the progressive power spectacle lens in front of the eye of the progressive power spectacle wearer, for whom the progressive power spectacle lens is intended, wherein the progressive power spectacle lens has a distance portion and a near portion, and wherein a width of the intermediate corridor corresponds to the dimension transverse to a longitudinal direction of the intermediate corridor extending between the distance portion and near portion, within which an absolute value of the residual astigmatism lies below a predetermined limit value, which is selected from the group consisting of:

(a) the limit value lies in the range between 0.25 dpt and 1.5 dpt, (b) the limit value lies in the range between 0.25 dpt and 1.0 dpt, (c) the limit value lies in the range between 0.25 dpt and 0.75 dpt, (d) the limit value lies in the range between 0.25 dpt and 0.6 dpt, (e) the limit value lies in the range between 0.25 dpt and 0.5 dpt, and (f) the limit value is 0.5 dpt.

14. The product as claimed in claim 1, further comprising:

a representation, stored on the non-transitory data storage medium, of a predetermined arrangement of the progressive power spectacle lens in front of an eye of a progressive power spectacle wearer, for whom the progressive power spectacle lens is intended, wherein the progressive power spectacle lens has a distribution of a spherical equivalent for the predetermined arrangement of the progressive power spectacle lens in front of the eye of the progressive power spectacle wearer, for whom the progressive power spectacle lens is intended, and at least one of:

(i) a representation, stored on the non-transitory data storage medium, of a residual astigmatism distribution for a predetermined arrangement of the progressive power spectacle lens in front of the eye of the progressive power spectacle wearer, for whom the progressive power spectacle lens is intended;

(ii) a representation, stored on the non-transitory data storage medium, of an astigmatic power distribution, required for a full correction, for the predetermined arrangement of the progressive power spectacle lens in front of the eye of the progressive power spectacle wearer, for whom the progressive power spectacle lens is intended;

(iii) a representation, stored on the non-transitory data storage medium, of a prescription and an object distance model for the predetermined arrangement of the progressive power spectacle lens in front of the eye of a progressive power spectacle wearer, for whom the progressive power spectacle lens is intended, or (iv) a representation, stored on the non-transitory data storage medium, of a distribution of the spherical equivalent for the predetermined arrangement of the progressive power spectacle lens in front of the eye of the progressive power spectacle wearer, for whom the progressive power spectacle lens is intended, wherein the progressive power spectacle lens comprises an intermediate corridor and a principal line of sight, wherein the refractive index of the progressive power spectacle lens varies in space such that a predetermined residual astigmatism value $A_{(Rest,Grenz)}$ selected from the group consisting of:
(a) the residual astigmatism value $A_{(Rest,Grenz)}$ lies in a range between 0.25 dpt and 1.5 dpt,
(b) the residual astigmatism value $A_{(Rest,Grenz)}$ lies in the range between 0.25 dpt and 1.0 dpt,
(c) the residual astigmatism value $A_{(Rest,Grenz)}$ lies in the range between 0.25 dpt and 0.75 dpt,
(d) the residual astigmatism value $A_{(Rest,Grenz)}$ lies in the range between 0.25 dpt and 0.6 dpt,
(e) the residual astigmatism value $A_{(Rest,Grenz)}$ lies in the range between 0.25 dpt and 0.5 dpt, or
(f) the residual astigmatism value $A_{(Rest,Grenz)}$ is 0.5 dpt,
on a horizontal section at a narrowest point of the intermediate corridor or for a horizontal section through a point on the principal line of sight at which the half addition is achieved, the following relationship applies within a region with a horizontal distance of 10 mm on both sides of the principal line of sight:

$$B > c \times A_{(Rest,Grenz)}/(\text{grad } W)$$

where grad W describes the power gradient of the spherical equivalent of the progressive power spectacle lens at a narrowest point of the intermediate corridor on the principal line of sight or in a point on the principal line of sight at which the half addition is achieved, B describes the width of the region in the progressive power spectacle lens in which the residual astigmatism is $A_{Rest} \leq A_{(Rest,Grenz)}$, where c is a constant selected from the group consisting of:
(a) $1.0 < c$,
(b) $1.1 < c$,
(c) $1.2 < c$, and
(d) $1.3 < c$.

15. A product comprising a progressive power spectacle lens or a representation of the progressive power spectacle lens stored on a non-transitory data storage medium as computer-readable data, the progressive power spectacle lens comprising:
a front surface;
a back surface; and
a spatially varying refractive index,
wherein at least one of the front surface or the back surface is formed as the progressive surface, and
wherein the progressive surface is a free-form surface;
a representation, stored on the non-transitory data storage medium, of a predetermined arrangement of the progressive power spectacle lens in front of an eye of a progressive power spectacle wearer, for whom the progressive power spectacle lens is intended,
wherein the progressive power spectacle lens has a distribution of a spherical equivalent for the predetermined arrangement of the progressive power spectacle lens in front of the eye of the progressive power spectacle wearer, for whom the progressive power spectacle lens is intended; and
at least one of:
(i) a representation, stored on the non-transitory data storage medium, of a residual astigmatism distribution for the predetermined arrangement of the progressive power spectacle lens in front of the eye of the progressive power spectacle wearer, for whom the progressive power spectacle lens is intended;
(ii) a representation, stored on the non-transitory data storage medium, of an astigmatic power distribution, required for a full correction, for the predetermined arrangement of the progressive power spectacle lens in front of the eye of the progressive power spectacle wearer, for whom the progressive power spectacle lens is intended;
(iii) a representation, situated on the non-transitory data storage medium, of a prescription and an object distance model for the predetermined arrangement of the progressive power spectacle lens in front of the eye of a progressive power spectacle wearer, for whom the progressive power spectacle lens is intended; or
(iv) a representation, situated on the non-transitory data storage medium, of a distribution of the spherical equivalent for the predetermined arrangement of the progressive power spectacle lens in front of the eye of the progressive power spectacle wearer, for whom the progressive power spectacle lens is intended,
wherein the progressive power spectacle lens includes an intermediate corridor and a principal line of sight, and wherein the refractive index of the progressive power spectacle lens varies in space such that a predetermined residual astigmatism value $A_{(Rest,Grenz)}$ selected from the group consisting of:
(a) the residual astigmatism value $A_{(Rest,Grenz)}$ lies in the range between 0.25 dpt and 1.5 dpt, ,
(b) the residual astigmatism value $A_{(Rest,Grenz)}$ lies in the range between 0.25 dpt and 1.0 dpt,
(c) the residual astigmatism value $A_{(Rest,Grenz)}$ lies in the range between 0.25 dpt and 0.75 dpt,
(d) the residual astigmatism value $A_{(Rest,Grenz)}$ lies in the range between 0.25 dpt and 0.6 dpt,
(e) the residual astigmatism value $A_{(Rest,Grenz)}$ lies in the range between 0.25 dpt and 0.5 dpt, and
(f) the residual astigmatism value $A_{(Rest,Grenz)}$ is 0.5 dpt,
on a horizontal section at the narrowest point of the intermediate corridor or for a horizontal section through the point on the principal line of sight at which the half addition is achieved, the following relationship applies within a region with a horizontal distance of 10 mm on both sides of the principal line of sight:

$$B > c \times A_{(Rest,Grenz)}/(\text{grad } W)$$

where grad W describes the power gradient of the spherical equivalent of the progressive power spectacle lens at the narrowest point of the intermediate corridor on the principal line of sight or in a point on the principal line of sight at which the half addition is achieved, B describes the width of the region in the progressive power spectacle lens in which the residual astigmatism is $A_{Rest} \leq A_{(Rest,Grenz)}$, where c is a constant selected from the group consisting of:
(a) $1.0 < c$,
(b) $1.1 < c$,
(c) $1.2 < c$, and
(d) $1.3 < c$.

16. The product as claimed in claim 15, wherein the free-form surface has no point symmetry and no axial symmetry or wherein the free-form surface has no point symmetry and no axial symmetry and no rotational symmetry and no symmetry with respect to a plane of symmetry.

17. The product as claimed in claim 15, wherein the progressive power spectacle lens comprises an intermediate corridor and wherein at least one of:
the mean curvature of the front surface formed as the free-form surface has a maximum in the intermediate corridor, or the mean curvature of the back surface formed as the free-form surface has a minimum in the intermediate corridor.

18. The product as claimed in claim 15, wherein the product further comprises a representation, stored on the non-transitory data storage medium, of a predetermined arrangement of the progressive power spectacle lens in front of an eye of a progressive power spectacle wearer, for whom the progressive power spectacle lens is intended,
wherein the progressive power spectacle lens has a distribution of a spherical equivalent for the predetermined arrangement of the progressive power spectacle lens in front of the eye of the progressive power spectacle wearer, for whom the progressive power spectacle lens is intended,
wherein the progressive power spectacle lens has an intermediate corridor with a width, wherein the refractive index of the progressive power spectacle lens varies in space such that a width of the intermediate corridor of the progressive power spectacle lens, at least in a section or over the entire length of the intermediate corridor, is greater than the width of the intermediate corridor of a comparison progressive power spectacle lens with a same distribution of the spherical equivalent in the case of the same arrangement of the comparison progressive power spectacle lens in front of the eye of the progressive power spectacle wearer, but with a spatially non-variable refractive index.

19. The product as claimed in claim 18, wherein the section is selected from the group consisting of:
a horizontal section,
a section at half addition,
a horizontal section at half addition,
the horizontal section at half addition and a horizontal section at 25% of an addition,
a horizontal section at half addition and a horizontal section at 75% of the addition, and
a horizontal section at half addition, the horizontal section at 25% of the addition, and the horizontal section at 75% of the addition.

20. The product as claimed in claim 18, further comprising at least one of:
(i) a representation, stored on a non-transitory data storage medium, of a residual astigmatism distribution for the predetermined arrangement of the progressive power spectacle lens in front of the eye of the progressive power spectacle wearer, for whom the progressive power spectacle lens is intended;
(ii) a representation, stored on the non-transitory data storage medium, of an astigmatic power distribution, required for a full correction, for the predetermined arrangement of the progressive power spectacle lens in front of the eye of the progressive power spectacle wearer, for whom the progressive power spectacle lens is intended;
(iii) a representation, stored on the non-transitory data storage medium, of a prescription and an object distance model for the predetermined arrangement of the progressive power spectacle lens in front of the eye of a progressive power spectacle wearer, for whom the progressive power spectacle lens is intended; or
(iv) a representation, stored on the non-transitory data storage medium, of a distribution of the spherical equivalent for the predetermined arrangement of the progressive power spectacle lens in front of the eye of the progressive power spectacle wearer, for whom the progressive power spectacle lens is intended,
wherein the progressive power spectacle lens has a distance portion and a near portion, and
wherein a width of the intermediate corridor corresponds to the dimension transverse to a longitudinal direction of the intermediate corridor extending between the distance portion and near portion, within which the absolute value of the residual astigmatism lies below a predetermined limit value, which is selected within a range from the group consisting of:
(a) the limit value lies in a range between 0.25 dpt and 1.5 dpt,
(b) the limit value lies in the range between 0.25 dpt and 1.0 dpt,
(c) the limit value lies in the range between 0.25 dpt and 0.75 dpt,
(d) the limit value lies in the range between 0.25 dpt and 0.6 dpt,
(e) the limit value lies in the range between 0.25 dpt and 0.5 dpt, and
(f) the limit value is 0.5 dpt.

21. The product as claimed in claim 18, wherein the product further comprises:
a representation, stored on the non-transitory data storage medium, of a predetermined arrangement of the progressive power spectacle lens in front of an eye of a progressive power spectacle wearer, for whom the progressive power spectacle lens is intended,
wherein the progressive power spectacle lens has a distribution of a spherical equivalent for the predetermined arrangement of the progressive power spectacle lens in front of the eye of the progressive power spectacle wearer, for whom the progressive power spectacle lens is intended; and
at least one of:
(i) a representation, stored on the non-transitory data storage medium, of a residual astigmatism distribution for the predetermined arrangement of the progressive power spectacle lens in front of the eye of the progressive power spectacle wearer, for whom the progressive power spectacle lens is intended;
(ii) a representation, stored on the non-transitory data storage medium, of an astigmatic power distribution, required for a full correction, for the predetermined arrangement of the progressive power spectacle lens in front of the eye of the progressive power spectacle wearer, for whom the progressive power spectacle lens is intended;
(iii) a representation, stored on the non-transitory data storage medium, of a prescription and an object distance model for the predetermined arrangement of the progressive power spectacle lens in front of the eye of a progressive power spectacle wearer, for whom the progressive power spectacle lens is intended; or
(iv) a representation, stored on the non-transitory data storage medium, of a distribution of the spherical equivalent for the predetermined arrangement of the progressive power spectacle lens in front of the eye of the progressive power spectacle wearer, for whom the progressive power spectacle lens is intended,
wherein the refractive index of the progressive power spectacle lens varies in space such that a maximum value of the residual astigmatism of the progressive power spectacle lens is less than the maximum value of the residual astigmatism of a comparison progressive power spectacle lens with the same distribution of the spherical equivalent in the case of the same arrangement of the comparison progressive power spectacle lens in front of the eye of the progressive power spectacle wearer, but with a spatially non-variable refractive index.

22. The product as claimed in claim 18, wherein the progressive power spectacle lens consists of a substrate having no individual layers and having a front surface and a back surface and the spatially varying refractive index, and a front surface coating, comprising one or more individual layers, on the front surface of the substrate and/or a back surface coating, comprising one or more individual layers, on the back surface of the substrate, and
- wherein a difference between the spherical equivalent measured at each point on the front surface of the progressive power spectacle lens with the front surface coating and/or the back surface coating and the spherical equivalent measured at each corresponding point on the front surface of the comparison progressive power spectacle lens without front surface coating and without back surface coating but with an identical substrate is less than a difference value selected from the group consisting of:
  - (a) the difference value is less than 0.001 dpt,
  - (b) the difference value is less than 0.002 dpt,
  - (c) the difference value is less than 0.003 dpt, and
  - (d) the difference value is less than 0.004 dpt.

23. A computer-implemented method for planning a progressive power spectacle lens having an addition or a degression power with a front surface and a back surface, and having a spatially varying refractive index, the method comprising:
- calculating at least one of the front surface or the back surface as a progressive surface, wherein the progressive power spectacle lens has a distribution of a spherical equivalent for the predetermined arrangement of the progressive power spectacle lens in front of the eye of the progressive power spectacle wearer, for whom the progressive power spectacle lens is intended, when the progressive power spectacle lens has an intermediate corridor with a width;
- calculating optical properties of the progressive power spectacle lens with a ray tracing method at a plurality of evaluation points, at which visual rays pass through the progressive power spectacle lens;
- setting at least one intended optical property for the progressive power spectacle lens at the respective evaluation point;
- providing a plan for the progressive power spectacle lens, wherein the plan comprises a representation of a local surface geometry of the progressive surface and a local refractive index of the progressive power spectacle lens in a respective visual beam path through the evaluation points;
- modifying the plan of the progressive power spectacle lens in view of an approximation of the at least one intended optical property of the progressive power spectacle lens, wherein the modification includes modifying the representation of the local surface geometry of the progressive surface and the local refractive index of the progressive power spectacle lens in the respective visual beam path through the evaluation points, wherein the at least one intended optical property comprises an intended residual astigmatism of the progressive power spectacle lens, and
- implementing the plan of the progressive power spectacle lens with the stipulation that:
  - providing the addition or the degression power at least partly by the spatially varying refractive index,
  - wherein the refractive index of the progressive power spectacle lens varies in space such that a width of the intermediate corridor of the progressive power spectacle lens varies, at least in sections from the group consisting of:
    - (a) a horizontal section at half addition and a horizontal section at 25% of an addition,
    - (b) the horizontal section at half addition and a horizontal section at 75% of the addition,
    - (c) the horizontal section at half addition, the horizontal section at 25% of the addition, and the horizontal section at 75% of the addition, and
    - (d) a horizontal section at a narrowest point of the intermediate corridor,
  - or over the entire length of the intermediate corridor, is greater than the width of the intermediate corridor of a comparison progressive power spectacle lens with a spatially non-varying refractive index but a same distribution of the spherical equivalent in the case of the same arrangement of the comparison progressive power spectacle lens in front of the eye of the progressive power spectacle wearer,
  - wherein the width of the intermediate corridor corresponds to the dimension transverse to a longitudinal direction of the intermediate corridor extending between the distance portion and near portion, within which an absolute value of the residual astigmatism lies below a predetermined limit value, which is selected within a range selected from the group consisting of:
    - (a) the limit value lies in the range between 0.25 dpt and 1.0 dpt,
    - (b) the limit value lies in the range between 0.25 dpt and 0.75 dpt,
    - (c) the limit value lies in the range between 0.25 dpt and 0.6 dpt,
    - (d) the limit value lies in the range between 0.25 dpt and 0.5 dpt, and
    - (e) the limit value is 0.5 dpt.

24. A computer-implemented method for planning a progressive power spectacle lens having an addition or a degression power with a front surface and a back surface, the method comprising:
- calculating a front surface of the progressive power spectacle lens formed as a progressive surface with a front surface geometry and the back surface with a back surface geometry, or
- calculating the back surface of the progressive power spectacle lens formed as the progressive surface with the back surface geometry and the front surface with the front surface geometry;
- providing a spatially varying refractive index, wherein the progressive power spectacle lens has a distribution of a spherical equivalent for the predetermined arrangement of the progressive power spectacle lens in front of the eye of the progressive power spectacle wearer, for whom the progressive power spectacle lens is intended;
- calculating optical properties of the progressive power spectacle lens with a ray tracing method at a plurality of evaluation points, at which visual rays pass through the progressive power spectacle lens;
- setting at least one intended optical property for the progressive power spectacle lens at the respective evaluation point;
- providing a plan for the progressive power spectacle lens including a representation of a local surface geometry of the progressive surface and a local refractive index of the progressive power spectacle lens in the respective visual beam path through the evaluation points;

modifying the plan of the progressive power spectacle lens in view of an approximation of the at least one intended optical property of the progressive power spectacle lens, wherein the modification includes modifying the representation of the local surface geometry of the progressive surface and the local refractive index of the progressive power spectacle lens in the respective visual beam path through the evaluation points, wherein the at least one intended optical property comprises an intended residual astigmatism of the progressive power spectacle lens; and implementing the plan of the progressive power spectacle lens with the stipulation that the refractive index of the progressive power spectacle lens varies in space such that a maximum value of the residual astigmatism of the progressive power spectacle lens is less than the maximum value of the residual astigmatism of a comparison progressive power spectacle lens with a spatially non-varying refractive index, but a same distribution of the spherical equivalent in the case of the same arrangement of the comparison progressive power spectacle lens in front of the eye of the progressive power spectacle wearer, wherein in case (a), the front surface geometry of the front surface, formed as the progressive surface, of the progressive power spectacle lens is modified in relation to a front surface geometry of a front surface, formed as a progressive surface, of the comparison progressive power spectacle lens and the back surface geometry of the back surface of the progressive power spectacle lens is identical to a back surface geometry of a back surface of the comparison progressive power spectacle lens, and wherein in case (b), the back surface geometry of the back surface, formed as a progressive surface, of the progressive power spectacle lens is modified in relation to a back surface geometry of a back surface, formed as a progressive surface, of the comparison progressive power spectacle lens and the front surface geometry of the front surface of the progressive power spectacle lens is identical to a front surface geometry of a front surface of the comparison progressive power spectacle lens.

25. A computer-implemented method for planning a progressive power spectacle lens with a front surface, a back surface, and a spatially varying refractive index, at least one of the front surface or the back surface being a progressive surface, the method comprising:

calculating optical properties of the progressive power spectacle lens with a ray tracing method at a plurality of evaluation points, at which visual rays pass through the progressive power spectacle lens;

setting at least one intended optical property for the progressive power spectacle lens at the respective evaluation point;

providing a plan for the progressive power spectacle lens, wherein the plan includes a representation of a local surface geometry of the progressive surface and a local refractive index of the progressive power spectacle lens in the respective visual beam path through the evaluation points; and modifying the plan of the progressive power spectacle lens in view of an approximation of the at least one intended optical property of the progressive power spectacle lens, wherein the modification comprises modifying the representation of the local surface geometry of the progressive surface and the local refractive index of the progressive power spectacle lens in the respective visual beam path through the evaluation points, wherein the at least one intended optical property comprises an intended residual astigmatism of the progressive power spectacle lens, wherein the progressive power spectacle lens includes an intermediate corridor and a principal line of sight and the refractive index of the progressive power spectacle lens varies in space such that for a predetermined residual astigmatism value $A_{(Rest,Grenz)}$ selected from the group consisting of:

(a) the residual astigmatism value $A_{(Rest,Grenz)}$ lies in the range between 0.25 dpt and 1.5 dpt, (b) the residual astigmatism value $A_{(Rest,Grenz)}$ lies in the range between 0.25 dpt and 1.0 dpt, (c) the residual astigmatism value $A_{(Rest,Grenz)}$ lies in the range between 0.25 dpt and 0.75 dpt, (d) the residual astigmatism value $A_{(Rest,Grenz)}$ lies in the range between 0.25 dpt and 0.6 dpt, (e) the residual astigmatism value $A_{(Rest,Grenz)}$ lies in the range between 0.25 dpt and 0.5 dpt, and (f) the residual astigmatism value $A_{(Rest,Grenz)}$ is 0.5 dpt, on a horizontal section at the narrowest point of the intermediate corridor or for a horizontal section through the point on the principal line of sight at which the half addition is achieved, the following relationship applies within a region with a horizontal distance of 10 mm on both sides of the principal line of sight:

$$B > c \times A_{(Rest,Grenz)}/(\text{grad } W)$$

where grad W describes the power gradient of the spherical equivalent of the progressive power spectacle lens at the narrowest point of the intermediate corridor on the principal line of sight or in a point on the principal line of sight at which the half addition is achieved, B describes the width of the region in the progressive power spectacle lens in which the residual astigmatism is $A_{Rest} \leq A_{(Rest,Grenz)}$, where c is a constant selected from the group consisting of:

(a) $1.0 < c$,
(b) $1.1 < c$,
(c) $1.2 < c$, or
(d) $1.3 < c$.

26. The method as claimed in claim 23, further comprising:

implementing the modification of the plan of the progressive power spectacle lens by minimizing a target function $$F = \sum_m P_m \sum_n W_n (T_n - A_n)^2$$

where $P_m$ represents the weighting at the evaluation point m, $W_n$ represents the weighting of the optical property n, $T_n$ represents the intended value of the optical property n at the respective evaluation point m and $A_n$ represents the actual value of the optical property n at the evaluation point m.

27. The method as claimed in claim 23, wherein an intended residual astigmatism is predetermined for at least one evaluation point, the intended residual astigmatism being less than a theoretically achievable residual astigmatism at the at least one corresponding evaluation point on a comparison progressive power spectacle lens with the same distribution of the spherical equivalent and the same arrangement of the comparison progressive power spectacle lens in front of the eye of the progressive power spectacle wearer, but with a spatially non-variable refractive index, and in that modifying the representation of the local surface geometry of the progressive surface and of the local refractive index of the progressive power spectacle lens in the respective visual beam path through the evaluation points is only terminated if the residual astigmatism at the at least one evaluation point, achieved for the planned progressive power spectacle lens, is less than the theoretically achievable residual astigmatism at the at least one corresponding evaluation point on the comparison progressive power spectacle lens.

28. The method as claimed in claim 23, wherein planning the progressive power spectacle lens results in a progressive power spectacle comprising:
a front surface;
a back surface; and
a spatially varying refractive index,
wherein either (i) the front surface is a progressive surface or (ii) the back surface is a progressive surface,
wherein in case (i) the front surface is the progressive surface, a maximum of an absolute value of mean curvature of the front surface lies in an intermediate corridor or in case (ii) the back surface is the progressive surface, a minimum of the absolute value of the mean curvature of the back surface lies in the intermediate corridor, and
wherein the intermediate corridor is a region of the progressive power spectacle lens providing a clear vision for ranges intermediate between distance and near.

29. A computer program having program code for carrying out the method as claimed in claim 23 when the computer program is loaded in a computer and/or executed in a computer.

30. A computer-readable non-transitory storage medium comprising the computer program as claimed in claim 29.

31. A method for manufacturing, by way of an additive method, a progressive power spectacle lens as claimed in claim 1.

32. A method for manufacturing a progressive power spectacle lens, comprising planning a progressive power spectacle lens having an addition or a degression power with a front surface and a back surface, and having a spatially varying refractive index as claimed in claim 23 and manufacturing the progressive power spectacle lens as planned.

33. The method as claimed in claim 32, wherein the progressive power spectacle lens is manufactured with an additive method.

34. A computer comprising a processor and a non-transitory memory in which a computer program is stored, the computer being configured to carry out a method as claimed in claim 23.

* * * * *

UNITED STATES PATENT AND TRADEMARK OFFICE
CERTIFICATE OF CORRECTION

PATENT NO. : 10,838,231 B2
APPLICATION NO. : 16/515496
DATED : November 17, 2020
INVENTOR(S) : Gerhard Kelch, Christoph Menke and Helmut Wietschorke It is certified that error appears in the above-identified patent and that said Letters Patent is hereby corrected as shown below:

In the Specification

Column 1, Line 54, change "Of this" to -- of this --

Column 3, Line 57, change "Yuki shitanoki" to -- Yuki Shitanoki --

Column 9, Line 35, change "Optik and Technik" to -- Optik und Technik --

Column 16, Lines 48 to 49, change "Koppen: Konzeption and Entwicklung von Progressivglasern" to
-- Koeppen: Konzeption und Entwicklung von Progressivglaesern --

Column 17, Lines 25 to 26, change "Koppen: Konzeption and Entwicklung von Progressivglasern" to
-- Koeppen: Konzeption und Entwicklung von Progressivglaesern --

Column 18, Lines 35 to 36, change "Koppen: Konzeption and Entwicklung von Progressivglasern" to
-- Koeppen: Konzeption und Entwicklung von Progressivglaesern --

Column 24, Line 43, change "Optik and Technik" to -- Optik und Technik --

In the Claims

Column 38, Line 25, Claim 15, change "dpt ," to -- dpt, --

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*